(12) United States Patent
Matsuzawa et al.

(10) Patent No.: US 9,462,150 B2
(45) Date of Patent: Oct. 4, 2016

(54) IMAGE READ-IN DEVICE WITH FASTENER TO FASTEN TRANSPARENT MEMBER RETAINING LENS ARRAY ASSEMBLY AND LIGHT SHIELD TO BOARD

(71) Applicant: MITSUBISHI ELECTRIC CORPORATION, Chiyoda-ku (JP)

(72) Inventors: Taku Matsuzawa, Chiyoda-ku (JP); Akira Ota, Chiyoda-ku (JP); Daisuke Ohama, Chiyoda-ku (JP); Hajime Nakajima, Chiyoda-ku (JP); Hiroyuki Kawano, Chiyoda-ku (JP); Sadaaki Yoshioka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/649,758

(22) PCT Filed: Nov. 28, 2013

(86) PCT No.: PCT/JP2013/006989
§ 371 (c)(1),
(2) Date: Jun. 4, 2015

(87) PCT Pub. No.: WO2014/087614
PCT Pub. Date: Jun. 12, 2014

(65) Prior Publication Data
US 2015/0319329 A1 Nov. 5, 2015

(30) Foreign Application Priority Data
Dec. 6, 2012 (JP) .................................. 2012-267502

(51) Int. Cl.
H04N 1/028 (2006.01)
G03B 27/54 (2006.01)
H04N 1/04 (2006.01)

(52) U.S. Cl.
CPC ............ *H04N 1/0286* (2013.01); *G03B 27/54* (2013.01); *H04N 1/028* (2013.01); *H04N 1/0281* (2013.01);
(Continued)

(58) Field of Classification Search
None
See application file for complete search history.

(56) References Cited

U.S. PATENT DOCUMENTS 6,147,339 A    11/2000    Matsumoto
6,259,082 B1 *    7/2001    Fujimoto ............... H04N 1/031
                                                            250/208.1
(Continued)

FOREIGN PATENT DOCUMENTS

JP    06-305191    11/1994
JP    09-247360    9/1997
(Continued)

OTHER PUBLICATIONS

International Search Report issued Mar. 4, 2014, in PCT/JP2013/006989, filed Nov. 28, 2013.
(Continued)

*Primary Examiner* — Thomas D Lee
(74) *Attorney, Agent, or Firm* — Oblon, McClelland, Maier & Neustadt, L.L.P.

(57) ABSTRACT

An image reader configured to read an image of an object-to-be-read includes: a board, a line sensor assembly including a plurality of photosensitive elements formed on one surface of the board along a main scanning direction, a lens array assembly including a plurality of lenses arrayed along the main scanning direction, and configured to focus the reflected light onto the line sensor assembly, a light shield configured to support a portion of the lens array assembly at the line-sensor-assembly side or to be in contact with the portion of the lens array assembly at the line-sensor-assembly side, and to block light other than the light focused by the lens array assembly, and a transparent member made of transparent material, formed with a retainer space where the lens array assembly and the light shield are retained, and covering a portion of the lens array assembly at the object-to-be-read side and the light shield.

15 Claims, 36 Drawing Sheets

(52) U.S. Cl.
CPC .......... *H04N 1/0285* (2013.01); *H04N 1/0289* (2013.01); *H04N 1/02865* (2013.01); *H04N 1/02895* (2013.01); *H04N 1/04* (2013.01); *H04N 2201/0081* (2013.01)

(56) References Cited

U.S. PATENT DOCUMENTS

| 2001/0050765 | A1 | 12/2001 | Antonelli et al. |
|---|---|---|---|
| 2004/0212844 | A1 | 10/2004 | Kato |

FOREIGN PATENT DOCUMENTS

| JP | 10-126579 | 5/1998 |
|---|---|---|
| JP | 10-190959 A | 7/1998 |
| JP | 10-210216 | 8/1998 |
| JP | 10-243166 | 9/1998 |
| JP | 11-052136 | 2/1999 |
| JP | 11-266340 | 9/1999 |
| JP | 11-284796 | 10/1999 |
| JP | 2000-358130 | 12/2000 |
| JP | 2002-527832 | 8/2002 |
| JP | 2006-285659 | 10/2006 |
| JP | 2007-221360 A | 8/2007 |
| TW | I334725 | 12/2010 |
| WO | WO00/22565 A1 | 4/2000 |

OTHER PUBLICATIONS

Taiwanese Office Action issued Mar. 19, 2015, in corresponding Taiwanese Patent Application No. 102144556 (with English-language Translation).

Office Action issued Apr. 18, 2016 in Korean Patent Application No. 10-2015-7015048 (with partial English translation).

Extended European Search Report issue Jul. 13, 2016 in European Application No. 13860951.6.

* cited by examiner

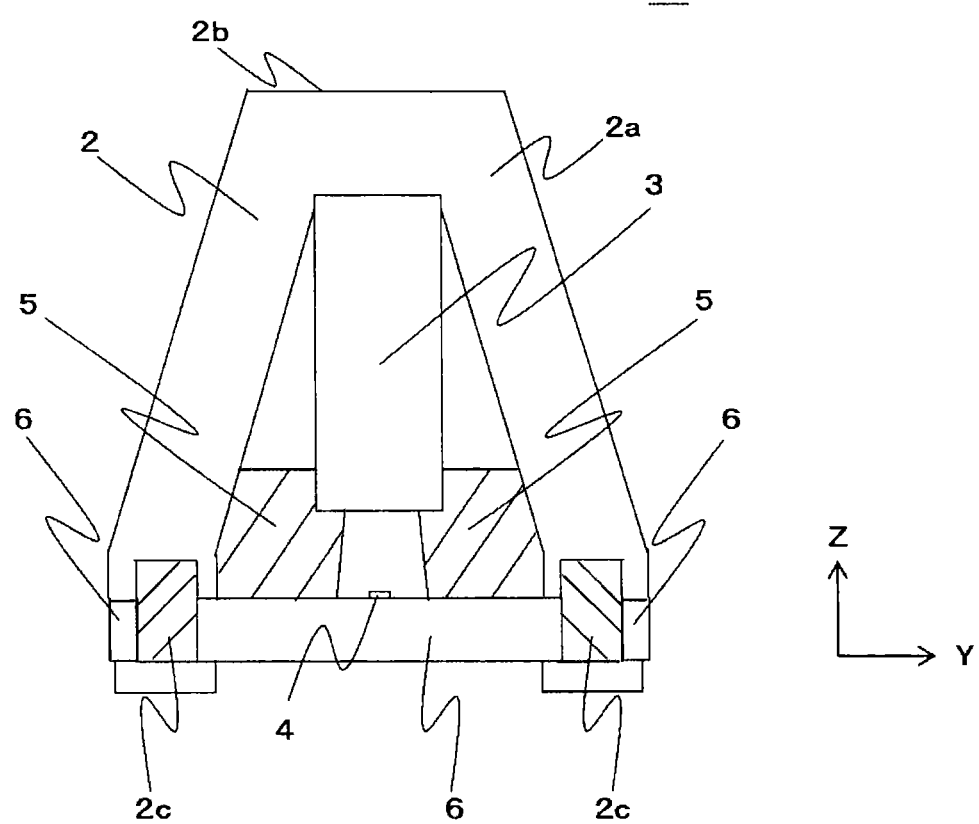

IMAGE READ-IN DEVICE WITH FASTENER TO FASTEN TRANSPARENT MEMBER RETAINING LENS ARRAY ASSEMBLY AND LIGHT SHIELD TO BOARD

TECHNICAL FIELD

The present disclosure relates to an image reader that reads the image of an object-to-be-read.

BACKGROUND ART

Conventionally, image readers are used in facsimile machines, copying machines, scanners, banknote checking devices, inspection devices, fingerprint verifying devices and the like. Image readers are used to read various types of object-to-be-reads such as manuscripts, books, pages of a magazines, documents, paintings, photographs, transparent positives, rolls of film, banknotes, securities, circuit boards, electronic components and fingerprints. In addition, image readers receive reflected light from the object-to-be-read through sensor elements, i.e. photosensitive elements, thereby obtaining the image of the object-to-be-read. The reflected light from the object-to-be-read includes not only visible light but also light with wavelengths other than those of the visible light. Hence, the types of the light source incorporated in the image reader or provided external to the image reader, i.e. the light source used for emission of light to illuminate the object-to-be-read and to obtain reflected light, include not only types that emit visible light but also types that emit light of non-visible wavelengths.

If the light source is incorporated in the image reader, light is emitted from light-source elements (point light sources) such as LEDs or organic EL elements, the emitted light is guided through the interior of a light guide (light guiding member) formed of a transparent material (transparent member) such as a resin, and the guided light is emitted to illuminate the object-to-be-read (see, for example, Patent Literatures 1 to 7). Needless to say, there are also light sources that have no light guide. Regardless of the presence/absence of the light guide in the light source, there are also image readers that have no built-in light source (see, for example, Patent Literature 8) and that can use such a light source.

Patent Literatures 1 and 2 disclose image readers in which the light guide and the lens array are in contact with each other. Patent Literatures 2 and 3 disclose image readers in which the light guide is integrated with a transparent top panel (guide plate) along which the object-to-be-read passes after having been fed in the feeding direction (sub-scanning direction). Patent Literatures 4, 5, 6 and 8 disclose image readers that have a board formed with imaging elements and fastened by attachment members (elastic members) or screws. Still further, Patent Literature 7 discloses an image reader that includes a board having imaging elements disposed on a light guide.

CITATION LIST

Patent Literature

Patent Literature 1: Unexamined Japanese Patent Application Kokai Publication No. H11-266340 (see, in particular, FIG. 2, FIG. 9, and FIG. 10)
Patent Literature 2: National Patent Publication No. 2002-527832 (see, in particular, FIGS. 3 and 4)
Patent Literature 3: Unexamined Japanese Patent Application Kokai Publication No. H10-126579 (see, in particular, FIG. 3)
Patent Literature 4: Unexamined Japanese Patent Application Kokai Publication No. H10-210216 (see, in particular, FIG. 14)
Patent Literature 5: Unexamined Japanese Patent Application Kokai Publication No. H10-243166 (see, in particular, FIG. 3)
Patent Literature 6: Unexamined Japanese Patent Application Kokai Publication No. 2006-285659 (see, in particular, FIG. 3)
Patent Literature 7: Unexamined Japanese Patent Application Kokai Publication No. H9-247360 (see, in particular, FIG. 1)
Patent Literature 8: Unexamined Japanese Patent Application Kokai Publication No. H6-305191 (in particular, see paragraph [0025], paragraph [0027], and FIG. 1)

SUMMARY OF INVENTION

Technical Problem

However, conventional image readers have the following technical problems. The image readers disclosed in Patent Literatures 1 to 5, and 7 have problems in that structural complexity and large size are difficult to be avoided. Although the light guide and the lens (imaging optical system) are configured in contact with each other in the image readers disclosed in Patent Literatures 1 and 2, neither the specific structure of the configuration, nor explanation of the configuration is disclosed. In addition, although the image reader disclosed in Patent Literature 6 has a simple configuration, this literature does not disclose the details of the lens (imaging optical system), and thus the degree of accuracy of the obtained image is still left as a technical problem. Still further, the image reader disclosed in Patent Literature 8 ignores matters other than the positioning of the lens (imaging optical system) with respect to the photosensitive elements, and this literature does not disclose the details of the light source.

An objective of the present disclosure is to obtain an image reader that can perform highly accurate reading and has simple structure, without increase in complexity or size of the structure.

Solution to Problem

According to the present disclosure, an image reader is provided that is configured to focus light emitted from a light source and reflected by an object-to-be-read, and to read an image of the object-to-be-read, the image reader including:
a board;
a line sensor assembly including a plurality of photosensitive elements formed on one surface of the board along a main scanning direction;
a lens array assembly including a plurality of lenses arrayed along the main scanning direction, and configured to focus the reflected light onto the line sensor assembly;
a light shield configured to support or to be in contact with a portion of the lens array assembly at the line-sensor-assembly side, and to block light other than the light focused by the lens array assembly;
a transparent member made of transparent material retaining the lens array assembly and the light shield in a retainer space, and covering a portion of the lens array assembly at the object-to-be-read side and the light shield.

Advantageous Effects of Invention

According to the image reader of the present disclosure, the imaging optical elements (lens array and photosensitive elements) are reliably supported, and this has the advantageous effect of not requiring a casing that supports directly the imaging optical elements (lens array and photosensitive elements).

BRIEF DESCRIPTION OF DRAWINGS

FIG. 9 is a cross-sectional view of the image reader according to Embodiment 1 of the present disclosure;

DESCRIPTION OF EMBODIMENTS

Embodiment 1

Figure 1:
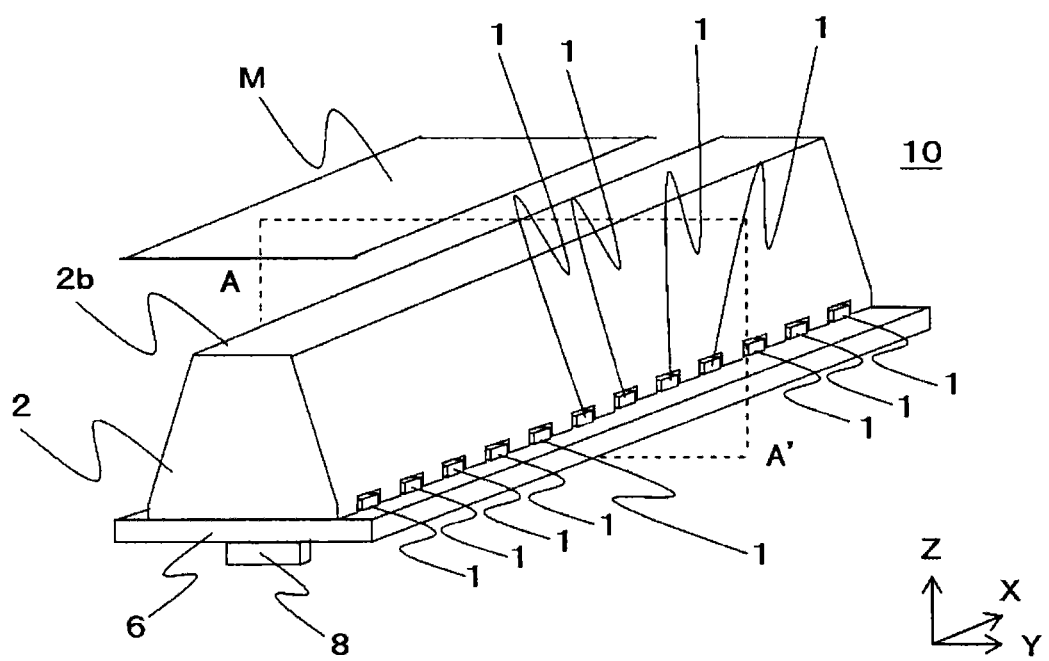
FIG. 1 is a perspective view of an image reader according to Embodiment 1 of the present disclosure.

An image reader according to the present disclosure is an image reader that focuses reflected light that is light (illumination light) emitted from a light source (light-source elements 1) and reflected by an object-to-be-read M to read the image thereof, and that includes a board 6, a line sensor assembly 4 that has a plurality of photosensitive elements formed on one surface of the board 6 along the main scanning direction, a lens array assembly 3 (imaging optical system 3) having a plurality of lenses arrayed along the main scanning direction, and focusing the reflected light on the line sensor assembly 4, a light shield 5 supporting a portion of the lens array assembly 3 at the line-sensor-assembly-4 side, or being in contact with the portion of the lens array assembly 3 at the line-sensor-assembly-4 side, and blocking light other than the light focused by the lens array assembly 3, and a transparent member 2 made of transparent material retaining the lens array assembly 3 and the light shield 5 in a retainer space, and covering a portion of the lens array assembly 3 at the object-to-be-read-M side and the light shield 5. Embodiments of the present disclosure including Embodiment 1 are explained below. In the explanation for the respective Embodiments and the explanation for the respective figures, the same or equivalent components are denoted by the same reference signs. The following explanation is given of an "image reader 10" that is an example image reader of the present disclosure.

Embodiment 1 of the present disclosure is explained with reference to FIGS. 1 to 11. FIG. 1 is a perspective view of the image reader of Embodiment 1. The image reader 10 is a contact image sensor (CIS). The X-axis direction illustrated in FIG. 1 indicates the main scanning direction of the image reader 10. The Y-axis direction indicates the sub-scanning direction intersecting (at right angle) with the main scanning direction of the image reader 10. The sub-scanning direction is a feeding direction in which the object-to-be-read M is fed. The Z-axis direction is an axial direction orthogonal to an XY plane defined by the X axis and the Y axis, is also an optical axis direction of the imaging optical system 3 of the image reader 10, and is a reading depth direction that is a direction to indicate the focal depth of the imaging optical system 3.

Figure 2A:
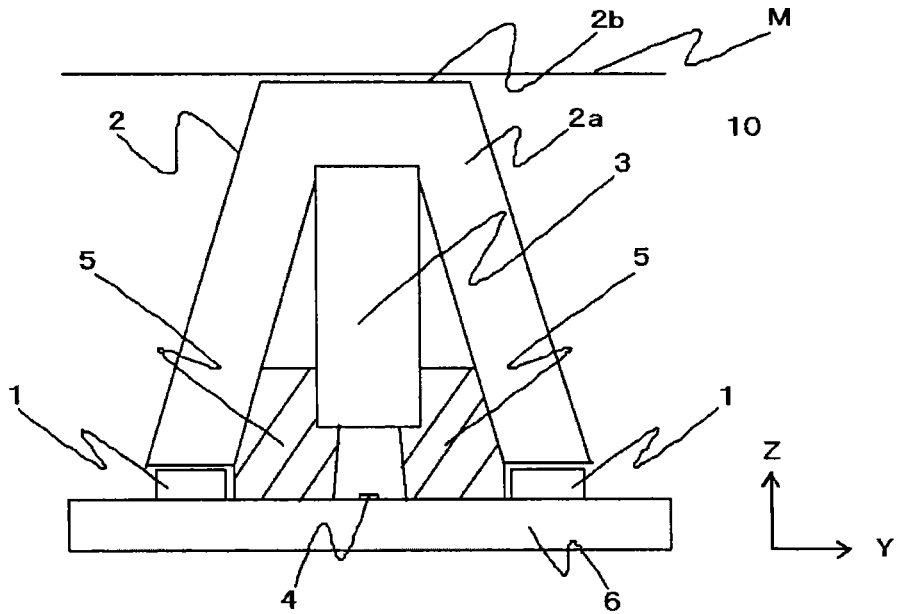
FIGS. 2A to 2E are cross-sectional views of the image reader according to Embodiment 1 of the present disclosure.

FIG. 2A is a cross-sectional view of the image reader 10 at a virtual plane AA' that is a parallel plane with an YZ plane defined by the Y axis and the Z axis illustrated in FIG. 1. More specifically, the virtual plane AA' is a cross-section of a portion that intersects one of the plurality of light-source elements 1 arrayed in the main scanning direction (X-axis direction). Note that the plurality of light-source elements 1 are arrayed in two rows along the main scanning direction (X-axis direction) side-by-side rows sandwiching the imaging optical system 3 therebetween. Hence, in a precise sense, the virtual plane AA' is a cross section that intersects two of the light-source elements 1 disposed respectively in the two rows. Needless to say, when the light-source elements 1 disposed side by side in respective two rows along the main scanning direction (X-axis direction) across the imaging optical system 3 are arranged in a zigzag pattern, the virtual plane AA' is a cross section that intersects one of the plurality of light-source elements 1. Embodiment 2, 3 and 4, and also this Embodiment 1 are explained for an example configuration in which the light-source elements 1 disposed side by side in the two rows across the imaging optical system 3 are not arranged in the zigzag pattern, but face one another in the sub-scanning direction (Y-axis direction). The object-to-be-read M is a reading-target medium (illuminated object) with image information, such as manuscripts, books, magazine pages, documents (general documents), paintings, photographs, transparent positives, rolls of film, banknotes, securities, circuit boards, electronic components and fingerprints.

Figure 2B:
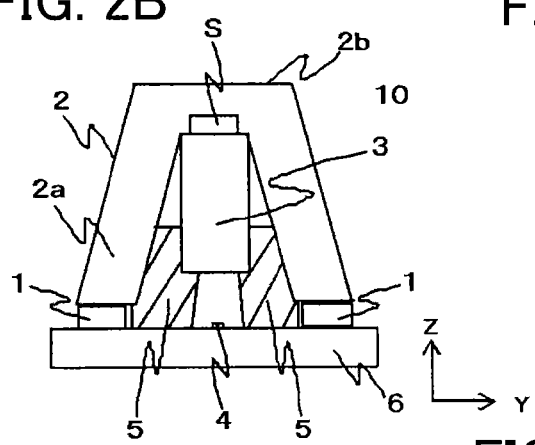
Figure 2C:
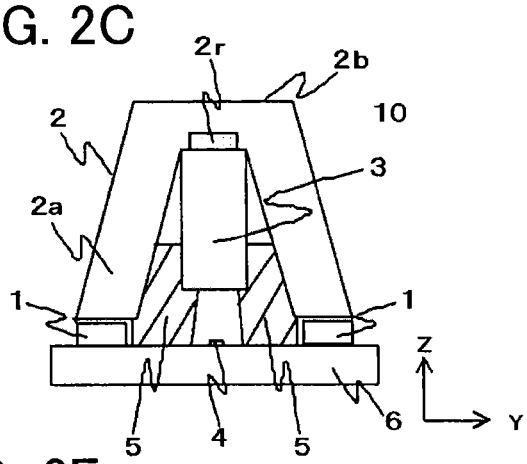
Figure 2D:
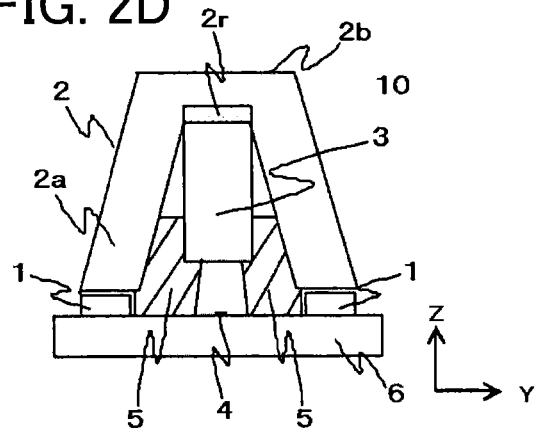
Figure 2E:
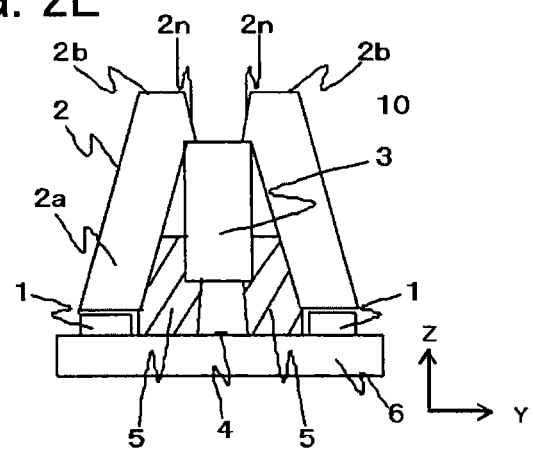

FIGS. 2B, 2C and 2D illustrate configurations in which a space (hereinafter, referred to as a "space S") is present between the imaging optical system 3 and the transparent member 2 in the image reader 10 illustrated in FIG. 2A. When transparent resin 2r is present in the space S as illustrated in FIGS. 2C and 2D, the image reader 10 is also presumed to have the space S. FIG. 2E illustrates a configuration in which the transparent member 2 of the image reader 10 in FIG. 2A is formed with a below-described cut-out 2n (cut-out portion 2n). The cut-out 2n (cut-out portion 2n) exposes the imaging optical system 3 to the object-to-be-read M. In the image reader 10 illustrated in FIG. 2E, the space S can be said to be opened.

In FIGS. 1 and 2, the transparent member 2 is a light guide member that is formed, for example, of resin or glass, and that extends in the X-axis direction. Hence, the transparent member can be also referred to as a light guide. When, in particular, light (illumination light) emitted by the light-source elements 1 that are the light source for the image reader 10 is guided through the interior of the transparent member 2, the transparent member 2 is referred to as a light guide 2. In Embodiment of the present disclosure, an example configuration is explained in which the image reader 10 includes the light-source elements 1 (light source). In Embodiment 1, the previously explained plurality of light-source elements 1 face an end portion of the transparent member 2 opposite to the object-to-be-read M, and are arrayed in the main scanning direction (X-axis) along the light shield member 5 (light shield 5), thus serving as a light source.

As explained above, Embodiment of the present disclosure discloses only a structure in which the transparent member 2 is the light guide 2, but the present disclosure is applicable to a configuration in which the light-source elements 1 exist outside the image reader 10, and light from the light-source elements 1 does not enter the interior of the transparent member 2, but rather illuminates directly the object-to-be-read M. In any configuration, except the configuration in which the optical path (path of propagation of light, including reflected light) of the reflected light from the object-to-be-read M is cut out (that is, the cut-out 2n is formed) between the imaging optical system 3 and the object-to-be-read M, the reflected light from the object-to-be-read M passes through the interior of the transparent member 2. That is to say, in a configuration in which the transparent member 2 functions by guiding the light from the light source (light-source elements 1) through the interior of the transparent member 2, and by emitting the guided light to the object-to-be-read M, the transparent member can be called "light guide 2". When the transparent member 2 is configured as the light guide 2 in this way, the optical path for light from the light source (light-source elements 1) includes a portion formed as the optical path of reflected light of the light guide 2. Note that a point light-source element, such as an LED (Light Emitting Diode) or an organic EL (Organic Electro Luminescence), is suitable for the light-source element 1 (light source), but the present disclosure is not limited to the point light source. In Embodiments of the present disclosure, the explanation is given of an example configuration in which the light-source element 1 is an LED.

In FIGS. 1 and 2, a light guide portion 2a of the light guide 2 indicates a part where light from the light source (light-source elements 1) is guided in the light guide 2. An object-to-be-read feeding side face 2b of the light guide 2 (transparent member 2) is, among the surfaces of the light guide 2 (transparent member 2), a surface facing the fed object-to-be-read M. On the object-to-be-read-feeding-side-face-2*b* side and at the opposite side to the imaging optical system 3, it is provided a reading position of the imaging optical system 3, which is the focal point thereof. When the focal point is arranged on the object-to-be-read feeding side face 2*b*, in order to read the object-to-be-read M, the fed object-to-be-read M passes on or in close vicinity of the object-to-be-read feeding side face 2*b*. Hence, the object-to-be-read feeding side face 2*b* can be understood as a document placement surface 2*b*. In Embodiments of the present disclosure, an example configuration is explained in which such an object-to-be-read feeding side face 2*b* can be understood as the document placement surface 2*b*. In addition, when the light guide 2 (transparent member 2) is provided with a cut-out 2*n* as explained above, the object-to-be-read feeding side face 2*b* (document placing surface 2*b*) is completely or partially omitted. In this configuration, at least a part of the object-to-be-read feeding side face 2*b* (document placing surface 2*b*) is a virtual surface. Needless to say, the object-to-be-read M is not in contact with the virtual surface. The details of the configuration in which the cut-out 2*n* is formed are explained later.

In FIGS. 1 and 2 the imaging optical system 3 is the lens array assembly 3 which has a plurality of lenses arrayed along the main scanning direction, and which focuses light toward the line sensor assembly. In Embodiments of the present disclosure, although the explanation is given of an example configuration in which the imaging optical system 3 (lens array assembly 3) is constructed by having a plurality of rod lenses (rod lens array) disposed side by side in an array and held between plates, other lens arrays, such as a micro lens array that is the same erecting equal-magnification type optical system as the rod lens array, are applicable. If the micro lens array is used, the imaging optical system 3 becomes a micro lens array assembly 3 that has a plurality of lenses (lens array) held between plates.

If the imaging optical system 3 is configured as an erecting equal-magnification type optical system, the object-to-be-read feeding side face 2*b* may have a lens function. This lens function can be accomplished by, for example, cutting out a part of the transparent member 2 corresponding to the optical path (a path through which light (including reflected light) travels) of reflected light from the object-to-be-read M and located between the imaging optical system 3 and the object-to-be-read M, and fitting a lens in this cut-out 2*n*. In such configurations, a lens is formed by the object-to-be-read feeding side face 2*b*, and another lens is fastened to a retainer space 2L of the transparent member 2 in which the imaging optical system 3 is retained. The imaging optical system 3 is not limited to the erecting equal-magnification type optical system as long as such a system can be retained in the retainer space 2L of the transparent member 2 or can be formed on the transparent member 2, including the object-to-be-read feeding side face 2*b*.

In addition, the imaging optical system 3 is provided between the transparent member 2 and the board 6, and in this Embodiment 1, the imaging optical system 3 is fastened to the light shield member 5 arranged between the imaging optical system 3 and the board 6, but may be held on the transparent member 2 by adhesive 21 (adhesive 22), tape and the like, and a wedge member 23 may be pressed in between the transparent member 2 and the imaging optical system 3 to fasten the imaging optical system 3. Such a configuration is explained in Embodiment 6, which is explained below together with the explanation of the adhesive 21 (adhesive 22).

The optical axis of the imaging optical system 3 is disposed so as to be perpendicular to the reading surface (document surface) of the object-to-be-read M, and the imaging optical system 3 has a function of forming an image on a sensor IC 4 that is a light receiver assembly for focusing reflected light from the object-to-be-read M. The sensor IC 4 is the line sensor assembly 4 (can be referred to as a sensor array assembly 4) that has a plurality of photosensitive elements formed along the main scanning direction on one surface of the board 6. The sensor IC 4 receives light focused by the imaging optical system 3, performs photoelectric conversion, and outputs electric signals. On the sensor IC 4 is mounted a light receiver assembly composed of a semiconductor chip, other drive circuits and the like. These mounted components are arranged on the one surface of the board 6, the other surface thereof and in the interior thereof.

The light shield member 5 supports a portion of the imaging optical system 3 at the sensor-IC-4 side, and functions as a light shield 5 that blocks light other than light focused by the imaging optical system 3. The light shield member 5 disposed between the board 6 and the imaging optical system 3 is provided with a structure having an opening having a certain length in the sub-scanning direction at least a length so as to surround the photosensitive elements of the sensor IC 4, and penetrating in the direction orthogonal to the main scanning direction and the sub-scanning direction, that is, penetrating in the optical axis direction (Z-axis direction) and extending in the main scanning direction. The light shield member 5 has a function of blocking light entering to the sensor IC 4 from the exterior of the above-described image reader 10. The light shield member 5 is preferably formed of a black resin having a low reflectivity or an anodized material so that light passing through the imaging optical system 3 but not entering to the sensor IC 4 and scattered and reflected by the board 6 and further reflected by the surrounding components does not enter the sensor IC 4. In addition, the light shield member 5 has a dust-proofing effect in that foreign materials are prevented from entering to the sensor IC 4. In other Embodiments, the dust-proofing effect of the light shield member 5 is explained for configurations using another component (dust-proofing member 7).

Figure 3:
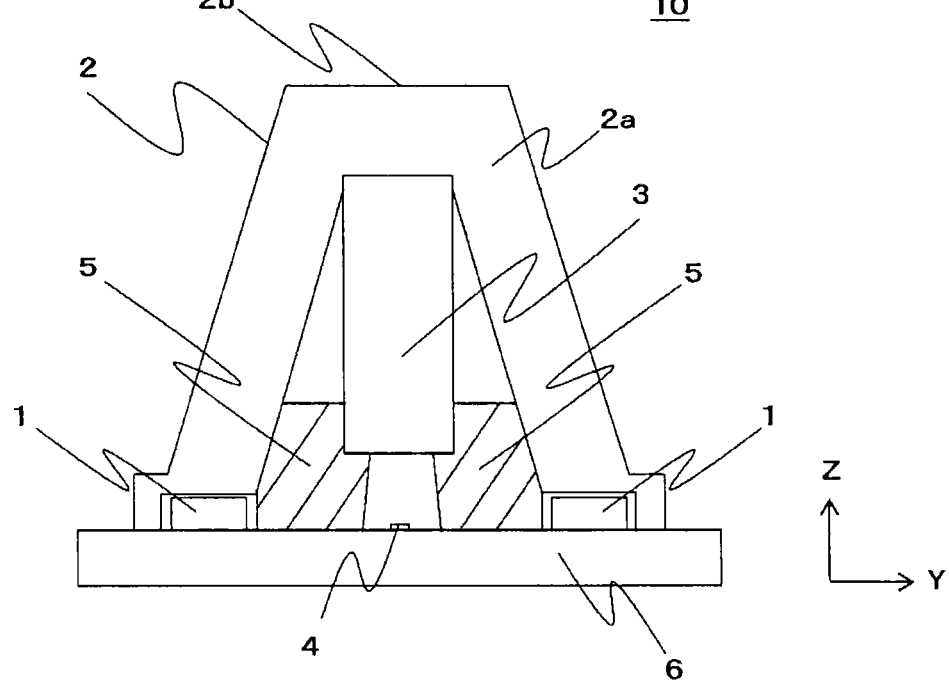
FIG. 3 is a cross-sectional view of the image reader according to Embodiment 1 of the present disclosure.
Figure 4:
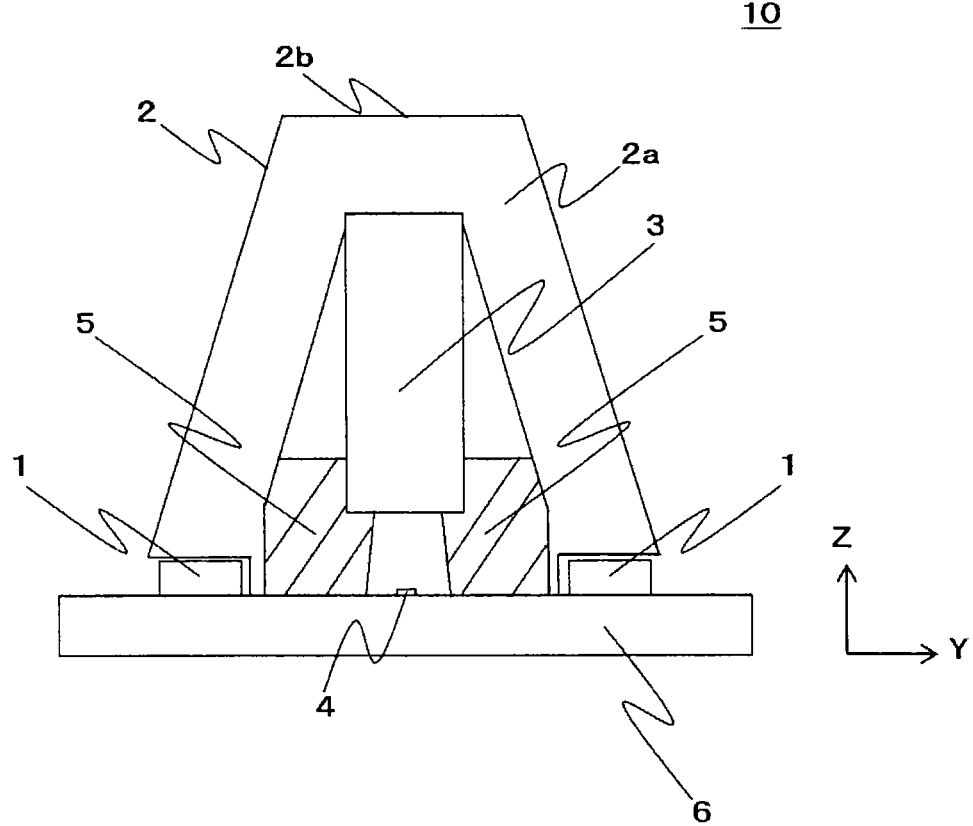
FIG. 4 is a cross-sectional view of the image reader according to Embodiment 1 of the present disclosure.

In addition, as illustrated in FIGS. 3 and 4, the light-source elements 1 may be covered by the transparent member 2 to accomplish the dust-proofing effect. FIGS. 3 and 4 are cross-sectional views of the image reader 10 at the YZ plane (virtual plane) defined by the Y axis and the Z axis as in FIGS. 2A to 2E, and are each a cross-sectional view of a part where the light-source elements 1 are disposed. First, according to the image reader 10 illustrated in FIG. 3, end portions of the transparent member 2, which are surfaces arranged opposite to the retainer space that retains the imaging optical system 3 and that are located at the opposite side to the object-to-be-read M, protrude and are in contact with the board 6 along the main scanning direction at both of the front and the back in the sub-scanning direction. According to this structure, the protruding portions of the transparent member 2 illustrated in FIG. 3 can accomplish the dust-proofing function. Hence, the sensor IC 4 can be protected from dust even if the dust-proofing function of the light shield member 5 alone is deficient. In addition, since the protruding portions of the transparent member 2 have the dust-proofing function, the light-source elements 1 are also protected from dust. Next, according to the image reader 10 illustrated in FIG. 4, the end portions of the transparent member 2 opposite to the object-to-be-read M extend between the plurality of light-source elements 1 (light source array) disposed as an array and the light shield member 5, and are in contact with the board 6 along the main scanning direction. According to this structure, the extended portions of the transparent member 2 illustrated in FIG. 4 can accomplish the dust-proofing function. Hence, the sensor IC 4 can be protected from dust even if the dust-proofing function of the light shield member 5 alone is deficient. Needless to say, a combination of the protruding portions of the transparent member 2 illustrated in FIG. 3 and in FIG. 4 may be employed.

Electronic components, such as the light-source elements 1, the sensor IC 4, an external connector 8 and a signal processor IC 11 such as an IC using an ASIC (Application Specific Integrated Circuit) are mounted on the board 6. In conjunction with a CPU (Central Processing Unit) 12a and RAM (Random Access Memory) 12b, the signal processor IC 11 performs signal processing on, for example, the photoelectric conversion output received through the sensor IC 4. The CPU 12a, the RAM 12b and a signal processing circuit 12c in the signal processor IC 11 are collectively referred to as a signal processor 12. The external connector 8 is utilized as an input/output signal interface for the photoelectric conversion output by the sensor IC 4, and other signal processing outputs.

Figure 5:
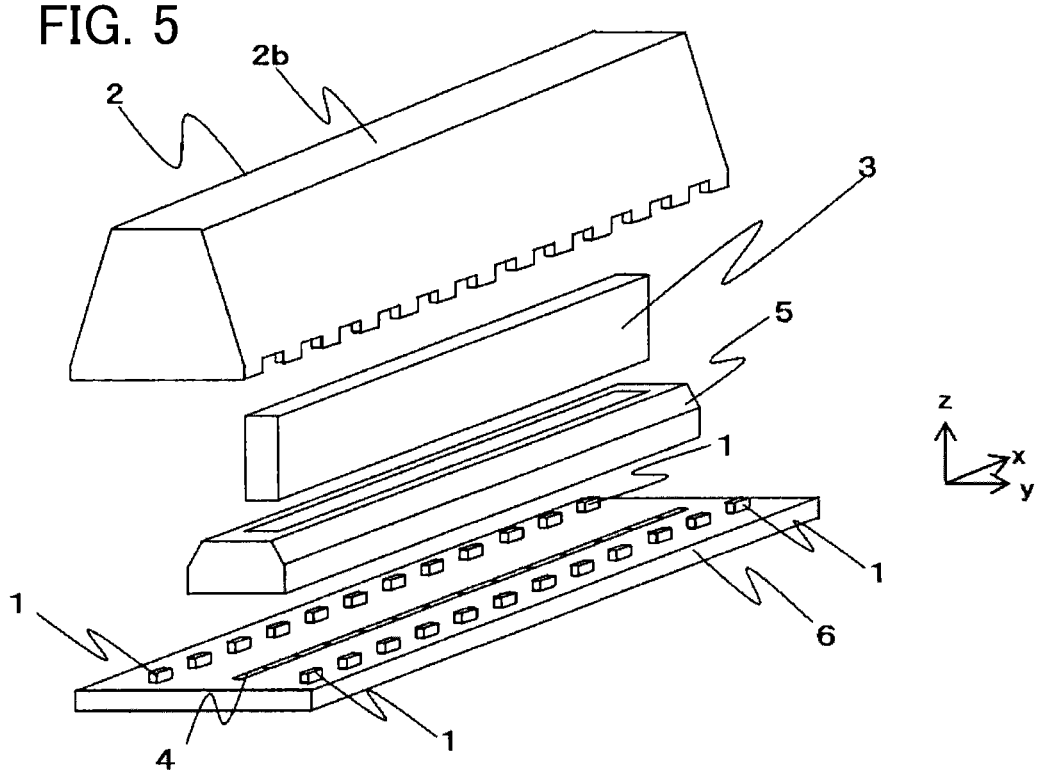
FIG. 5 is an illustrated parts breakdown (exploded perspective view) of the image reader according to Embodiment 1 of the present disclosure.

FIG. 5 is an illustrated parts breakdown (exploded oblique drawing) of the image reader according to Embodiment 1. The image reader according to Embodiment of the present disclosure includes the transparent member 2, the imaging optical system 3 and the sensor IC 4, which have lengths equal to or greater than the effective reading width of the object-to-be-read M (effective reading width in main scanning direction). In FIG. 5, the reference sign of the light-source elements 1 is indicated only for the light-source elements (in the figure, four elements) disposed at the ends in the main scanning direction (X-axis direction) of the light source, and such indication is omitted for the other elements.

According to the image reader 10 shown in FIG. 1 to FIG. 5, the transparent member 2 retains the imaging optical system 3 and the light shield member 5 in the retainer space, and covers a part of the imaging optical system 3 at the object-to-be-read-M side and the light shield member 5. In addition, the explanation is given of an example case in which fasteners of the image reader 10 of the present disclosure (engagement portion 2c, engagement portion 2d, boss 2e, screw 9, clip 16, clip 17, adhesive 18, and elastic member 19) fasten the transparent member 2 to the board 6, and the pressing force from the board 6 by this fastening causes the light shield member 5 and the imaging optical system 3 to be in contact with the transparent member 2. However, the fasteners of the image reader 10 of the present disclosure (engagement portion 2c, engagement portion 2d, boss 2e, boss 2f and engagement portion 2g) can fasten the transparent member 2 to the board 6, and the pressing force from the board 6 by this fastening can bring the light shield member 5 into contact with the transparent member 2. Likewise, the transparent member 2 can be fastened to the board 6, and the pressing force from the board 6 by this fastening can cause the imaging optical system 3 to be in contact with the transparent member 2 via the light shield member 5. The illustration of the image reader 10 in such a configuration is omitted.

The engagement portion 2c is explained later with reference to FIGS. 6 to 9. The engagement portion 2d, boss 2e, screw 9, clip 16, clip 17, adhesive 18, and the elastic member 19 are explained in Embodiment 5. In addition, in the image reader of the present disclosure, the fastener may be understood as a fastener that further includes a part of the transparent member 2 or the board 6 related to the fastening of the transparent member 2 with the board 6 by the engagement portion 2c, engagement portion 2d, boss 2e, screw 9, clip 16, clip 17, adhesive 18 and elastic member 19.

When the transparent member 2 is fastened to the board 6 by the fastener (engagement portion 2c, engagement portion 2d, boss 2e, boss 2f and engagement portion 2g), and the pressing force from the board 6 by this fastening causes the light shield member 5 to be in contact with the transparent member 2, or when, by the fastener (engagement portion 2c, engagement portion 2d, boss 2e, boss 2f and engagement portion 2g), the imaging optical system 3 is brought into contact with the transparent member 2 but the imaging optical system 3 is not in contact with the transparent member 2 at the tip of the imaging optical system 3 at the object-to-be-read-M side, that is, at a portion facing a part of the transparent member 2 through which reflected light from the object-to-be-read M passes, as illustrated in FIG. 2B, the space S can be formed between the portion of the transparent member 2 through which reflected light from the object-to-be-read M passes and a portion of the imaging optical system 3 facing that portion (tip of imaging optical system 3 at object-to-be-read-M side).

When the space S is formed, Fresnel reflection can be caused when reflected light from the object-to-be-read M travels to the space S from the transparent member 2. If such reflection occurs, Fresnel reflection can be suppressed if the space S is filled as in the image reader 10 illustrated in FIG. 2C with a transparent resin 2r, i.e. a resin having transparency (suitably having the same or similar refraction index as that of the transparent member 2). For to the image readers 10 illustrated in FIGS. 2B and 2C, like the image reader 10 illustrated in FIG. 2A, the same condition is illustrated as in the configuration in which the end portion of the imaging optical system 3 at the object-to-be-read-M side is in contact with the transparent member 2. That is to say, according to the image reader 10 illustrated in FIGS. 2B and 2C, in order to fasten the imaging optical system 3 to the transparent member 2, only the plate that supports the plurality of lenses in the imaging optical system 3, or the plate and a portion of the imaging optical system 3 that is not optically functional, is in contact with the transparent member 2.

Needless to say, when the space S is filled beforehand with the transparent resin 2r, like the image reader 10 illustrated in FIG. 2D, it is unnecessary to cause the transparent member 2 to be contacted with only the plate supporting the plurality of lenses in the imaging optical system 3 or the plate and the portion of the imaging optical system 3 that is not optically functional. The example image reader 10 according to Embodiment 6 illustrates a configuration in which the adhesive 21 is applied as the transparent resin 2r to fasten the imaging optical system 3 to the transparent member 2. In addition, like the image reader 10 illustrated in FIG. 2D, the transparent member 2 can be brought into contact with only the plate supporting the plurality of lenses in the imaging optical system 3 or the plate and the portion of the imaging optical system 3 that is not optically functional, and the imaging optical system 3 may be fastened to the transparent member 2 using the below-described adhesive 21. When a resin is applied at the outer circumference of the contact faces of the imaging optical system 3 and of the transparent member 2, more specifically, when the outer circumference of the imaging optical system 3 is limited to the plate supporting the plurality of lenses in the imaging optical system 3 or the plate and the portion of the imaging optical system 3 not optically functional (a portion not optically functional), the transparent resin 2r can be non-transparent, such as a colored resin having a light shielding function.

Still further, the Fresnel reflection can be suppressed by, not filling the space S with the transparent resin 2r but rather by using a transparent member 2 having a cut-out portion, which is a portion between the imaging optical system 3 and the object-to-be-read M and which is the optical path for reflected light from the object-to-be-read M, and by opening the space S through this cut-out 2n. In this case, as illustrated in FIG. 2E, the cut-out 2n (cut-out portion 2n) is preferably tapered so as to decrease in width toward the imaging optical system 3 from the object-to-be-read M. The tapered structure can reduce the reflection (scattered reflection) of the reflected light from the object-to-be-read M in the cut-out portion 2n. Yet still further, a black resin of low reflectivity or adonization of the surface of the cut-out portion 2n may be used to accomplish the light shielding effect.

According to the image reader 10 illustrated in FIGS. 2B, 2C and 2E, a structure is illustrated in which the transparent member 2 brought into contact with, in the main scanning direction (X-axis direction), only the plate supporting the plurality of lenses in the imaging optical system 3 or the plate and the portion of the imaging optical system 3 that is not optically functional. Needless to say, according to the image reader of the present disclosure, the transparent member 2 may be brought into contact with, in the sub-scanning direction (Y-axis direction), only the plate supporting the plurality of lenses in the imaging optical system 3 or the plate and the portion of the imaging optical system 3 that is not optically functional. In this case, when the lens of the imaging optical system 3 at the end in the main scanning direction can be optically disabled, the transparent member 2 is brought into contact with, in the sub-scanning direction, the plate in the imaging optical system 3 and the portion of the imaging optical system 3 that is not optically functional or, the portion of the imaging optical system 3 that is not optically functional. Needless to say, the transparent member 2 can be brought into contact with the imaging optical system 3 in both main scanning direction and sub-scanning direction.

As is explained with reference to FIG. 2E, the cut-out 2n may be tapered, but when a technology for "causing the object-to-be-read feeding side face 2b to have a lens function" is applied to the tapered cut-out 2n, a lens is fitted in the cut-out 2n. In this case, the tapered cut-out 2n may decrease in width toward the object-to-be-read M from the imaging optical system 3, which is a change in width opposite to that of the above explanation. Needless to say, when the lens is fastened to the cut-out 2n, the cut-out 2n does not need to be tapered. The cut-out 2n may be formed with a stepped portion, and the lens may be fastened thereto. In Embodiments other than Embodiment 1, although the illustration of the space S and the cut-out 2n (including the tapered cut-out) are omitted, the space S and the cut-out 2n (including the tapered cut-out) can be formed in the transparent member 2.

Figure 6:
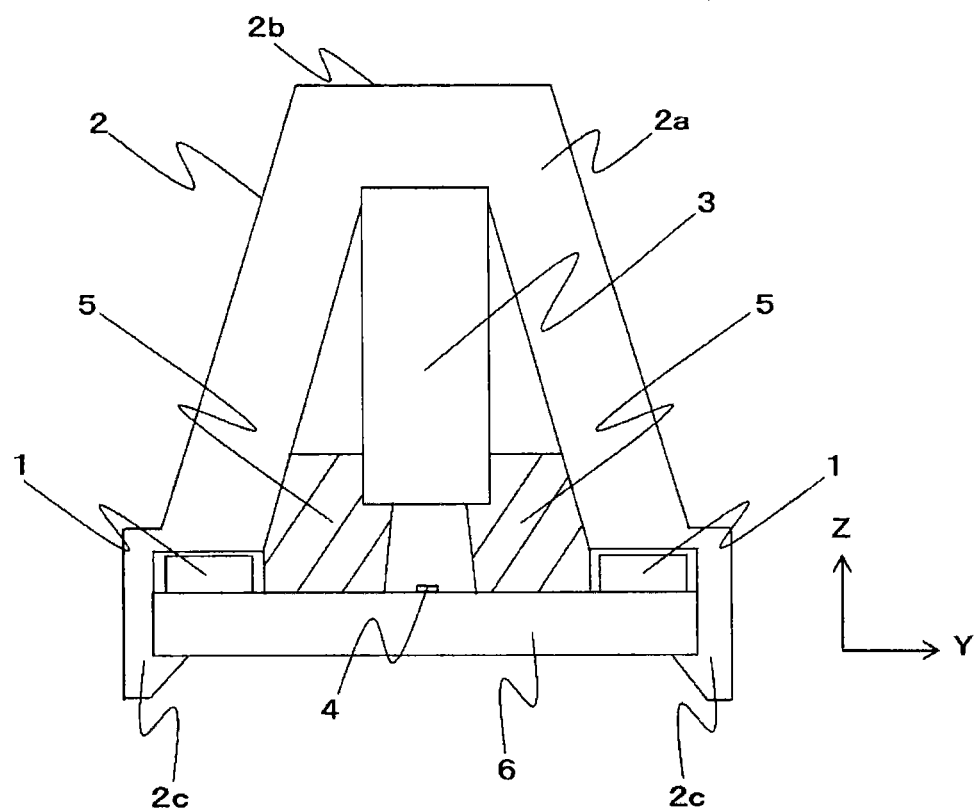
FIG. 6 is a cross-sectional view of the image reader according to Embodiment 1 of the present disclosure.
Figure 7:
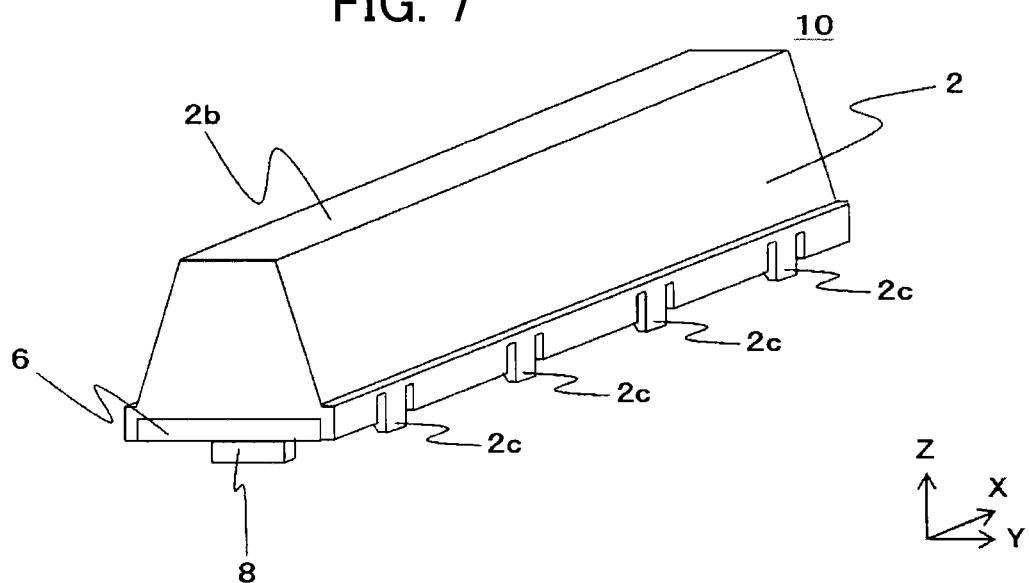
FIG. 7 is a perspective view of the image reader according to Embodiment 1 of the present disclosure.

FIGS. 6 to 9 illustrate example methods of fastening (fasteners) the transparent member 2 to the board 6. FIGS. 6 and 7 illustrate a configurations in which multiple protrusions with respective barbs for fastening the board, that is, the engagement portions 2c (fasteners) are provided at several locations of the transparent member 2 at the board-6 side. FIG. 6 is a cross-sectional view of FIG. 7. More specifically, FIG. 6 is a cross-sectional view at the YZ plane (virtual plane) defined by the Y axis and the Z axis in the image reader 10 in FIG. 7, and is a cross-sectional view of a portion where the light-source elements 1 are disposed. According to the image reader 10 in FIGS. 6 and 7, the light-source element 1 and the engagement portion 2c face one another in the sub-scanning direction (Y-axis direction). Needless to say, the light-source element 1 and the engagement portion 2c do not necessarily face one another in the sub-scanning direction. In addition, the engagement portion 2c may be a single protrusion elongated in the main scanning direction. However, if the rigidity of the protrusion is increased and the board 6 cannot be held well, as illustrated in FIGS. 6 and 7, the protrusion is preferably divided into several portions and formed at several locations in the main scanning direction. More specifically, a total of eight fasteners are formed, four at each side, in the main scanning direction in FIGS. 6 and 7. Hence, the engagement portions 2c (fasteners) illustrated in FIGS. 6 and 7 can be understood as the fasteners that hold and fasten the board 6. The engagement portions 2c (fasteners) in FIGS. 6 and 7 are formed integrally with the transparent member 2. Needless to say, the engagement portions 2c (fasteners) may be separate components from the transparent member 2.

Figure 8:
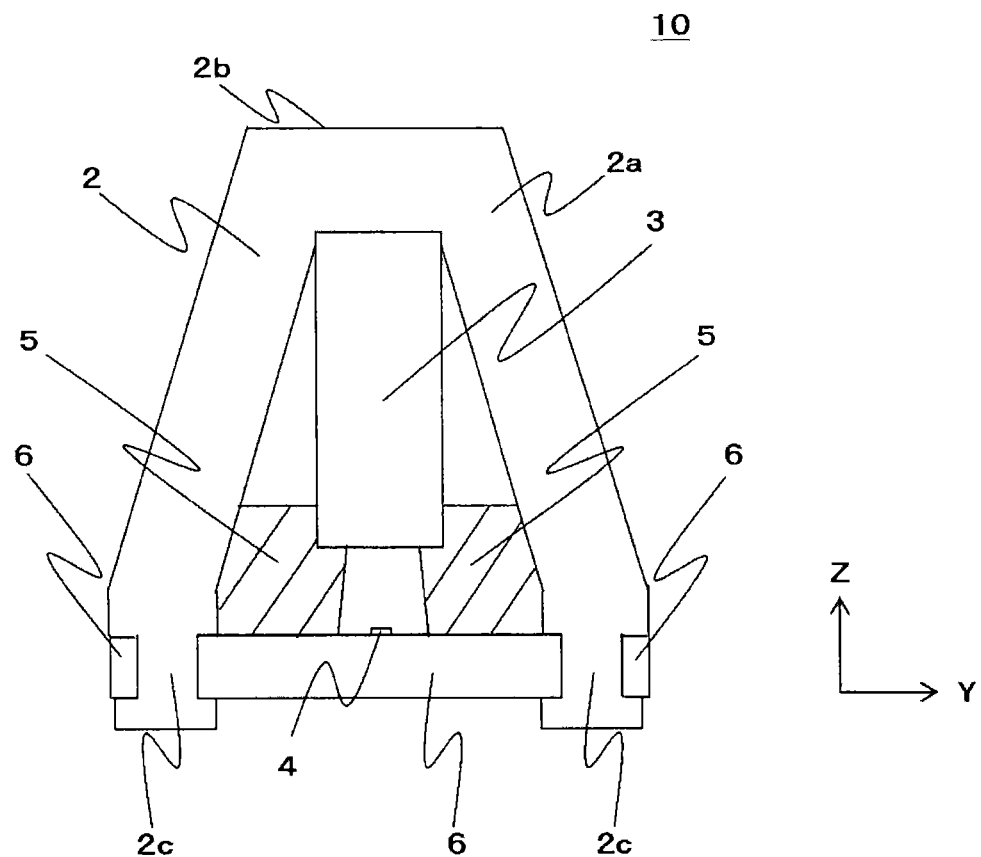
FIG. 8 is a cross-sectional view of the image reader according to Embodiment 1 of the present disclosure.

FIG. 8 is a cross-sectional view at the YZ plane (virtual plane) defined by the Y axis and the Z axis in the image reader 10 as in FIGS. 2 and 6, but is a cross-sectional view of a portion where no light-source element 1 is disposed. FIG. 8 corresponds to a configuration in which a hole (multiple holes) is formed between the adjoining light-source elements 1 disposed side by side in an array along the main scanning direction, that is, formed in areas where no light-source element 1 is disposed at the board-6 side, and protrusions (engagement portions 2c) are formed at the portions of the transparent member 2 at the board-6 side facing the respective holes. In a state in which these protrusions (engagement portions 2c) fit in the holes of the board 6, the protrusions (engagement portions 2c) of the transparent member 2 are melted and fusion bonded. In other words, the fasteners are portions that pass through the board 6 and are fusion bonded.

Next, FIG. 9 corresponds to a case in which a hole (multiple holes) is formed between the adjoining light-source elements 1 disposed side by side in an array along the main scanning direction, that is, formed in areas where no light-source element 1 is disposed at the board-6 side, and screw holes are formed in the portions of the transparent member 2 at the board-6 side facing the respective holes. That is to say, FIG. 9 illustrates a case in which screw fastening is performed using screws (engagement portions 2c). More specifically, the screws (engagement portions 2c) are inserted in the screw holes of the transparent member 2 through the holes of the board 6 from the other surface side thereof, and are tightened. Note that a set of the screw and the screw hole can be referred to as the engagement portion 2c (fastener) rather than only referring to the screw as the engagement portion 2c (fastener), and the three members that are the screw, the hole (of the board 6) and the screw hole can be collectively referred to as the engagement portion 2c (fastener).

Hence, the engagement portions 2c (fasteners) illustrated in both FIGS. 8 and 9 pass through the board 6 and fasten the board. The engagement portions 2c (fasteners) in FIG. 8 are formed integrally with the transparent material 2. Needless to say, the engagement portions 2c (fasteners) in FIG. 8 can be separate parts from the transparent member 2. In addition, the forms of the engagement portions 2c (fasteners) illustrated in FIGS. 8 and 9 can be combined. For example, the engagement portions 2c (fasteners) in FIG. 9, that is, portions where the screws are applied to position accurately the transparent member 2 and the board 6 relative to one another, and after this accurate positioning, the engagement portions 2c (fasteners) in FIG. 8 can be fusion bonded. This can facilitate the assembly of the image reader 10. The respective forms of the engagement portions 2c (fasteners) in FIGS. 8 and 9 can be combined with the form of the engagement portion 2c illustrated in FIG. 6 (or FIG. 7).

Figure 10A:
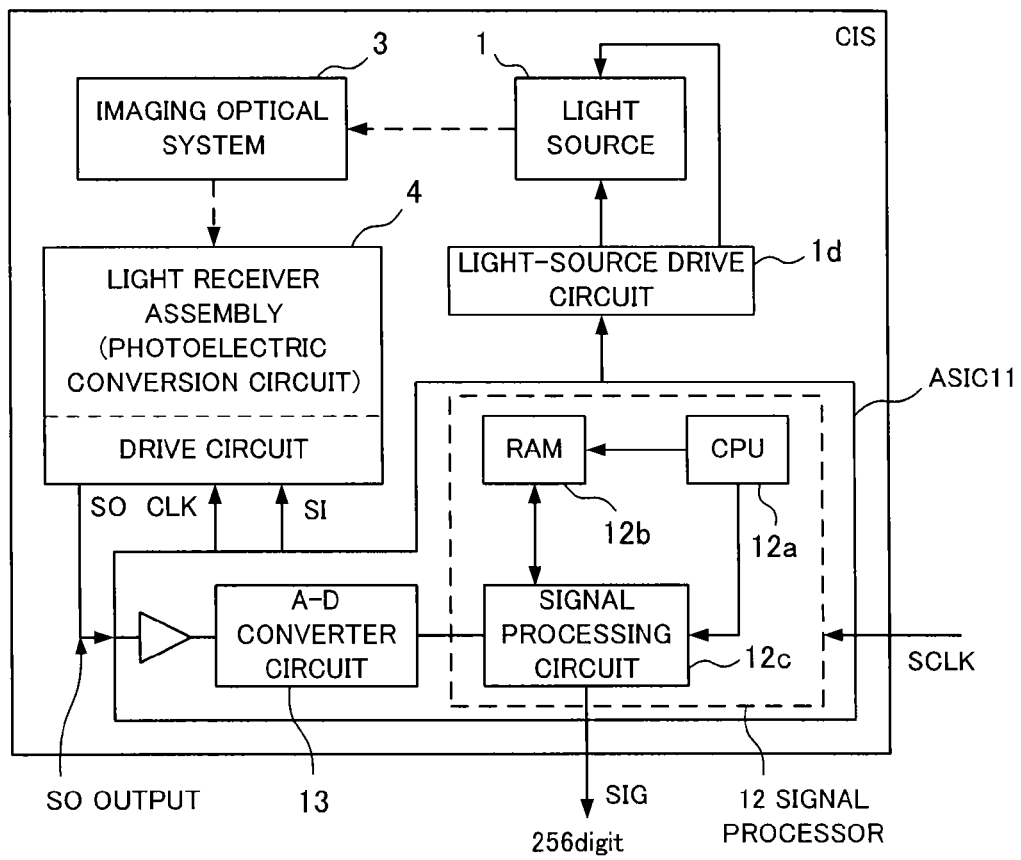
FIGS. 10A to 10C illustrate a functional block diagram and graphs of the image reader according to Embodiment 1 of the present disclosure.

Here, operation of the image reader 10 according to Embodiment 1 is explained. The image reader 10 to be explained includes the built-in light-source elements 1, and light emitted by the light-source elements 1 is guided through the interior of the transparent member 2. That is to say, this is a configuration in which the transparent member 2 serves as the light guide 2. FIG. 10A is a functional block diagram of the image reader 10 of Embodiment 1. In addition, FIG. 10A illustrates an example configuration in which the signal processor IC 11 is an ASIC 11. Firstly, in conjunction with the CPU 12a, the ASIC 11 transmits a light-source turn-on signal to a light-source drive circuit 1d. The light-source drive circuit 1d supplies power for a predetermined time to each of the plurality of light-source elements 1 based on the received light-source turn-on signal. Illumination light emitted by the light-source elements 1 enters the interior of the transparent member 2 (light guide 2), is transmitted or reflected repeatedly, and is emitted to the object-to-be-read M. The image reader 10 may drive and control the light-source elements 1 even in a configuration in which the light-source elements 1 are located outside the image reader 10 or in which light from the light-source elements 1 does not enter the interior of the transparent member 2 but rather is emitted directly to the object-to-be-read M.

Figure 10B:
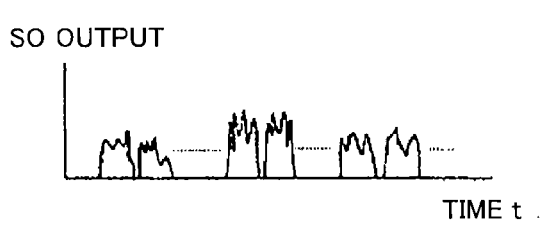

The light reflected by the object-to-be-read M is focused on the sensor IC 4 by the imaging optical system 3. The sensor IC is a light receiver assembly (photosensitive elements) including, for example, a semiconductor chip that receives the focused light, performs photoelectric conversion, outputs electric signals, and is equipped with other drive circuits and the like. The light receiver assembly obtains an analog output (SO) having undergone photoelectric conversion at the timing of a start signal (SI) synchronized with a clock signal (CLK) of the CIS and in synchronization with a system clock (SCLK) of a timing generator. An example SO is indicated in the graph of FIG. 10B. In this graph, an output value is plotted along the vertical axis, and time (t: Time) is plotted along the horizontal axis.

Figure 10C:
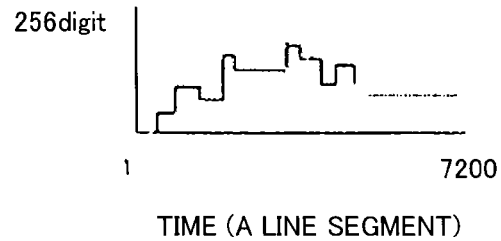

In FIG. 10A, as explained above, the CPU 12a, the RAM 12b and the signal processing circuit 12c in the ASIC 11 (signal processor IC 11) are collectively referred to as a signal processor 12. The SO is subjected to analog to digital (A-D) conversion by an A-D converter 13, and the signal processing circuit 12c performs shading correction including processing such as sample holding and all-bit correction. In order to correct the signal data, data is acquired from a RAM area storing signal data and from a RAM area storing reference data, and after mathematical processing, the image data of the object-to-be-read M is output as digital output (SIG). This image data can be transmitted to a device external to the image reader 10, or can be subjected to a further image processing in the image reader 10, and then can be transmitted to the external device. An example SIG is illustrated in the graph of FIG. 10C (256 digit). The output value of this graph is plotted along the vertical axis, and time (as a line segment) is plotted along the horizontal axis. This type of plot is obtained because the image reader 10 is a line sensor. That is to say, the image reader 10 reads the object-to-be-read M line by line in the main scanning direction, and the object-to-be-read M is fed in the sub-scanning direction for scanning of the next line.

Figure 11:
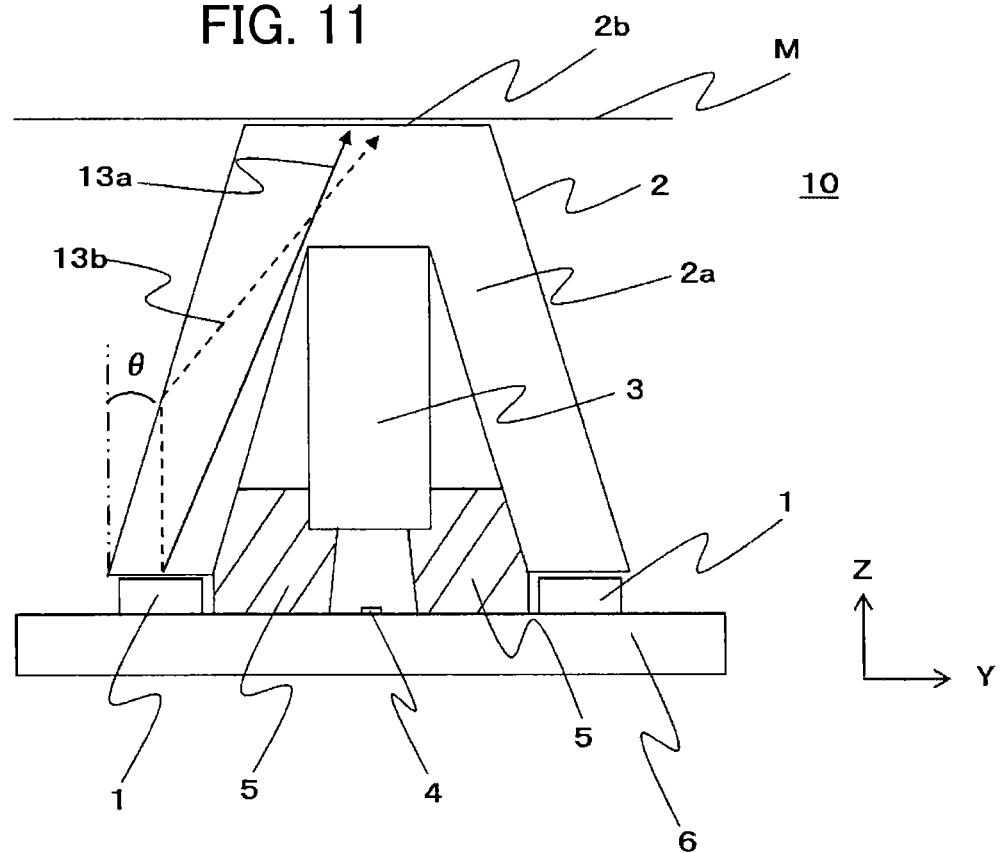
FIG. 11 is a cross-sectional view of the image reader according to Embodiment 1 of the present disclosure.

Next, with reference to FIG. 11, the path is explained (optical path) through which illumination light emitted by the light-source elements 1 enters the transparent member 2 (light guide 2) and is repeatedly transmitted and reflection therein to be emitted to the object-to-be-read M, among the operations of the image reader of Embodiment 1. The image reader 10 illustrated in FIG. 11 (cross-sectional view) employs the same structure as that of the image reader 10 in FIGS. 2A to 2E, and FIG. 11 illustrates a portion of the path for illumination light from the light-source elements 1. The figures of the present disclosure including FIG. 11 illustrate light entering from the array of light-source elements 1 arrayed along the main scanning direction (X-axis direction) at one side of the light guide portion 2a. In the figure, the path for light (optical path) is illustrated at the left portion of the light guide portion 2a.

The path for illumination light from the light-source elements 1 reflects light at least two times by, in the light guide portion 2a of the light guide 2, the internal surface at the imaging-optical-system-3 side (hereinafter, referred to as the "internal side face of the light guide portion 2a"), and an external surface that is an opposite surface to this internal surface (hereinafter, referred to as the "external side face of the light guide portion 2a") to illuminate the object-to-be-read M or to propagate in the main scanning direction (X-axis direction). However, as illustrated in FIG. 11, the major path includes a first path 13a in which the light is reflected at least two times by the internal side face of the light guide portion 2a and the external side face thereof without illuminating the object-to-be-read M, and a second path 13b in which the light is reflected once by the external side face of the light guide portion 2a to illuminate the object-to-be-read M by the reflected light. The first path 13a is a light path for the transmission of light without reflection by the light guide portion 2a in the light guide 2. In the figure, this light path is indicated by a thick line. The second path 13b is a reflective optical path that reflects the light once by the light guide portion 2a in the light guide 2, and then allows the light to propagate. In the figure, this optical path is indicated by a dotted line.

Note that the transparent member 2 (light guide 2) includes both end faces in the main scanning direction (X-axis direction) of the transparent member 2 (light guide 2), the internal side face of the light guide path 2a, the external side face thereof, the object-to-be-read feeding side face 2b and a surface that faces the object-to-be-read feeding side face 2b in the optical-axis direction (Z-axis direction) of the imaging optical system 3, and that allows reflected light from the object-to-be-read M to pass through the object-to-be-read feeding side face 2b and emits the light to the imaging optical system 3 through the transparent member 2 (light guide 2). The surface that emits light from the transparent member 2 (light guide 2) to the imaging optical system 3 can be understood as a part of the internal side face of the light guide portion 2a.

The first path 13a illustrated in FIG. 11 is a path in which light emitted by the light-source elements 1 passes through the incident surface of the transparent member 2, travels in the light guide portion 2a, passes through the object-to-be-read feeding side face 2b (is emitted from the object-to-be-read feeding side face 2b), and reaches directly the object-to-be-read M. The second path 13b illustrated in FIG. 11 is a path in which light emitted from the light-source elements 1 in the direction perpendicular to the object-to-be-read M is reflected once by the external side face of the light guide portion 2a in the light guide 2, travels in the light guide portion 2a, passes through the object-to-be-read feeding side face 2b (is emitted from the object-to-be-read feeding side face 2b), and reaches the object-to-be-read M. When light is reflected by the external side face of the light guide portion 2a, if the reflection is total reflection, the reflection loss is minimized, and thus illumination can be performed with efficiency. In addition, as explained previously, there is also a light path in which light is repeatedly reflected multiple times in the light guide portion 2a, and reaches the object-to-be-read M. Hence, efficient illumination can be performed by design such that the entire light incident on the transparent member 2, rather than just the light in the first path 13a and the second path 13b, is guided to the object-to-be-read M by total reflection.

The following formula (1) is required to be satisfied in order that light at all angles incident on the transparent member 2 including the second path 13b illustrated in FIG. 11 undergoes total reflection by the light guide portion 2a, where n is the refractive index of the transparent member 2, and θ is the inclination of the light guide portion 2a of the transparent member 2. Note that as illustrated in FIG. 11, θ is the narrower angle of the two angles at the YZ plane defined by an intersection of a line parallel to the Z-axis direction (a line indicated by two-dot chain line as an auxiliary line) with the external side face of the light guide portion 2a. In addition, the "paths in which light travels through the light guide portion 2a, passes through the object-to-be-read feeding side face 2b (is emitted from the object-to-be-read feeding side face 2b) and reaches directly the object-to-be-read M" including the first path 13a do not need to satisfy the formula (1). The reason for explaining that first path 13a is included in the above-defined paths is that the second path 13b indicates only the path propagating along the YZ plane.

[Formula 1]

$$\sin 90° \leq n \cdot \sin(49.2-\theta) \quad \text{Formula (1)}$$

In the formula (1), when n=1.5, θ satisfies the condition that θ≤7.4 degrees. Hence the inclination θ of the light guide portion 2a is preferably set to be equal to or smaller than 7.4 degrees so as to satisfy the formula (1). In Embodiment 1, the thickness of the transparent member 2 (light guide 2) in the Y-axis direction from the internal side face of the light guide portion 2a to the external side face thereof is uniform except for a portion transmitting reflected light from the object-to-be-read M. Accordingly, light reflected totally by the surface of the light guide portion 2a enters another surface of the light guide portion 2a at the same angle, and continues propagating in the transparent member 2 by total reflection. According to Embodiment 1, as explained above, the light guide portion 2a of the transparent member 2 has uniform thickness in the Y-axis direction except the portion transmitting reflected light from the object-to-be-read M, but in order to promote total reflection in the light guide portion 2a, a structure may be employed in which the light guide 2a of the transparent member 2 becomes thicker as the surface of the light guide portion 2a is approached to the object-to-be-read M.

The image reader of Embodiment 1 employs a structure in which light is guided to the object-to-be-read M by total reflection. Hence, in view of the formula (1), although the inclination angle changes according to the refractive index n of the transparent member 2, the selected value of the inclination θ of the light guide portion 2a is small. However, if the value of the inclination θ of the light guide portion 2a is too small, the path that is the first path 13a, among the major paths for light emitted by the light-source elements 1, intersects the imaging optical system 3, and becomes a path in which light is reflected two or more times by the internal side face of the light guide portion 2a and the external side face thereof. Therefore, in order to allow the first path 13a to be present, the imaging optical system 3 is required to be disposed at a location out of a virtual plane through which pass two virtual lines, i.e. a first virtual line that passes through the array of intersection points of the optical axes of the plurality of lenses forming the imaging optical system 3 with the object-to-be-read M, and a second virtual line passing through the array of the disposed plurality of light-source elements 1. The virtual plane is a plane orthogonal to the YZ plane, and among the lines of intersection between the virtual plane and the YZ planes, one line within the transparent member 2 (light guide 2) is the first path 13a. In addition, the first virtual line and the second virtual line are virtual lines parallel to the main scanning direction (X-axis direction). In particular, the second virtual line passing through the array of the disposed plurality of light-source elements 1 passes through a portion where the light-source elements 1 emit light.

Embodiment 2

Figure 12:
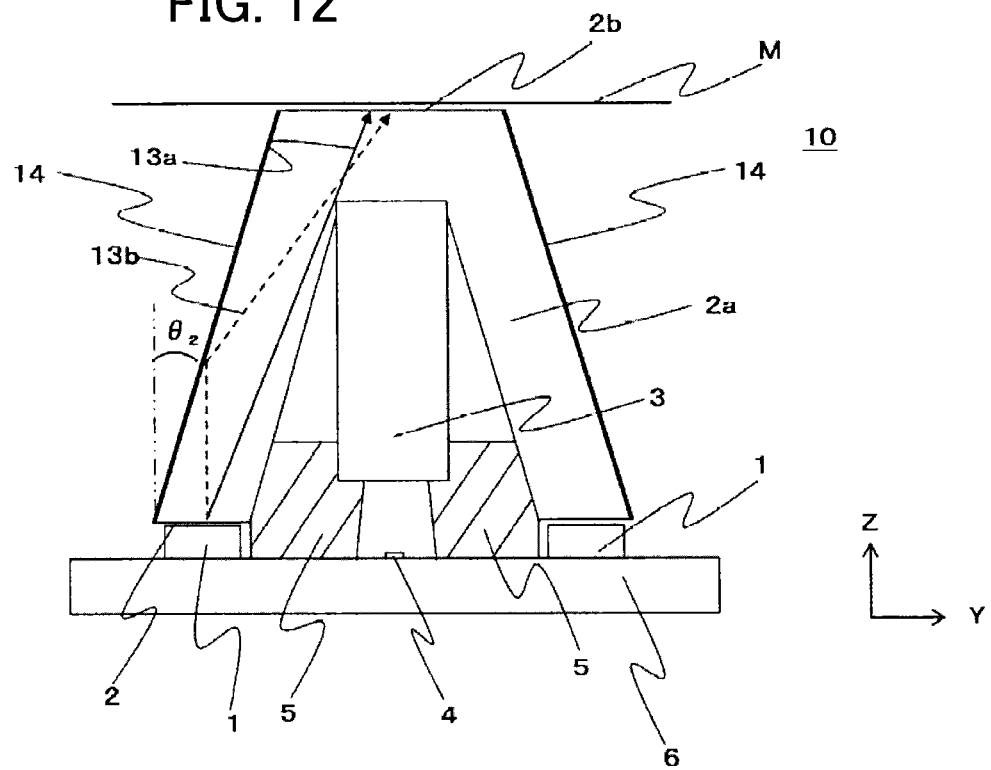
FIG. 12 is a cross-sectional view of an image reader according to Embodiment 2 of the present disclosure.

Embodiment 2 of the present disclosure is explained with reference to FIGS. 12 and 13. FIG. 12 is a cross-sectional view of an image reader according to Embodiment 2. FIG. 12 is a cross-sectional view of the image reader 10 at a plane parallel to the YZ plane defined by the Y axis and Z axis. More specifically, this is a cross-sectional view of a portion that intersects one of the plurality of light-source elements 1 arrayed in the main scanning direction (X-axis direction). In particular, this figure illustrates a configuration in which the plurality of light-source elements 1 are disposed in two rows positioned facing each other in the sub-scanning direction (Y-axis direction). In FIG. 12, the two light-source elements 1 can be seen to sandwich the sensor IC 4. Note that in Embodiments of the present disclosure, "plurality of light-source elements 1 disposed in two rows" may be expressed as a "light source array in two rows" or a "two row light source array" in some cases. In FIG. 12, the same or equivalent component in FIG. 11 used to explain Embodiment 1 is denoted by the same reference sign, and repeated explanation is omitted.

The image reader 10 illustrated in FIG. 12 (cross-sectional view) indicates a portion of the path for illumination light from the light-source elements 1. Like the image reader 10 illustrated in FIG. 11, as illustrated in FIG. 12, the major path for illuminating the object-to-be-read M includes the first path 13a in which light is reflected at least two times by the internal side face of the light guide portion 2a and the external side face thereof without illuminating the object-to-be-read M, and the second path 13b in which light is once reflected by the light guide portion 2a and illuminates the object-to-be-read M. According to the image reader of Embodiment 2, the external side face of the light guide portion 2a of the transparent member 2 (light guide 2) in the image reader of Embodiment 1 is formed as a mirror surface 14. In FIG. 12, the mirror surface 14 of the transparent member 2 (light guide 2) is a portion of the profile of the transparent member 2 indicated by a thick line. The mirror surface 14 can be formed on the external side face of the light guide portion 2a by metal vapor deposition, metal plating, or by placing a metal tape. The mirror surface 14 is formed at a portion where illumination light traveling in the Z-axis direction among light emitted by the light-source elements 1 falls on the light guide 2. In other words, it can be understood that the mirror surface 14 is formed at a part where the virtual line parallel to the Z-axis and passes through the portion of the light sources emitting light intersects the light guide 2. It can be also understood that, when the transparent member 2 includes a below-described reflection area 15, the mirror surface 14 is formed at a portion where a virtual line parallel to the Z-axis and passing through the reflection area 15 intersects the light guide 2.

As explained above, the image reader of Embodiment 1 employs a structure in which light is guided to the object-to-be-read M by total reflection. Hence, in view of the formula (1), although affected by the refractive index n of the transparent member 2, the value of the inclination θ of the light guide portion 2a tends to be small. Accordingly, the smaller the inclination θ of the light guide portion 2a, the shorter the distance between the light-source element 1 and the sensor IC 4 in Y-axis direction. Therefore, when the package of the light-source elements 1 is large, only a layout that causes the sensor IC 4 to be in contact with such a package can be selected for some configurations. Needless to say, the space for arranging the light shield member 5 is also lost. For such configurations, the sensor IC 4 is required to be mounted on the board 6 in such a way that the light-source elements 1 do not interfere with the sensor IC 4, that is, the inclination θ of the light guide portion 2a may be larger than the value obtained by the formula (1), and thus the total reflection condition for light incident to the light guide portion 2a of the light guide 2 cannot be satisfied. Since the total reflection condition cannot be satisfied, light leaks out from the transparent member 2, efficiency decreases remarkably. Hence, according to the image reader of Embodiment 2, in order to prevent light from leaking out from the transparent member 2 regardless of the inclination θ of the light guide portion 2a, the mirror surface 14 is formed on the external side face of the light guide portion 2a of the transparent member 2 (light guide 2).

According to the image reader 10 including the mirror surface 14 illustrated in FIG. 12, like Embodiment 1, the object-to-be-read M is also illuminated mainly by the first path 13a and the second path 13b. Since the external side face of the light guide portion 2a is formed as the mirror surface 14, light incident on the mirror surface 14 inevitably is reflected regularly. Hence, the image reader 10 including the mirror surface 14 does not need to satisfy the condition of the formula (1), explained in Embodiment 1, for propagating light to the object-to-be-read feeding side face 2b by total reflection in the light guide portion 2a. Light guided by the light guide portion 2a is emitted (output) as illumination light from the object-to-be-read feeding side face 2b of the transparent member 2 (light guide 2). Accordingly, in the transparent member 2 (light guide 2), incident light to the object-to-be-read feeding side face 2b from the light guide portion 2a is required to enter the object-to-be-read feeding side face 2b from the light guide portion 2a at an angle that does not cause total reflection by the object-to-be-read feeding side face 2b. FIG. 13 indicates clearly how such reflection occurs in the second path 13b.

Figure 13:
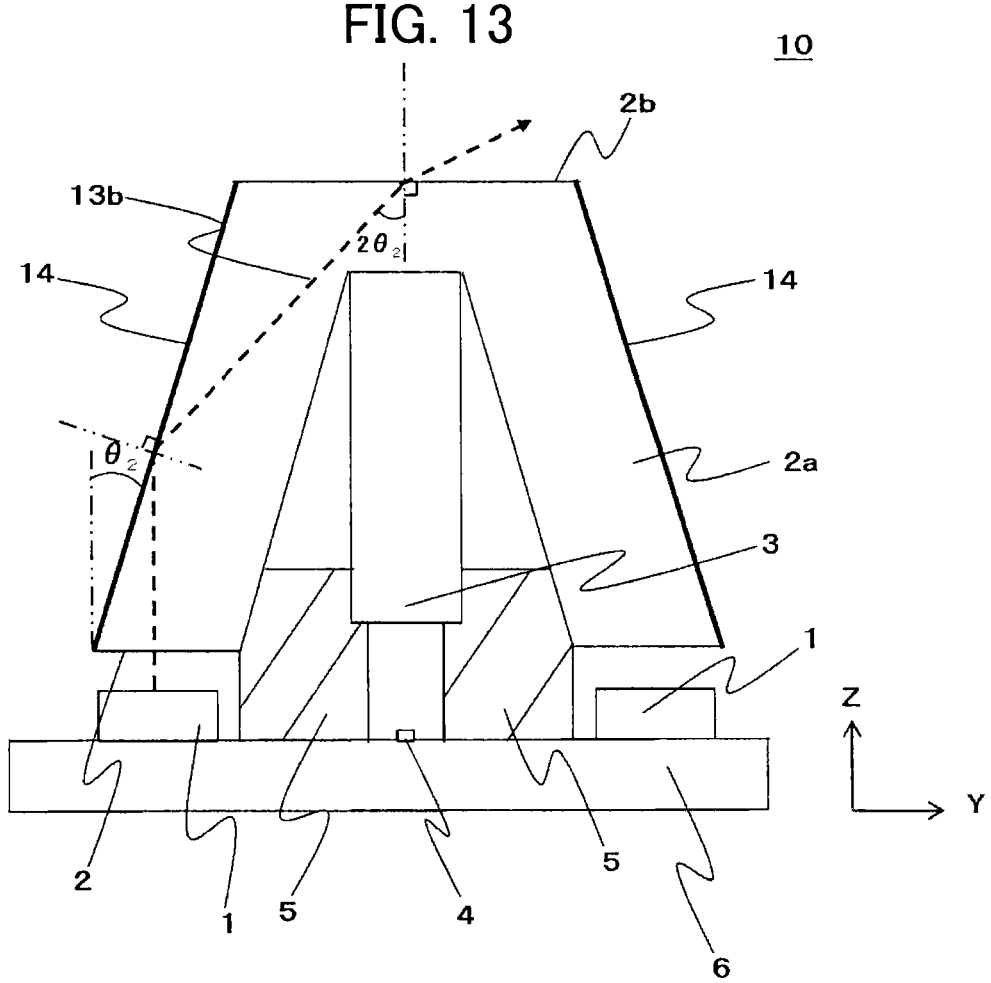
FIG. 13 is a cross-sectional view of the image reader according to Embodiment 2 of the present disclosure.

FIG. 13 is a cross-sectional view of the image reader according to Embodiment 2. FIG. 13 is the cross-sectional view of the image reader 10 at a plane parallel to the YZ plane defined by the Y-axis and the Z-axis like FIG. 12. More specifically, this is a cross-sectional view of a portion that intersects one of the plurality of light-source elements 1 arrayed in the main scanning direction (X-axis direction). In a precise sense, FIG. 13 illustrates a configuration in which the plurality of light-source elements 1 are arranged as two rows at positions in the sub-scanning direction (Y-axis direction), and thus the two light-source elements 1 can be seen to sandwich the sensor IC 4 in this figure. In FIG. 13, the same or equivalent components as those in FIGS. 12 and 11 used to explain Embodiment 1 are denoted by the same reference signs, and repeated explanation of such components is omitted.

According to the image reader illustrated in FIG. 13, in the second path 13b, light emitted from the light-source elements 1 and parallel to the Z-axis is reflected by the mirror surface 14 of the light guide portion 2a, and reaches the object-to-be-read feeding side face 2b of the transparent member 2 (light guide 2) that is parallel to the XY plane. The incident angle at this time can be determined according to the above-explained inclination θ of the light guide portion 2a. In this case, in order to distinguish this from that of Embodiment 1, in FIGS. 12 and 13, the inclination θ of the light guide portion 2a is indicated as "$θ_2$", but the definition thereof is the same. That is to say, $θ_2$ is the narrower angle of two angles in the YZ plane defined by an intersection of a line parallel to the Z-axis direction (line indicated by two-dot chain line as an auxiliary line) with the external side face of the light guide portion 2a. As is illustrated in FIG. 13, the intersection angle of light reflected by the mirror surface 14 with the Z-axis, that is, the incident angle of light reflected totally by the mirror surface 14 toward the object-to-be-read feeding side face 2b is $2θ_2$. A condition in which light reflected by the mirror surface 14 is not reflected totally by the object-to-be-read feeding side face 2b can be defined as the following formula (2). Note that the incident angle $2θ_2$ is an intersection angle of the virtual line parallel to the Z-axis direction (line indicated by two-dot chain line orthogonal to the object-to-be-read feeding side face 2b) with illumination light reflected totally by the mirror surface 14 onto the object-to-be-read feeding side face 2b. In this case, the virtual line parallel to the Z-axis direction corresponds to the optical axis of the imaging optical system 3 (optical-axis direction). In addition, the two-dot chain line orthogonal to the mirror surface 14 indicates a position where light passing through the second path 13b is reflected by the mirror surface 14.

[Formula 2]

$$\text{Sin}(2·θ_2) \leq 1/n·\text{Sin}(90°) \qquad \text{Formula (2)}$$

As explained above, when the inclination of the light guide portion 2a of the transparent member 2 is $θ_2$, and the refractive index of the transparent member 2 is n=1.5, $θ_2$ is required to satisfy the following formula (3).

[Formula 3]

$$θ_2 \leq 20.9° \qquad \text{Formula (3)}$$

The incident angle toward the object-to-be-read feeding side face 2b in the first path 13a is smaller than that of the second path 13b, and thus when the inclination (angle) $θ_2$ of the light guide portion 2a satisfies the formula (2), the first path 13a also does not cause total reflection. In addition, the condition of the formula (1) explained in Embodiment 1 is included in the formula (2), and thus no total reflection occurs when light passing through the first path 13a of the light guide portion 2a and the second path 13b thereof in the image reader of Embodiment 1 enters the object-to-be-read feeding side face 2b.

Hence, if a structure like that of the image reader of Embodiment 2 is employed, although package size of the light-source elements 1 is large and the condition defined by the formula (1) used to explain Embodiment 1 is not satisfied, bright illumination is still possible by securing of the first path 13*a* and the second path 13*b*. In addition, by providing the mirror surface 14, a light shielding effect against incident light from the exterior of the transparent member 2 can be expected. In Embodiment 2, only the external side face of the light guide portion 2*a* is formed as the mirror surface 14, but the internal side face of the light guide portion 2*a* at the imaging-optical-system-3 side (except for "the surface that faces the object-to-be-read feeding side face 2*b* in the optical-axis direction (Z-axis direction) of the imaging optical system 3, and that allows reflected light from the object-to-be-read M to pass through the object-to-be-read feeding side face 2*b* to emit such light toward the imaging optical system 3 from the transparent member 2 (light guide 2)") can be also formed as the mirror surface 14.

Although not illustrated in the figure, according to the image reader of Embodiment 2, the transparent member 2 (light guide 2) can be formed with fasteners of the image reader of Embodiment 1 (engagement portion 2*c*, engagement portion 2*d*, boss 2*e*, boss 2*f* and engagement portion 2*g*), and this transparent member 2 (light guide 2) can be connected to the board 6. The details of such fasteners are the same as those of Embodiment 1. That is to say, the image reader of Embodiment 2 can be said to be the image reader of Embodiment 1 equipped with the mirror surface 14.

Embodiment 3

Embodiment 3 of the present disclosure is explained with reference to FIGS. 14 to 21. FIGS. 14, 15A, 16, 17A, 18, 19A, 20 and 21A are each a cross-sectional view of an image reader of Embodiment 3. FIGS. 14, 15A, 16, 17A, 18, 19A, 20 and 21A are each a cross-sectional view of an image reader 10 at the plane that is parallel to the YZ plane defined by the Y axis and the Z axis. More specifically, these are cross-sectional views of a portion that intersects one of the plurality of light-source elements 1 disposed side by side in the main scanning direction (X-axis direction). FIGS. 14, 16, 18 and 20 are cross-sectional views of a portion having no fasteners, such as the engagement portion 2*c*, engagement portion 2*d*, boss 2*e*, boss 2*f* and engagement portion 2*g*. FIGS. 15A, 17A, 19A and 21A illustrate the engagement portion 2*c* as an example fastener. In these figures, the same or equivalent component is denoted by the same reference sign, and repeated explanation is omitted.

In addition, FIGS. 15B, 17B, 19B and 21B are oblique drawings of the image reader 10 illustrated in FIGS. 15A, 17A, 19A and 21A, respectively. In FIGS. 15A, 15B, 17A, 17B, 19A, 19B, 21A and 21B, a total of eight fasteners (engagement portions 2*c*) are formed, four at each side, in the main scanning direction, and the transparent member 2 is in contact with the light shield member 5 (light shield 5) at locations where no fastener is formed. Conversely, in FIGS. 14, 16, 18 and 20, the transparent member 2 is not in contact with the light shield member 5 (light shield 5) at a portion where no fastener is formed. These figures illustrate configurations in which the transparent member 2 and the fasteners are integrated with each other. These components may be formed separately. In these figures, the same or equivalent component is denoted by the same reference sign, and repeated explanation thereof is omitted.

FIGS. 14, 15A, 16, 17A, 18, 19A, 20 and 21A illustrate an optical path (path for light) in the image reader of Embodiment 3. According to the image reader of Embodiment 3, the light source array, which is disposed in two rows in Embodiments 1 and 2, is arranged in one row. Hence, as illustrated in FIG. 14 to FIGS. 21A and 21B, the transparent member 2 of the image reader of Embodiment 3 is shaped so as to expose one of the respective two side faces of the imaging optical system 3 (lens array assembly 3) and the light shield member 5 (light shield 5) along the main scanning direction (see FIGS. 14, 16, 18 and 20) or is shaped so as to expose one of the two side faces of the imaging optical system 3 (lens array assembly 3) along the main scanning direction (see FIGS. 15A, 15B, 17A, 17B, 19A, 19B, 21A and 21B). The virtual line parallel to the Z-axis direction (line indicated by two-dot chain line orthogonal to the object-to-be-read feeding side face 2*b*) orthogonal to the object-to-be-read feeding side face 2*b* illustrated in FIGS. 14, 15A, 16, 17A, 18, 19A, 20 and 21A corresponds to the optical axis of the imaging optical system 3.

Figure 14:
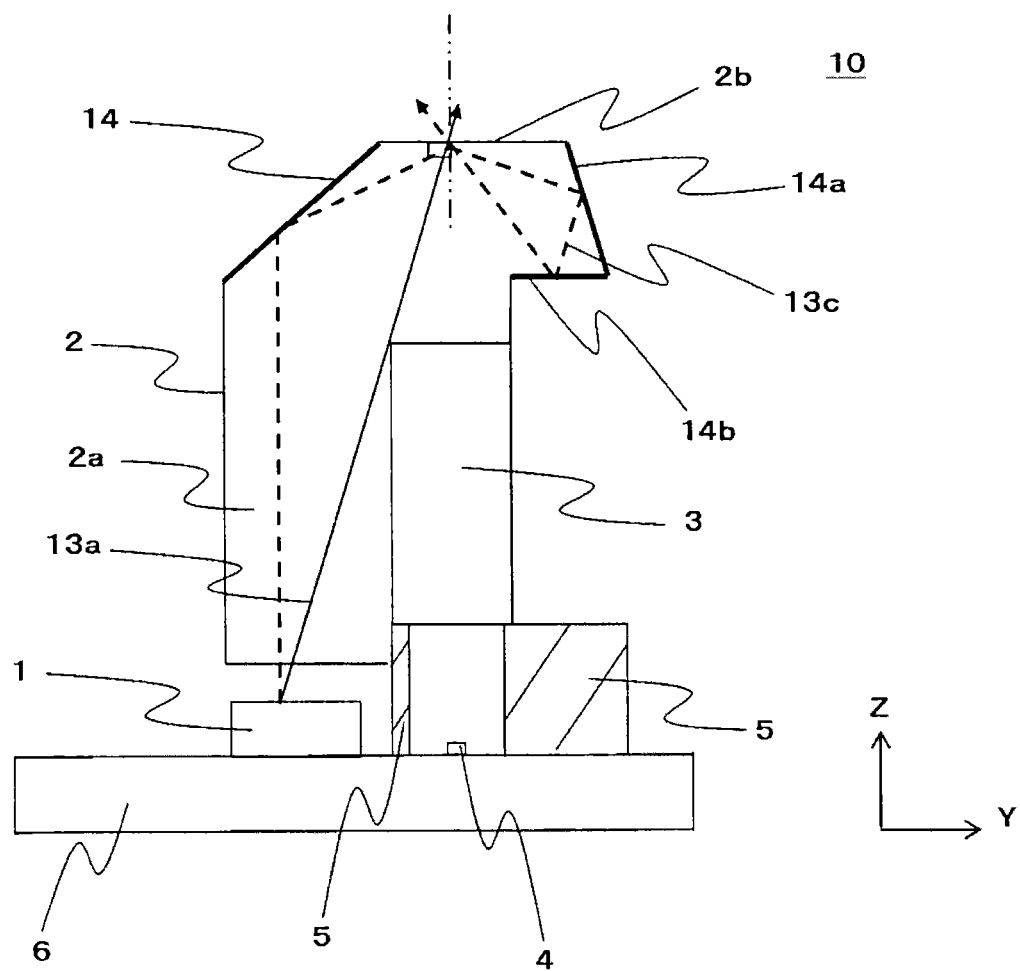
FIG. 14 is a cross-sectional view of an image reader according to Embodiment 3 of the present disclosure.
Figure 15A:
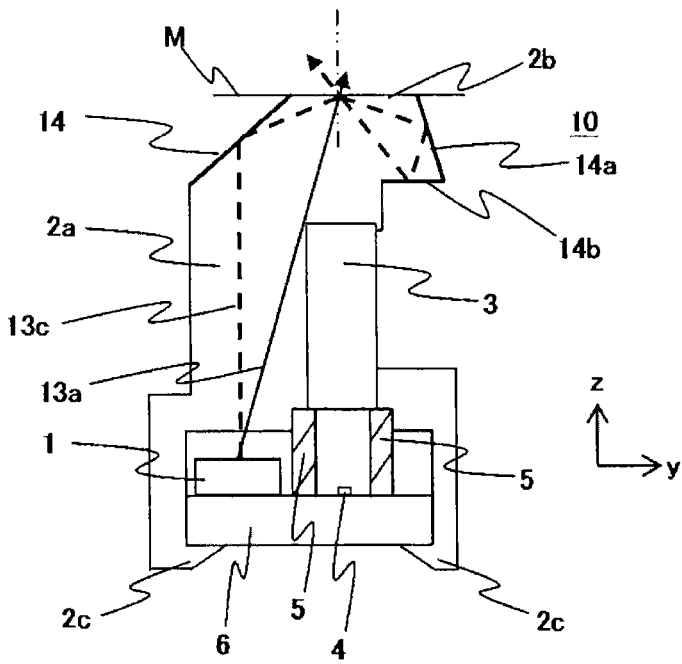
FIGS. 15A and 15B illustrate a cross-sectional view and a perspective view of the image reader according to Embodiment 3 of the present disclosure.
Figure 15B:
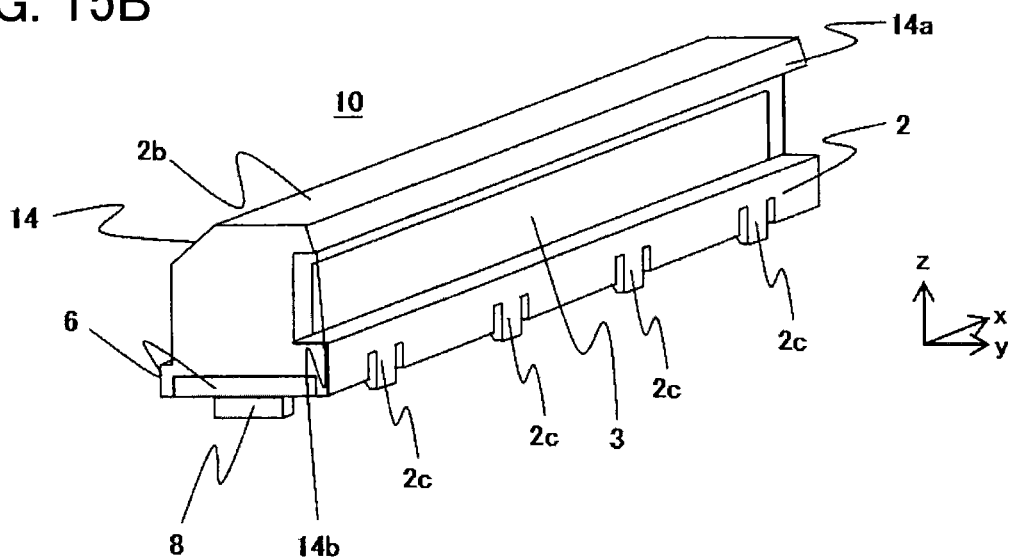

According to Embodiment 3, although the engagement portions 2*c* can also be protrusions running in the main scanning direction, rigidity of the protrusions is increased, and the board 6 might not be held well. Thus as illustrated in FIGS. 15A, 15B, 17A, 17B, 19A, 19B, 21A and 21B, the protrusion can be divided into multiple pieces and formed at several locations in the main scanning direction. In FIGS. 14, 15A and 15B, a portion of which the imaging optical system 3 (lens array assembly 3) is exposed, is a plate holds the lens array of the imaging optical system 3 (lens array assembly 3).

The image reader of Embodiment 3 has built-in light-source elements 1, and the light-source array including the light-source elements 1 is arranged in one row. Hence, when illumination light propagates mainly through the first path 13*a* and the second path 13*b*, which are explained in Embodiments 1 and 2, and then is emitted to the object-to-be-read M, the reading position of the imaging optical system 3 is irradiated (illuminated) by only illumination light from one sub-scanning direction (Y-axis direction) side. When the object-to-be-read M is a planar, the reading position of the imaging optical system 3 may be illuminated by illumination light from the one sub-scanning direction (Y-axis direction) side, but if the object-to-be-read M is non-planar and is illuminated from only the one side, shadows can be generated on the object-to-be-read M due to non-flatness, and the shadows can be generated in the read image (image data). When, for example, if the object-to-be-read M is a banknote or security, the image data of the object-to-be-read M output by the image reader 10 (signal processing circuit 12*c*) is utilized for determination of whether the banknote or security is counterfeit or not. Hence, irregular shadows being generated due to the non-flatness in the data of a particular image, in other words, for each banknote (security), can adversely affect the determination of counterfeit status of the banknote or security.

When illumination by illumination light from only one side in the sub-scanning direction (Y-axis direction) is unsuitable for the application of the image reader 10, illumination by illumination light from both sides in the sub-scanning direction (Y-axis direction) can be accomplished by a structure that includes the mirror surface 14, a mirror surface 14*a* and a mirror surface 14*b* of the image reader 10 illustrated in FIG. 14. For example, the configuration of the image reader 10 illustrated in FIG. 14 is explained below. As illustrated in FIG. 14, illumination light traveling a second path 13*c* (in the figure, indicated by a dashed line) is reflected in order by the mirror surface 14, the object-to-be-read feeding side face 2*b*, the mirror surface 14*a* and the mirror surface 14b, that is, reflected multiple times, and illumination light traveling the first path 13a and illumination light traveling the second path 13c are emitted from the object-to-be-read feeding side face 2b at both sides of the reading position of the imaging optical system 3, and thus illumination lights are emitted from opposite directions to each other in the sub-scanning direction.

The image reader of Embodiment 3 has the "mirror surface 14, mirror surface 14a and mirror surface 14b", the "mirror surface 14, mirror surface 14c", or the "mirror surface 14d, mirror surface 14a and mirror surface 14b" formed on the external side faces of the light guide portion 2a of the transparent member 2 (light guide 2). Similarly to the mirror surface 14, the mirror surface 14a, mirror surface 14b, mirror surface 14c and mirror surface 14d can be formed on the external side face of the light guide portion 2a by metal vapor deposition, metal plating, or placement of a metal tape. It can be understood that, like Embodiment 2, the mirror surface 14 of Embodiment 3 is formed at a portion where the virtual line parallel to the Z-axis and passing through the portion of the light-source element 1 emitting light intersects the light guide 2.

It can be understood that, as in Embodiment 2, the mirror surface 14d is formed at, including a portion where the virtual line parallel to the Z-axis and passing through the portion of the light-source element 1 emitting light intersects the light guide 2, a portion where the optical axis of light emitted by the light-source element 1 intersects the light guide 2. When the transparent member 2 has the below-described reflection area 15, the mirror surface 14d can be said to be formed at a portion where the optical axis of reflected light by the reflection area 15 intersects the light guide 2.

In FIGS. 14 and 15A, the mirror surface 14, mirror surface 14a and mirror surface 14b of the transparent member 2 (light guide 2) are portions of the outline of the transparent member 2 indicated by thick lines. Irradiation (illumination) of the reading position of the imaging optical system 3 by illumination light from both sides in the sub-scanning direction (Y-axis direction) is explained in detail for the first path 13a, second path 13c and second path 13b explained in Embodiment 2. First, according to Embodiment 2, illumination light through the second path 13b is reflected by the mirror surface 14 of the light guide 2 which has the inclination θ (θ$_2$) condition thereof set so that illumination light is not reflected totally at the object-to-be-read feeding side face 2b as defined by the formula (2) (formula (3) when the refractive index of the transparent member 2 is 1.5), thereby emitting the light from the object-to-be-read feeding side face 2b. Conversely, the mirror surface 14, which is located at a position facing the light source of the image reader in FIG. 14 and which reflects illumination light from the light-source elements, is required to have an angle set so as to cause total reflection by the object-to-be-read feeding side face 2b, contrary to Embodiment 2. That is to say, the inequality sign and the condition defined by the formula (2) (formula (3) when the refractive index of the transparent member 2 is 1.5) is required to be reversed for the inclination θ (θ$_2$) of the light guide 2 (light guide portion 2a) formed with the mirror surface 14.

Illumination light reflected totally by this object-to-be-read feeding side face 2b is reflected totally by the mirror surface 14a, and is further reflected totally by the mirror surface 14b, is emitted from the object-to-be-read feeding side face 2b, and is emitted to the object-to-be-read M. The mirror surface 14a is disposed at a position facing the mirror surface 14 in the sub-scanning direction (Y-axis direction), and illumination light reflected totally by the mirror surface 14 and also reflected totally by the object-to-be-read feeding side face 2b is reflected totally in the opposite direction to the object-to-be-read M. The mirror surface 14b is a surface of the light guide 2 (light guide portion 2a) that is parallel to the XY plane, and is contiguous with the mirror surface 14a. When the mirror surface 14a and the mirror surface 14b are adjusted (as may be required, the mirror surface 14 can also be adjusted) in such a way that the incident angle of illumination light to the object-to-be-read feeding side face 2b, which is reflected totally by the mirror surface 14b and which travels toward the object-to-be-read feeding side face 2b, satisfies the same condition as the incident angle 2θ (2θ$_2$) of the first path 13a explained in Embodiments 1 and 2, illumination light that travels through the second path 13c, and enters the object-to-be-read feeding side face 2b after being reflected by the mirror surface 14b, is not reflected totally. Depending on the adjustments of the mirror surfaces 14a and 14b, the mirror surface 14b may not be parallel to the XY plane. The incident angle 2θ$_2$ in this case is an intersection angle of, on the object-to-be-read feeding side face 2b, the virtual line (two-dot chain line) that is parallel to the Z-axis direction with illumination light reflected totally by the mirror surface 14b.

Next, as illustrated in FIG. 14, the first path 13a for traveling illumination light is, as in Embodiments 1 and 2, the path where incident light to the transparent member 2 (light guide 2) passes through the transparent member and illuminates directly the object-to-be-read M. Conversely, according to the above-explained second path 13c, after entering the transparent member 2 (light guide 2), light is reflected by the external mirror surface 14 of the light guide portion 2a, is reflected totally by the object-to-be-read feeding side face 2b of the transparent member 2, is further reflected by the multiple mirror surfaces 14a and 14b placed at the opposite side of the transparent member 2 (light guide 2) across the optical axis of the imaging optical system 3, and then illuminates the object-to-be-read M. According to Embodiment 3, as in Embodiments 1 and 2, in order to allow the first path 13a to be present, the imaging optical system 3 is preferably disposed at a location out of the virtual plane through which two virtual line pass, the first virtual line passing through the array of intersection points of the respective optical axes of the plurality of lenses constructing the imaging optical system 3 with the object-to-be-read M, and the second virtual line passing through the array of the plurality of disposed light-source elements 1. The virtual line formed by the intersection of this virtual plane with the YZ plane corresponds to the first path 13a.

FIGS. 15A and 15B illustrate a configuration in which protrusions with respective barbs to fasten the board, that is, the engagement portions 2c (fasteners) as explained in Embodiment 1 and illustrated in FIGS. 6 and 7, are provided at multiple locations of the transparent member 2 at the board-6 side. Needless to say, the light-source elements 1 are not required to face the engagement portions 2c in the sub-scanning direction. More specifically, in the configuration illustrated by FIGS. 15A and 15B, a total of eight fasteners are formed, four at each side, in the main scanning direction. These figures illustrate that the transparent member 2 is exposed at one face of the two side faces along the main scanning direction of the imaging optical system 3, at the portion shielded by the light shield member 5 that is below the exposed portion of the imaging optical system 3 in the Z-axis direction, and that the engagement portions 2c (fasteners) are arranged in a row of four members along the main scanning direction. Needless to say, in the transparent member 2 shaped so as to expose one of the two side faces along the main scanning direction of the imaging optical system 3 and the light shield member 5, the engagement portions 2c (fasteners) can be formed in the portion below the exposed portion of the light shield member 5 and the imaging optical system 3 in the Z-axis direction. In this case, the transparent member 2 can cover a portion of the light shield member 5. In addition, the engagement portions 2c (fasteners) can be formed at the portion of the transparent member 2 covering the light shield member 5 partially. In addition to the engagement portions 2c, the fasteners explained in Embodiment 1 and a below-described Embodiment 5 also can be used.

The image reader 10 illustrated in FIG. 14 and FIGS. 15A and 15B causes illumination light from the light-source elements 1 and reflected totally by the mirror surface 14 to be reflected totally in order by the object-to-be-read feeding side face 2b, the mirror surface 14a and the mirror surface 14b, and to be emitted from the object-to-be-read feeding side face 2b. The image reader of Embodiment 3 may be the image reader 10 illustrated in FIGS. 16 and 17, which causes illumination light to be reflected totally by the two surfaces that are the mirror surface 14 and the mirror surface 14c, and to be emitted from the object-to-be-read feeding side face 2b. The illumination light emitted from the object-to-be-read feeding side face 2b is emitted to the object-to-be-read M.

Figure 16:
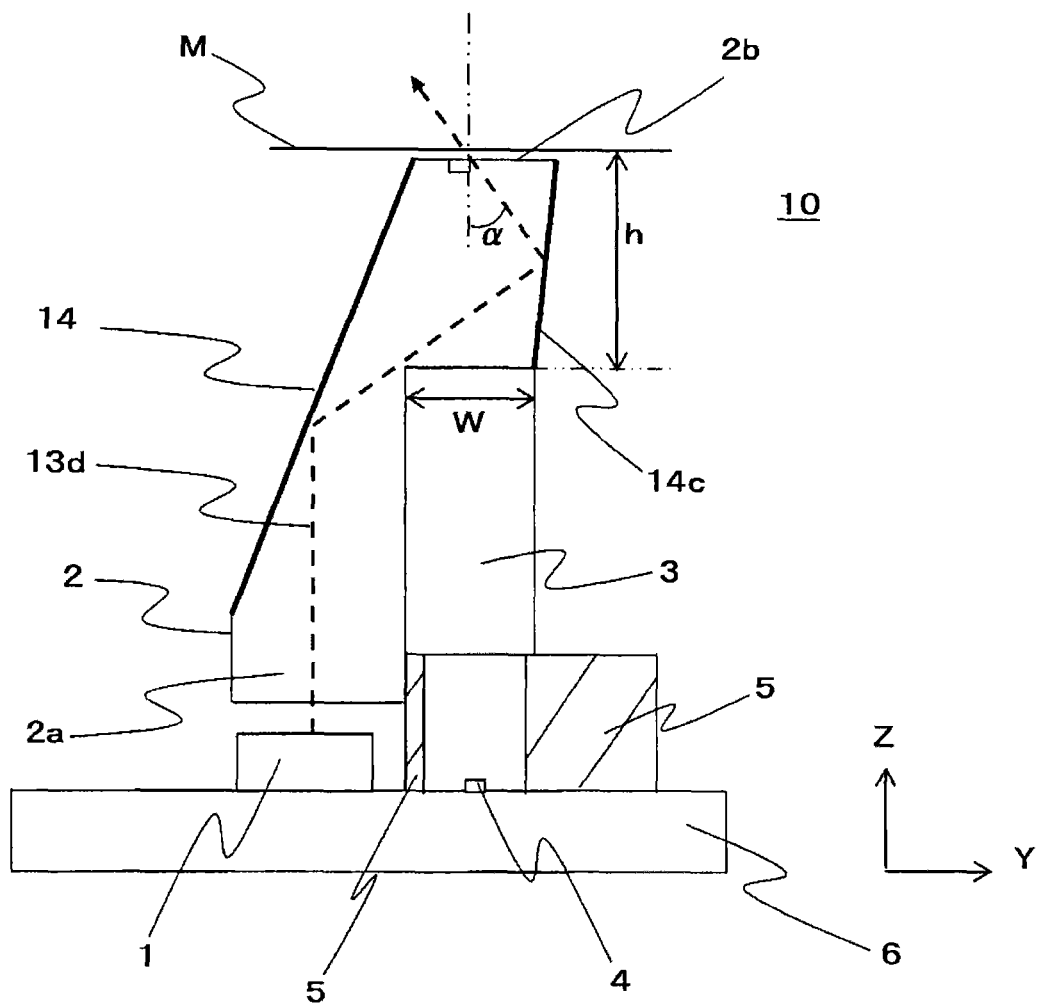
FIG. 16 is a cross-sectional view of the image reader according to Embodiment 3 of the present disclosure.
Figure 17A:
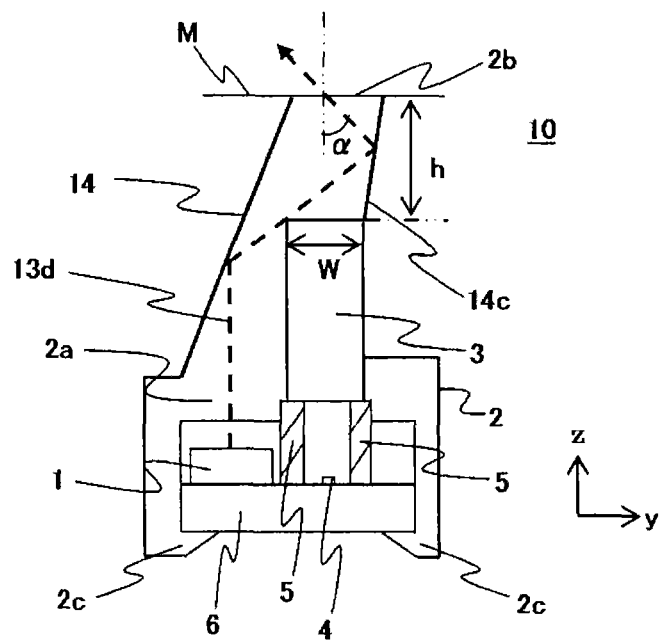
FIGS. 17A and 17B illustrate a cross-sectional view and a perspective view of the image reader according to Embodiment 3 of the present disclosure.

As illustrated in FIGS. 16 and 17, the mirror surface 14c is disposed at a location facing the mirror surface 14 in the sub-scanning direction (Y-axis direction), and reflects totally, toward the object-to-be-read feeding side face 2b, illumination light reflected totally by the mirror surface 14. The path of this light (optical path) is a second path 13d. In these figures, this optical path is indicated by a dashed line. The image reader 10 illustrated in FIGS. 16 and 17 has, as the major optical path, the second path 13d, in addition to the first path 13a as an optical path without reflection by the light guide portion 2a and that allows this light to reach the object-to-be-read feeding side face 2b. If the mirror surface 14 and the mirror surface 14c are adjusted in such a way that the incident angle of, to the object-to-be-read feeding side face 2b, illumination light reflected totally by the mirror surface 14c and travelling toward the object-to-be-read feeding side face 2b satisfies the same condition as that of the incident angle $2\theta$ ($2\theta_2$) of the first path 13a explained in Embodiments 1 and 2, illumination light travelling through the second path 13d is not reflected totally when entering the object-to-be-read feeding side face 2b after reflection by the mirror surface 14c. As a result of this adjustment on the mirror surface 14 and that of the mirror surface 14c, the mirror surface 14c can become parallel to the XZ plane. Note that the incident angle $2\theta_2$ in this case is an intersection angle of on the object-to-be-read feeding side face 2b, the virtual line (two-dot chain line) that is parallel to the Z-axis direction with the illumination light reflected totally by the mirror surface 14c. In FIG. 16 and FIG. 17A, the mirror surface 14 and mirror surface 14c of the transparent member 2 (light guide 2) are portions of the profile of the transparent member 2 indicated by thick lines.

Figure 17B:
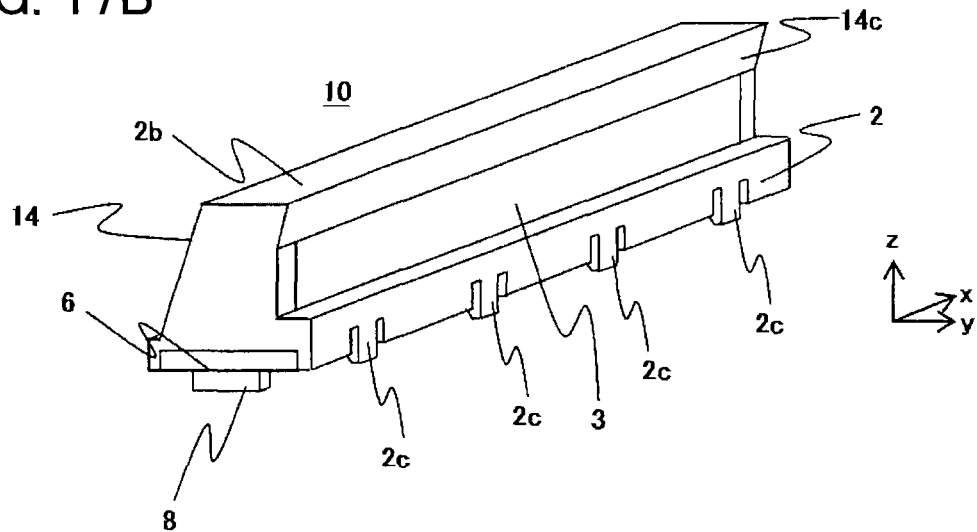

FIGS. 17A and 17B illustrate a configuration in which protrusions with respective barbs for fastening the board, that is, the engagement portions 2c (fasteners) as explained in Embodiment 1, are provided at multiple locations of the transparent member 2 at the board-6 side. The structure is the same as illustrated in FIGS. 15A and 15B, and thus the detailed explanation thereof is omitted. Needless to say, in addition to the engagement portion 2c, the fasteners explained in Embodiment 1 and the below-described Embodiment 5 are also applicable.

The image reader 10 illustrated in FIGS. 16 and 17A has a configuration in that the mirror surface 14c that is arranged at the side opposite to the light-source elements 1, has an angle that is broadened with respect to the object-to-be-read M as viewed from the imaging optical system 3. In this case, even if light illuminating the object-to-be-read M becomes reflected light from the object-to-be-read M, such light can be shut out by the imaging optical system 3 and cannot be received by the sensor IC 4. In order to avoid this situation, an incident angle α of light reflected totally by the mirror surface 14c and toward the object-to-be-read feeding side face 2b is required to be set. The incident angle α is an intersection angle of, on the object-to-be-read feeding side face 2b, the virtual line (two-dot chain line) that is parallel to the Z-axis direction with the illumination light reflected totally by the mirror surface 14c. Hence, the incident angle α is required to be set so as to satisfy the condition of the incident angle ($2\theta_2$) that does not cause total reflection as explained above, as well as to satisfy the condition that does not cause reflected light from the object-to-be-read M to be shut out by the imaging optical system 3. The incident angle α of light can be determined by the formula (4), where W is a width of the imaging optical system 3 and h is a distance between the imaging optical system 3 and the object-to-be-read M. Note that according to the image reader 10 illustrated in FIGS. 16 and 17, the formula (4) assumes that the object-to-be-read M passes in vicinity of the object-to-be-read feeding side face 2b.

[Formula 4]

$$\tan\alpha \geq \frac{3}{2} \cdot \frac{w}{h} \qquad \text{Formula (4)}$$

In the formula (4), if W=1 mm and h=3 mm, the obtained angle is α≤26.6 degrees. In addition, when the refractive index n of the transparent member 2 is 1.5, an incident angle αmax that does not cause total reflection by the object-to-be-read feeding side face 2b of the transparent member 2 is determined as αmax=$\sin^{-1}(1/n)$=41.8 degrees. Hence, according to the image reader 10 illustrated in FIGS. 16 and 17, sufficient illumination light through the second path 13d can be obtained if the incident angle of light, which is the intersection angle of, on the object-to-be-read feeding side face 2b, the virtual line (two-dot chain line) parallel to the Z-axis direction with the illumination light reflected totally by the mirror surface 14c, is set to be 26.6 degrees≤α($2\theta_2$)<41.8 degrees.

Hence, the image reader 10 illustrated in FIGS. 16 and 17 can emit illumination light from both sides in the sub-scanning direction (Y-axis direction) through the first path 13a and the second path 13d. That is to say, light traveling the first path 13a and light traveling the second path 13d at both sides of the reading position of the imaging optical system 3 are emitted from the object-to-be-read feeding side face 2b, and illumination light can be emitted from directions opposite to each other in the sub-scanning direction.

Figure 18:
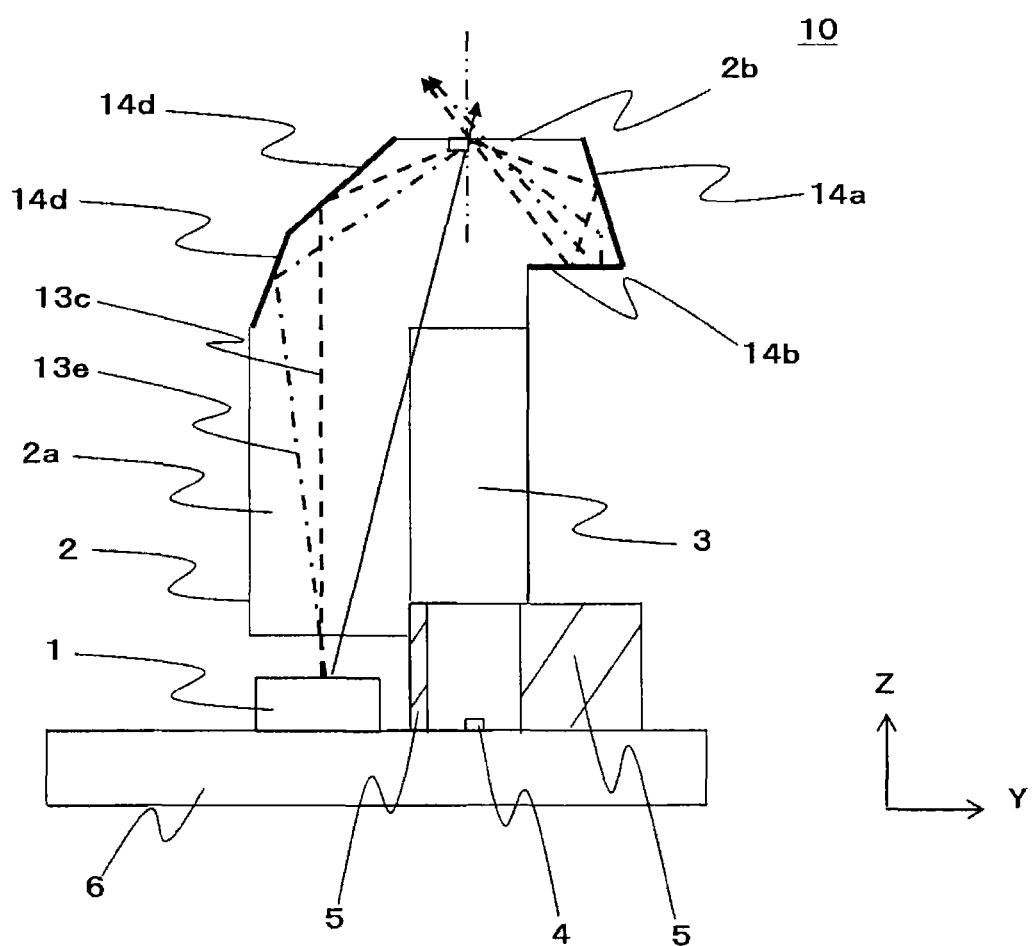
FIG. 18 is a cross-sectional view of the image reader according to Embodiment 3 of the present disclosure.

Conversely, in the case of the image reader 10 illustrated in FIGS. 14 and 15, light of the optical path is not shut out by the imaging optical system 3, and light of a wider incident angle, that is an incident angle determined by the formula 0 degrees≤α($2\theta_2$)<41.8 degree, can be used. Thus illumination is performed relatively easily with good efficiency and good balancing of the light intensity from the right and the left. In addition, in FIG. 14, the second path 13c is the only path for illuminating the object-to-be-read M from the light traveling directly to the object-to-be-read M from the light-source element 1. However, as illustrated in FIGS. 18 and 19, instead of the mirror surface 14, multiple mirror surfaces 14d or a curved mirror surface 14d that have adjusted angles with respect to the angle of light emitted from the light-source elements 1 so as to allow respective lights to reach the object-to-be-read M may be provided. FIGS. 18 and 19 illustrate the angle-adjusted multiple mirror surfaces 14d. In FIGS. 18 and 19, the mirror surface 14d, mirror surface 14a and mirror surface 14b of the transparent member 2 (light guide 2) are portions of the profile of the transparent member 2 indicated with thick lines.

The image reader 10 illustrated in FIGS. 18 and 19 corresponds to the image reader 10 that is illustrated in FIGS. 14 and 15, and that has the two mirror surfaces 14d instead of the mirror surface 14. More specifically, among the two mirror surfaces 14d, the one near the object-to-be-read M has the same inclination angle as that of the mirror surface 14 illustrated in FIGS. 14 and 15 (optical path of illumination light is second path 13c). In addition, the other mirror surface 14d is formed in the light guide portion 2a in a manner contiguous with the mirror surface 14d corresponding to the mirror surface 14, and has a larger inclination angle (optical path of illumination light is a second path 13e as indicated by the dot-dash line in figures). By configuration in this manner, among illumination light emitted from the light-source elements 1, light with an optical axis inclined with respect to the Z-axis direction toward the external side face of the light guide portion 2a can be reflected totally, and can be propagated efficiently to the object-to-be-read feeding side face 2b. Such two mirror surfaces 14d (planes) may be replaced by a continuous arc-shaped mirror surface 14d, or three or more mirror surfaces 14d (planes) approximating this arc-shaped mirror surface 14d can be formed in the light guide portion 2a.

Figure 19A:
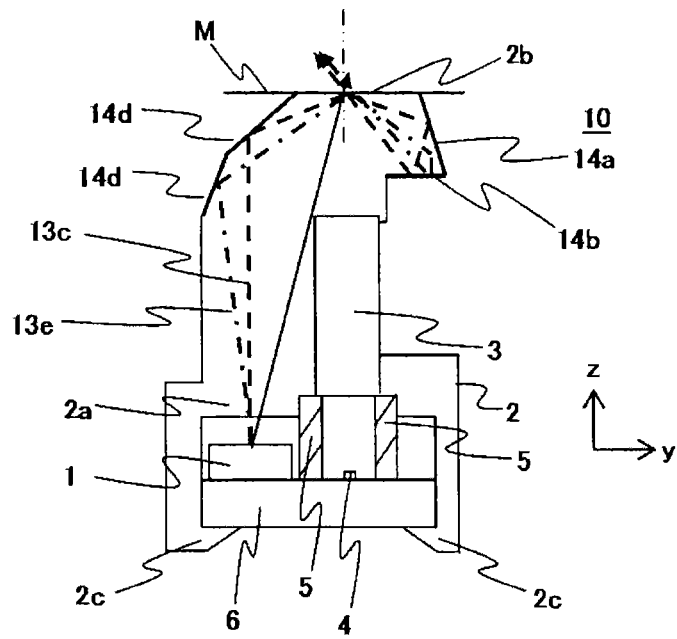
FIGS. 19A and 19B illustrate a cross-sectional view and a perspective view of the image reader according to Embodiment 3 of the present disclosure.
Figure 19B:
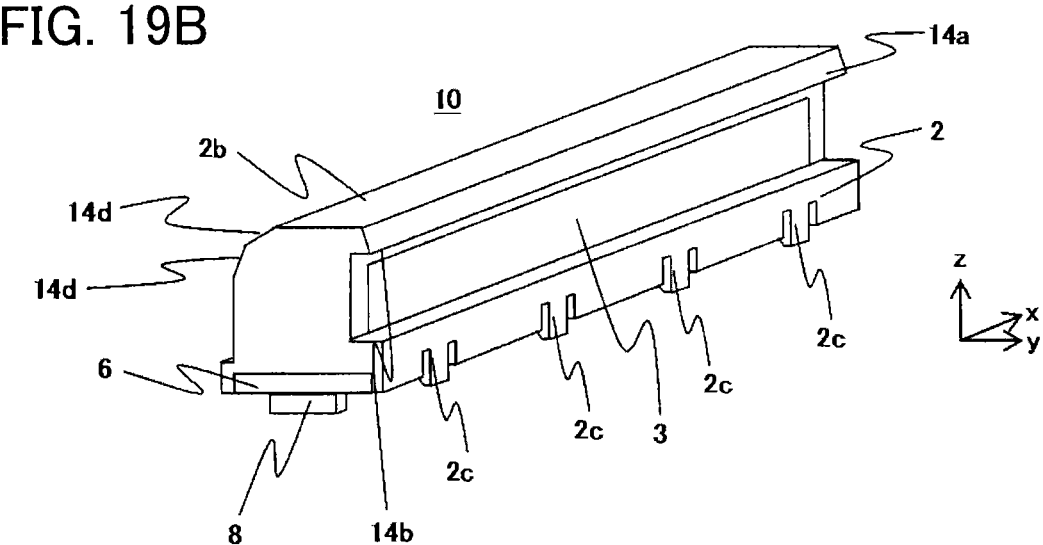

FIGS. 19A and 19B illustrate a configuration in which protrusions with respective barbs for fastening the board, that is the engagement portions 2c (fasteners) as explained in Embodiment 1, are provided at several locations of the transparent member 2 at the board-6 side. The structure is the same as that illustrated in FIGS. 15A and 15B and in FIGS. 17A and 17B, and thus detailed explanation of the structure is omitted. Needless to say, in addition to the engagement portions 2c, the fasteners explained in Embodiment 1 and the below-described Embodiment 5 are also applicable.

The image reader 10 illustrated in FIGS. 14, 15, 18 and 19 includes the second path 13c that is an optical path of emitting light from the object-to-be-read feeding side face 2b after being reflected totally by the object-to-be-read feeding side face 2b, or the second path 13c and the second path 13e. When the image reader includes the optical path that reflects light totally by the object-to-be-read feeding side face 2b of the transparent member 2 (light guide 2), if the object-to-be-read M be in intimately contact with the object-to-be-read feeding side face 2b of the transparent member 2, the condition required for total reflection may not be satisfied, and thus the balancing of light intensities from the right and the left, that is, the balancing of the light intensity of illumination light from both sides in the sub-scanning direction (Y-axis direction) may be lost. In this case, the structure of an image reader 10 illustrated in FIGS. 20 and 21 can maintain the well-balanced light intensity from the right and the left even if the object-to-be-read M is in intimately contact with the transparent member 2.

Figure 20:
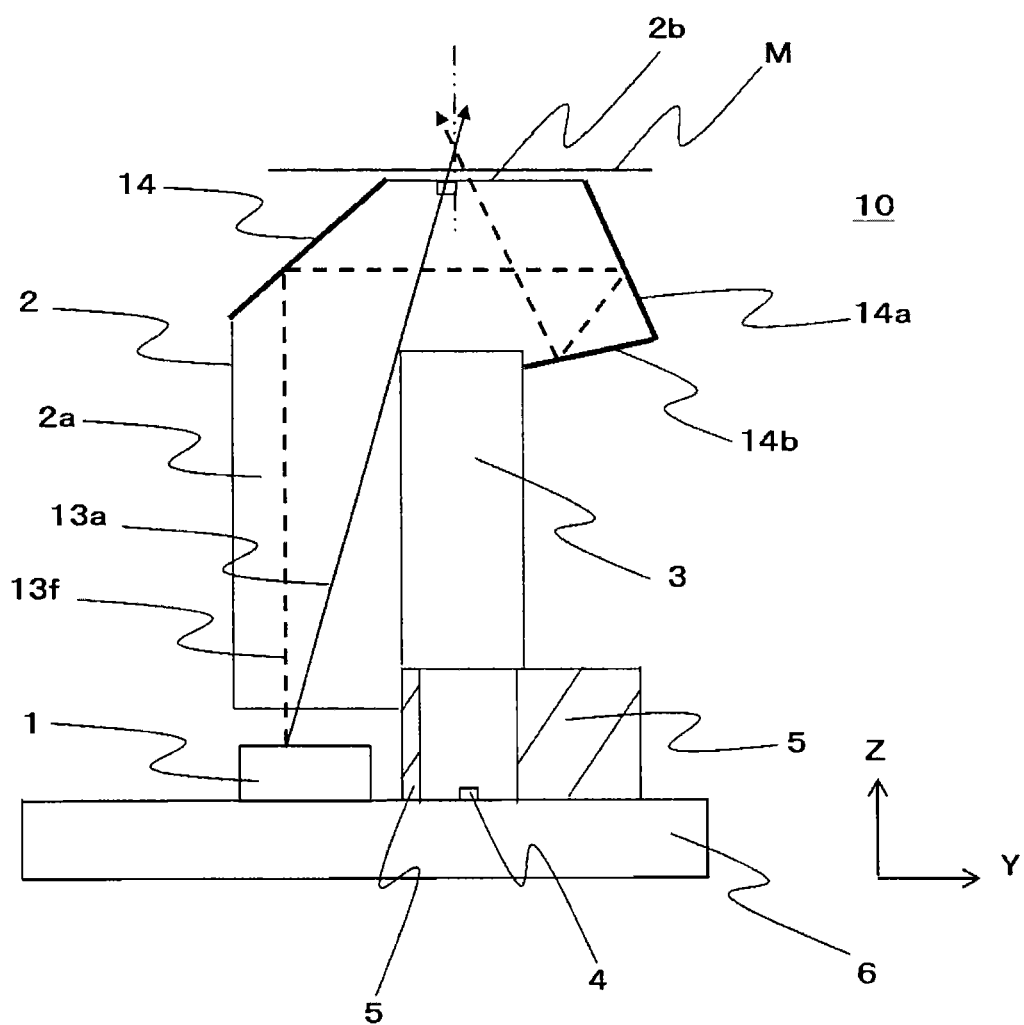
FIG. 20 is a cross-sectional view of the image reader according to Embodiment 3 of the present disclosure.

Although the image reader 10 illustrated in FIGS. 20 and 21 has the same first path 13a as above-explained image reader, a second path 13f is different. As illustrated in FIG. 20, the second path 13f is an optical path for light that is reflected by the mirror surface 14, and illumination light emitted from the light-source elements 1 is reflected totally by the mirror surface 14 at an angle substantially parallel to the XY plane. The illumination light reflected totally at the angle substantially parallel to the XY plane is reflected totally by the mirror surface 14a arranged at the opposite side across the imaging optical system 3, is further reflected totally by the mirror surface 14b, and is emitted from the object-to-be-read feeding side face 2b, thereby illuminating the object-to-be-read M. The second path 13f can be said to be the same optical path as the second path 13c except that light is reflected totally by the mirror surface 14 at the angle substantially parallel to the XY plane.

The mirror surface 14a of the image reader 10 illustrated in FIGS. 20 and 21 is disposed at a location facing the mirror surface 14 in the sub-scanning direction (Y-axis direction), and reflects totally, in the direction opposite to the object-to-be-read M, illumination light reflected totally by the mirror surface 14 and further reflected by the object-to-be-read feeding side face 2b. The mirror surface 14b is a surface of the light guide 2 (light guide portion 2a) inclined toward the object-to-be-read feeding side face 2b, and is contiguous with the mirror surface 14a. When the mirror surface 14a and the mirror surface 14b are adjusted (also the mirror surface 14 may be adjusted as needed) in such a way that the incident angle, to the object-to-be-read feeding side face 2b, of illumination light reflected totally by the mirror surface 14b and travelling to the object-to-be-read feeding side face 2b, satisfies the same condition as the incident angle $2\theta$ ($2\theta_2$) of the first path 13a as explained in Embodiments 1 and 2, illumination light that travels through the second path 13c and entering the object-to-be-read feeding side face 2b after reflection by the mirror surface 14b is not reflected totally. Depending on the adjustments of the mirror surfaces 14a and 14b, the mirror surface 14b can become parallel to the XY plane.

The image reader 10 illustrated in FIGS. 20 and 21 has the second path 13f that does not undergo total reflection by the object-to-be-read feeding side face 2b. Thus even if the object-to-be-read M is in intimately contact with the object-to-be-read feeding side face 2b of the transparent member 2 (light guide 2), no change occurs in the path of the illumination light. Hence, illumination is performed readily with good efficiency and well-balanced light intensity from the right and the left. In addition, in FIG. 20, the second path 13f is the only path for illuminating the object-to-be-read M from the light travelling perpendicular to the object-to-be-read M from the light-source elements 1. However, as illustrated in FIGS. 18 and 19, the multiple mirror surfaces 14d or the arc-shaped mirror surface 14d that has the angle adjusted so as to allow respective lights to reach the object-to-be-read M with respect to the angle of light emitted from the light-source elements 1 can be arranged instead of the mirror surface 14.

Figure 21A:
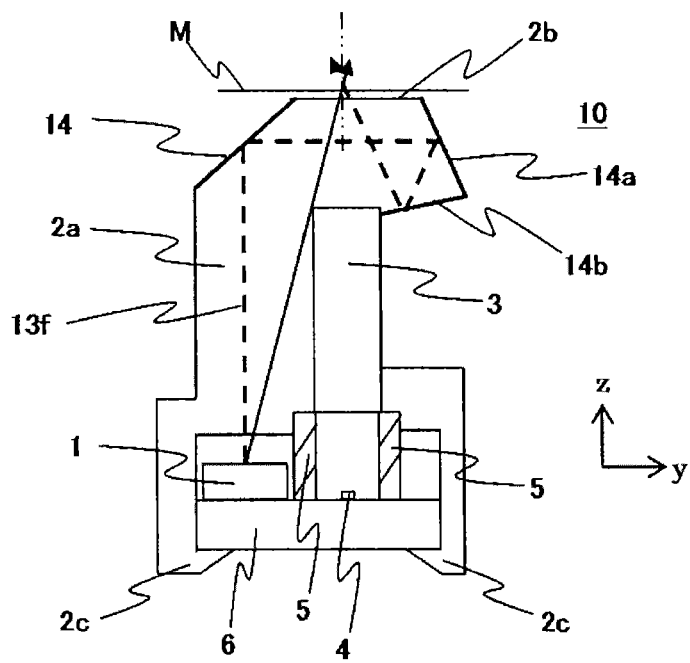
FIGS. 21A and 21B illustrate a cross-sectional view and a perspective view of the image reader according to Embodiment 3 of the present disclosure.
Figure 21B:
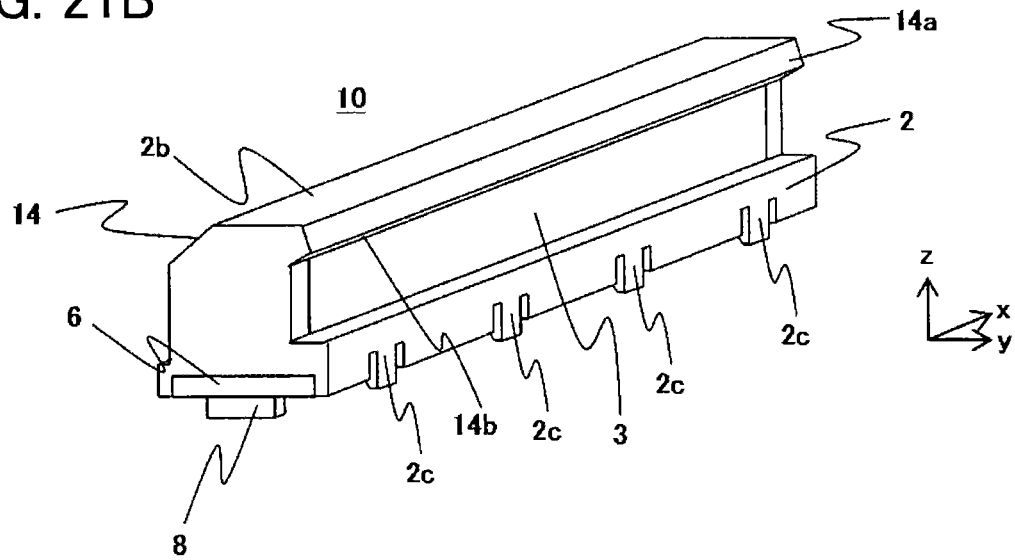

FIGS. 21A and 21B illustrate a configuration in which protrusions with respective barbs to fasten the board, that is, engagement portions 2c (fasteners) as explained in Embodiment 1, are provided at multiple locations of the transparent member 2 at the board-6 side. The structure is the same as those illustrated in FIGS. 15A and 15B, FIGS. 17A and 17B, and FIGS. 19A and 19B, and repeated explanation thereof is omitted. Needless to say, in addition to the engagement portion 2c, the fasteners explained in Embodiment 1 and the below-described Embodiment 5 are also applicable.

The image reader of Embodiment 3 is not likely to generate a shadow on the document surface even if the object-to-be-read M is not flat and has crimples and the like. In addition, the image reader can reduce light not emitted from the light guide 2 readily after scattering light from the light-source elements 1, and has high illumination efficiency. That is to say, the image reader of Embodiment 3 can suppress shading even if the object-to-be-read M is not flat, and can illuminate the object-to-be-read M highly efficiently using a simple structure.

Embodiment 4

Figure 22:
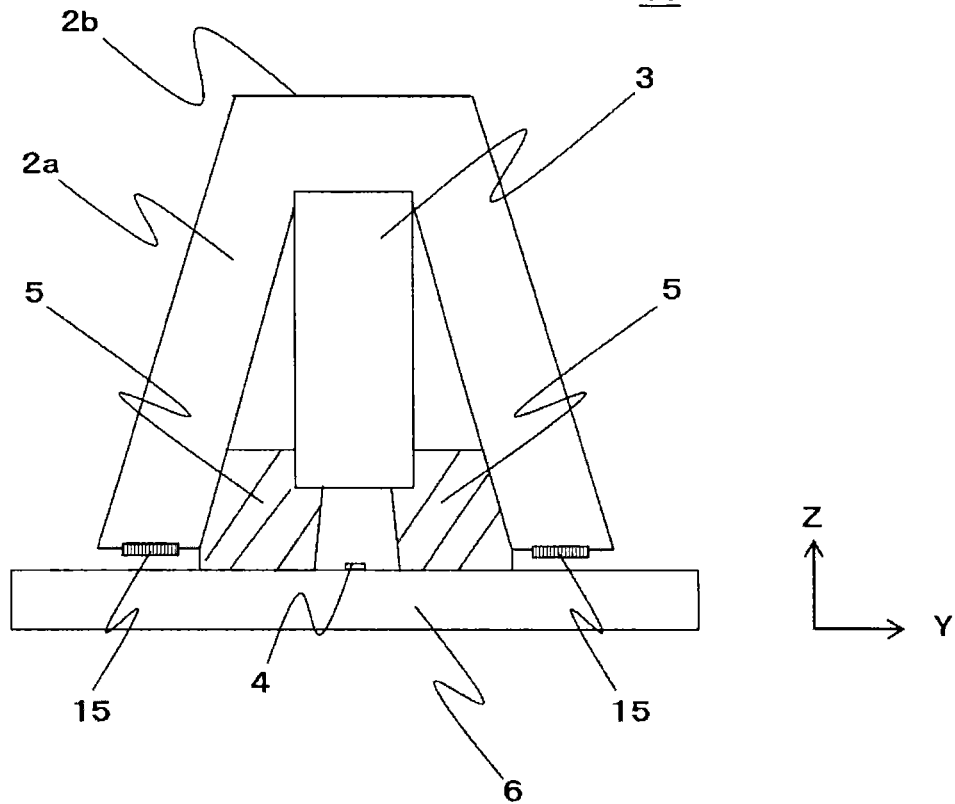
FIG. 22 is a cross-sectional view of an image reader according to Embodiment 4 of the present disclosure.
Figure 23:
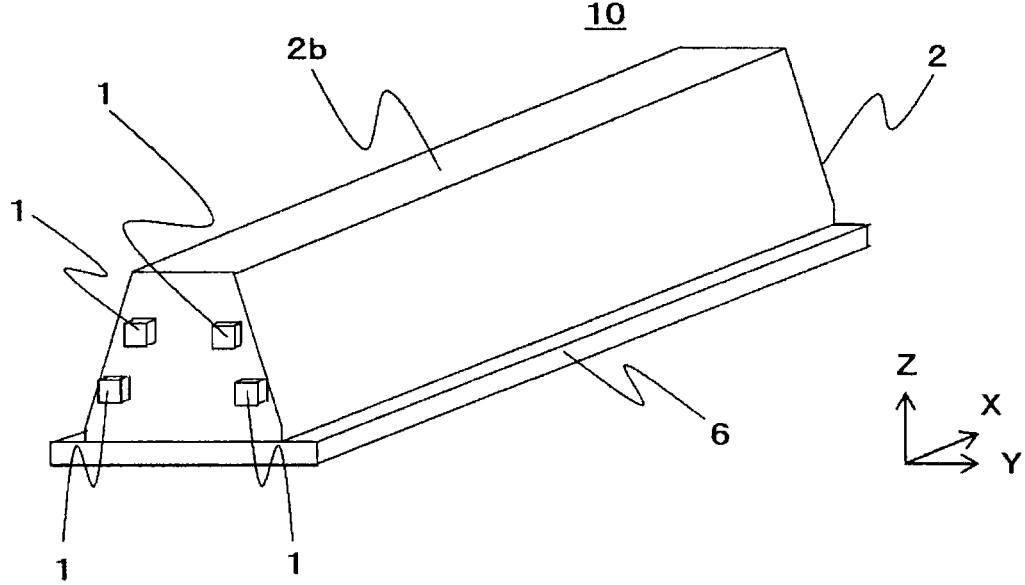
FIG. 23 is a perspective view of the image reader according to Embodiment 4 of the present disclosure.

An explanation is given of Embodiment 4 of the present disclosure with reference to FIGS. 22 and 23. FIG. 23 is a perspective view of an image reader according to Embodiment 4, and FIG. 22 is a cross-sectional view at the YZ plane (virtual plane) defined by the Y axis and the Z axis in the image reader 10 illustrated in FIG. 23. In the figures, the same or equivalent component is denoted by the same reference sign, and repeated explanation thereof is omitted. The image readers of Embodiments 1, 2 and 3 have the plurality of light-source elements 1 arrayed in the main scanning direction (X-axis direction) along the light shield member 5 so as to face the end portion of the transparent member 2 (light guide 2) opposite to the object-to-be-read M. This is called an array light-source type or a light-source array type (LED array type) since the light-source elements 1 are disposed in an array in the main scanning direction.

Conversely, the image reader of Embodiment 4 has the light-source elements 1 formed so as to face the end portion of the transparent member 2 (light guide 2) in the main scanning direction (X-axis direction). The optical axis of the light-source element 1 is substantially parallel to the X-axis direction. Hence, light emitted by the light-source element 1 travels efficiently through the transparent member 2 (light guide 2), reflects repeatedly in the interior of the transparent member 2 (light guide 2) and is guided in the main scanning direction (X-axis direction). This structure is called a side light type since the light-source elements 1 are disposed at the end portions of the transparent member 2 (light guide 2) in the main scanning direction (X-axis direction).

In addition, the side light type image reader of Embodiment 4 employs a structure, i.e. the reflection area 15, to emit toward the object-to-be-read M light guided in the transparent member 2 (light guide 2), this structure being formed in the transparent member 2 (light guide 2). The reflection area 15 is formed at the end portion of the transparent member 2 (light guide 2) opposite to the object-to-be-read M along the main scanning direction (X-axis direction), and reflects light from the light-source elements 1 toward the object-to-be-read M. That is to say, the reflection area 15 can be said to be formed at the part of the light guide 2 corresponding to the location where light emitted by the light-source elements 1 of the image readers of Embodiments 1, 2 and 3 enters the light guide 2.

Hence, the optical path that guides light reflected by the reflection area 15 toward the object-to-be-read-M side and guided in the light guide 2 corresponds to the optical path (i.e. first path 13a, second path 13b, second path 13c, second path 13d, second path 13e and second path 130 for light emitted by the light-source elements 1 of the image readers of Embodiments 1, 2 and 3. Hence, in Embodiment 4, the explanation for optical path that guides light reflected by the reflection area 15 toward the object-to-be-read-M side and guided in the light guide 2 (first path 13a, second path 13b, second path 13c, second path 13d, second path 13e, and second path 130 is omitted.

In FIGS. 22 and 23, the above-explained reflection area 15 is formed on the side face of the light guide 2 along the main scanning direction (X-axis direction). The reflection area 15 may be a print (reflection pattern 15) on the side face of the light guide 2, or may be an irregularity (reflection prism 15) formed on the side face of the light guide 2. In the main scanning direction (X-axis direction), the reflection pattern 15 and the reflection prism 15 may change in width in the sub-scanning direction (Y-axis direction) in order to make light emitted to the object-to-be-read M uniform along the main scanning direction. Needless to say, the width in the sub-scanning direction (Y-axis direction) can be zero. That is to say, the reflection pattern 15 and the reflection prism 15 may be non-continuous in the main scanning direction (X-axis direction). Note that the reflection pattern 15 can be formed by applying a white paint in order to manufacture the reflection area 15. The reflection prisms 15 can be formed by embossing or by arranging micro structures. In these figures, the same or equivalent component is denoted by the same reference sign, and repeated explanation thereof is omitted.

As explained above, in Embodiments 1, 2 and 3, the array light-source type that has the light-source elements 1 arrayed in the main scanning direction is employed, but in Embodiment 4, as illustrated in FIGS. 22 and 23, a side light type is employed that has the light-source elements 1 disposed at both ends of the transparent member 2 in the main scanning direction (X-axis direction) or at one side in the main scanning direction (X-axis direction). That is to say, in FIG. 23, although one side of the transparent member 2 in the main scanning direction (X-axis direction) is not visible, the light-source elements 1 are also provided at the invisible side in the main scanning direction, that is, the light-source elements 1 are disposed at both ends of the transparent member 2 in the main scanning direction (X-axis direction). In addition, in FIG. 23, the number of light-source elements 1 facing both ends or one end of the transparent member 2 (light guide 2) in the main scanning direction (X-axis direction) is two for each end corresponding to the reflection area 15, but the number of the light-source elements 1 is not limited to this configuration.

In the side light type, light from the light-source elements 1 enters the interior of the transparent member 2 (light guide 2) and propagates in the main scanning direction while undergoing total reflection repeatedly at the boundary between the transparent member 2 (light guide 2) and the layer of air. At this time, as illustrated in FIG. 22, which is a cross-sectional view of FIG. 23, when light enters the reflection area 15 formed in a portion of the transparent member 2 (light guide 2), the light is scattered (reflected), and the scattered light is emitted from the transparent member 2. Hence, as explained above, the reflection area 15 can be understood as an additional linear light source (array light source, light-source array). Therefore, the configurations of the image readers of Embodiments 1, 2 and 3 are also applicable to the image reader (side light type) of Embodiment 4.

For example, if the first path 13a is required, the reflection area 15 can be applied to the structures of the image reader of Embodiments 1, 2 and 3. That is to say, the imaging optical system 3 is disposed at a location out of the virtual plane through which pass the first virtual line passing through the array of intersection points of the optical axes of a plurality of lenses with the object-to-be-read M and parallel to the main scanning direction (X-axis direction), and the second virtual line passing through the reflection area 15 and parallel to the main scanning direction.

The image reader according to Embodiment 4, which is the side light type, can reduce the number of light-source elements 1 disposed at the end portion of the transparent member 2 in the main scanning direction in comparison to the image readers of Embodiments 1, 2 and 3. In addition, the number of the mounted light-source elements 1 can be reduced, while at the same time, the present Embodiment has the advantageous effect of suppression of ripple, i.e. unevenness of the light intensity, which is a problem caused when the number of mounted light-source elements 1 is reduced in an array type light source. No particular limitation is placed on the arrangement of light-source elements 1 in the image reader of Embodiment 4, but the light-source elements 1 can be disposed near the end portion of the transparent member 2 in the main scanning direction (X-axis direction) like the below-described light-source holder 31, and by use of a holder that has little leakage of light, a leakage to the external space of light emitted from the light-source elements 1 to the transparent member 2 can be suppressed. Hence, by use of a holder that has little light leakage, illumination efficiency can be improved in comparison with a configuration in which only the light-source elements 1 are arranged.

In addition, in comparison with the way of disposing the light-source elements 1 in the image readers of Embodiments 1, 2 and 3 that use the array light-source type, arranging the light-source elements 1 outside the image reader 10 is an easy way to arrange the light-source elements 1 in the image reader of Embodiment 4, which is the side light type. Needless to say, in the cases of the image reader of Embodiment 1, which is an array light-source type, and the image reader of Embodiment 3, which is an array light-source type, both without a mirror surface, if light from the plurality of light-source elements 1 composing the array light-source is not guided through the interior of the transparent member 2, the light-source elements 1 can be arranged outside the image reader 10 readily.

Embodiment 5

An explanation is given of Embodiment 5 of the present disclosure with reference to FIGS. 24 to 37. In Embodiment 5, an example structure of the image reader of the present disclosure is explained. More specifically, an explanation is mainly given of the structure of the image reader 10 that includes the transparent member 2 (light guide 2), fasteners (engagement portion 2c, engagement portion 2d, boss 2e, boss 2f, screw 9, clip 16, clip 17, adhesive 18 and elastic member 19), imaging optical system 3, light shield member 5 (light shield 5), board 6 and the like. The boss 2f corresponds to the engagement portion 2c explained using FIG. 8. The screw 9 corresponds to the engagement portion 2c explained using FIG. 9. In addition, in the explanation of Embodiment 5 and further Embodiments, the image reader 10 is explained that has the light shield member 5 separate from a dust-proofing member 7. The structure of the image reader of Embodiment 5 is applicable to the structures of the image reader of Embodiments 1 to 4. Still further, in Embodiment 5 and further Embodiments, an image reader 10 is explained that has the external side face of the transparent member 2 (light guide 2) formed in an arc shape. The arc-shaped external side face of the light guide portion 2a is also applicable to the image readers of Embodiments 1 to 4.

Figure 24:
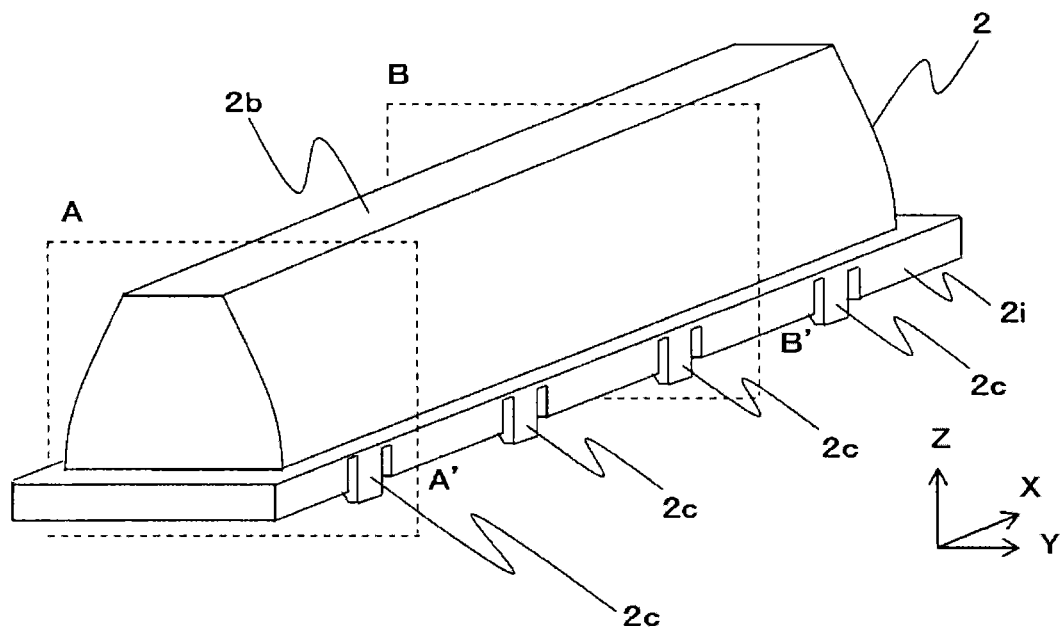
FIG. 24 is a perspective view of an image reader according to Embodiment 5 of the present disclosure.
Figure 25:
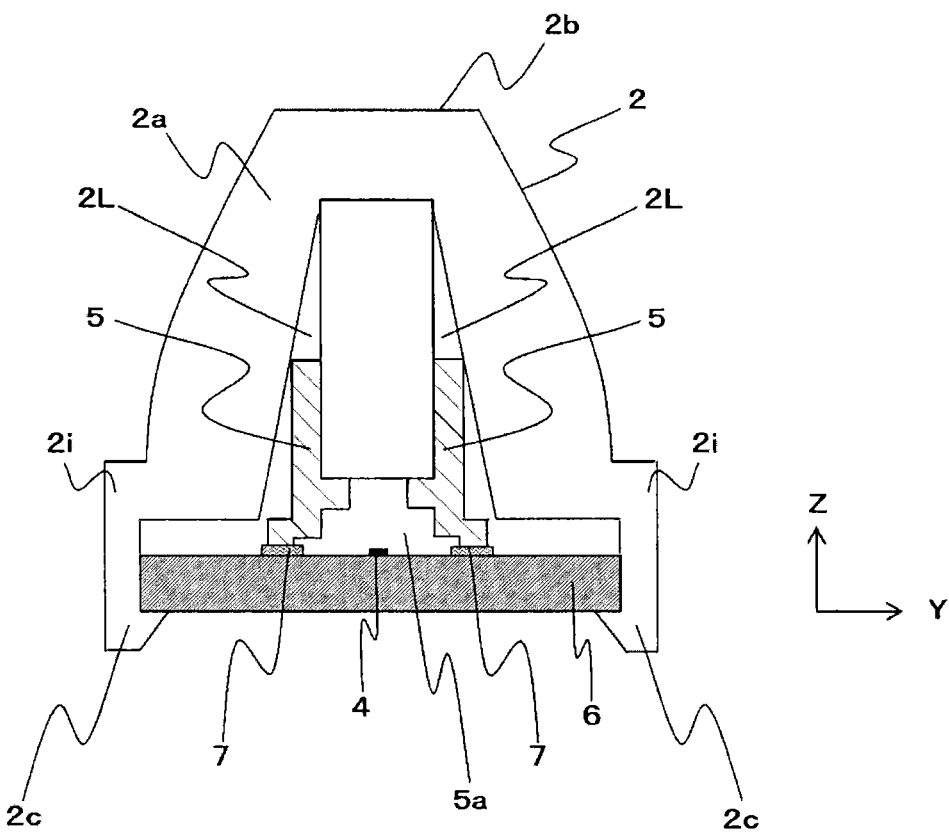
FIG. 25 is a cross-sectional view of the image reader according to Embodiment 5 of the present disclosure.

FIG. 24 is a perspective view of the image reader according to Embodiment 5. FIG. 25 is a cross-sectional view of the image reader 10 at a virtual plane AA' that is a parallel plane to the YZ plane defined by the Y axis and the Z axis in FIG. 24. More specifically, the virtual plane AA' is a cross-sectional view of a portion that intersects one of the multiple engagement portions 2c arrayed in the main scanning direction (X-axis direction). Since the engagement portions 2c are arrayed in two rows sandwiching the imaging optical system 3, in a precise sense, the virtual plane AA' is a cross section that intersects the two engagement portions 2c arranged side by side in the main scanning direction (X-axis direction). Needless to say, when the engagement portions 2c arrayed in two rows across the imaging optical system 3 are arranged in a zigzag pattern, the virtual plane AA' can be said to be as a cross section that intersects one of the engagement portions 2c arrayed in the main scanning direction (X-axis direction). According to Embodiments of the present disclosure including this Embodiment 5, example configurations are explained in which the engagement portions 2c are arrayed in two rows sandwiching the imaging optical system 3 without arrangement in a zigzag pattern, and face one other in the sub-scanning direction (Y-axis direction).

Figure 26:
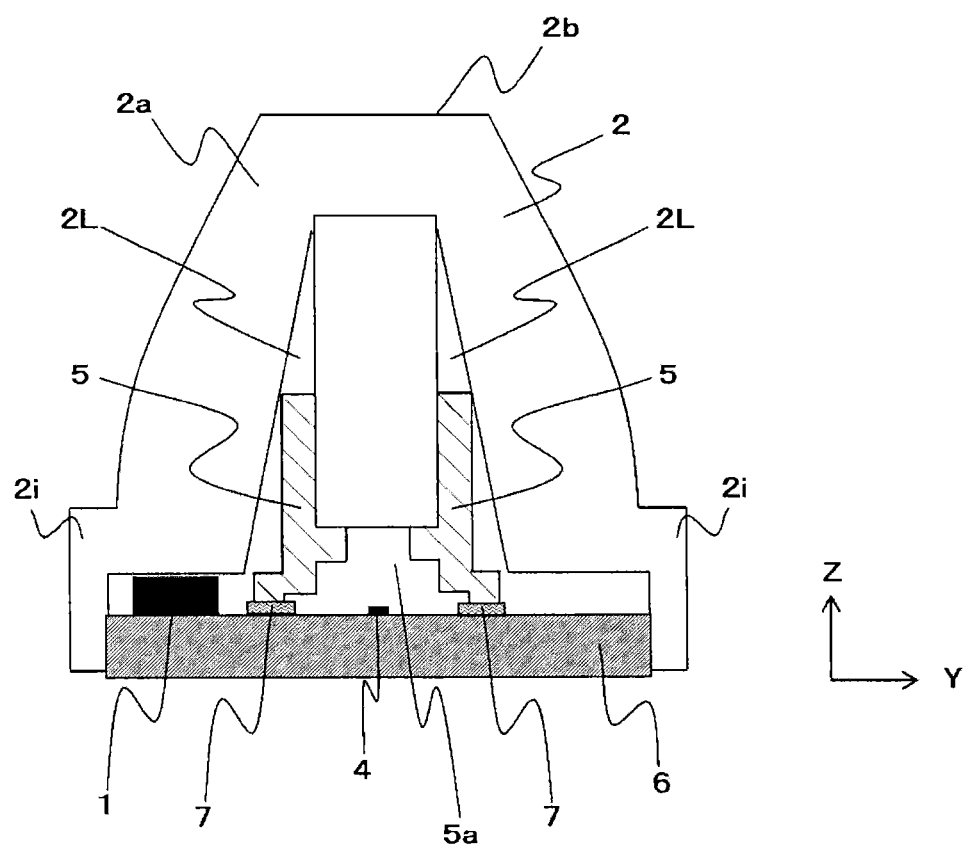
FIG. 26 is a cross-sectional view of the image reader according to Embodiment 5 of the present disclosure.
Figure 27:
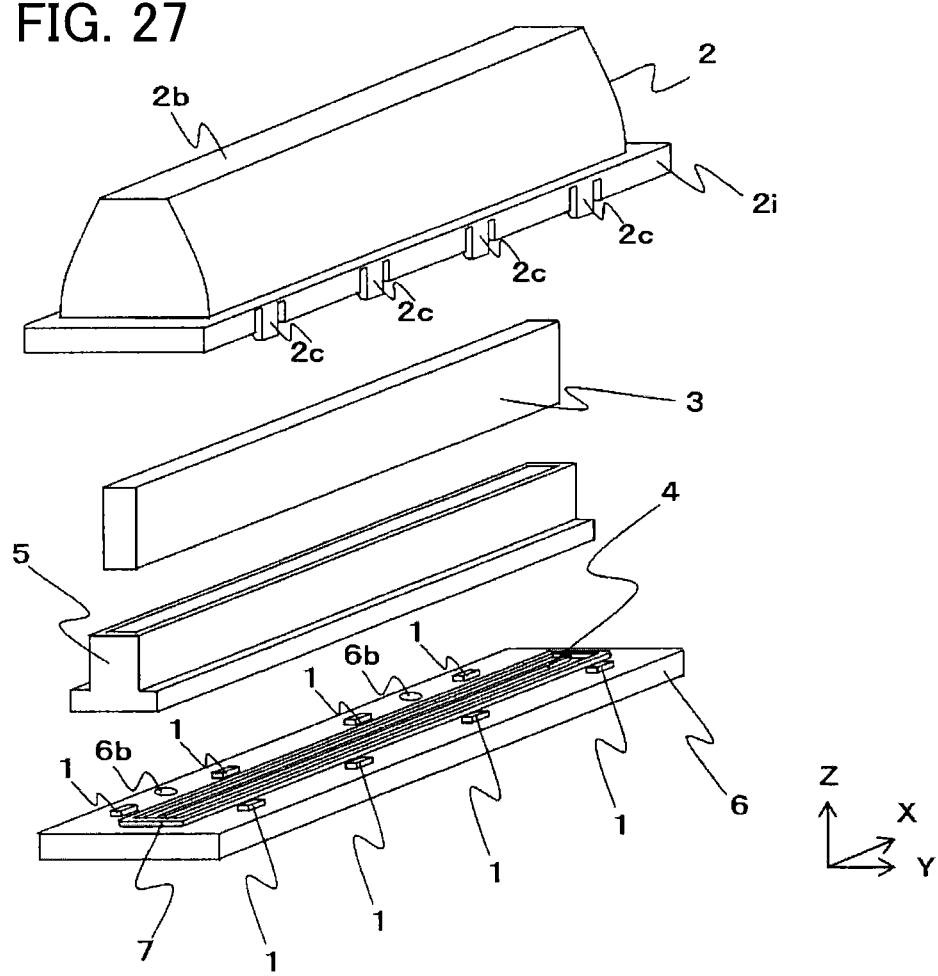
FIG. 27 is an illustrated parts breakdown (exploded oblique drawing) of the image reader according to Embodiment 5 of the present disclosure.

FIG. 26 is a cross-sectional view of the image reader 10 at a virtual plane BB' that is a parallel plane to the YZ plane defined by the Y axis and the Z axis in FIG. 24. More specifically, the virtual plane BB' is a cross section that intersects one of the light-source elements 1 disposed side by side in the main scanning direction (X-axis direction). The light-source elements 1 are arrayed in two rows across the imaging optical system 3 and are arranged in a zigzag pattern. Thus the virtual plane BB' is a cross section that intersects one of the light-source elements 1 arrayed in the main scanning direction (X-axis direction). FIG. 27 is an illustrated parts breakdown (exploded oblique drawing) of the image reader illustrated in FIG. 24, FIG. 25 and FIG. 26. As is clear from FIG. 27, the light-source elements 1 arrayed in two rows are arranged in a zigzag pattern.

In FIGS. 24 to 27, the same or equivalent component is denoted by the same reference sign, and repeated explanation is omitted. In FIGS. 24 to 27, the engagement portions 2c are fasteners that extend toward the board 6 from a flange 2i and that are formed at both sides of the end, opposite to the object-to-be-read M, of the transparent member 2. The flange 2i extends in the direction opposite to the imaging optical system 3. The fasteners can be said to be as portions for fastening together the board 6 and the flange 2i that extends from the end of the transparent member 2 opposite to the object-to-be-read M and in the direction opposite to the sensor IC 4. In Embodiments 1 to 4, because the flange 2i is small, the flange is treated as a portion of the engagement portion 2c, but as in Embodiment 5, the flange can be a component that is separate from the engagement portions 2c. Structure strength is higher if the engagement portion 2c (fastener) and the flange 2i are integrated. The positioning hole 6b illustrated in FIG. 27 is explained together with the explanation of the image reader 10 illustrated in the below-described FIGS. 28 to 31.

In FIGS. 24 to 27, the dust-proofing member 7 is arranged between the light shield member 5 and the board 6, and isolates from the exterior a through-hole portion 5a, which is a space surrounded by the light shield member 5, the surface of the imaging optical system 3 at the sensor-IC-4 side, and the board 6. More specifically, this is a member that suppresses entrance into the through-hole portion 5a of foreign materials from the portion of the board 6 at which the light-source elements 1 are arranged and foreign materials from the exterior of the image reader 10. In addition, as made clear by FIG. 27, the dust-proofing member 7 is arranged on the board in a rectangular shape so as to cover the periphery of the sensor IC 4. That is to say, at the cross section of the image reader 10 parallel to the YZ plane, the dust-proof cover 7 is disposed in the main scanning direction (X-axis direction) so as to be divided into two pieces sandwiching the sensor IC 4. Conversely, the dust-proofing member 7 is disposed in the sub-scanning direction (Y-axis direction) at outside of the photosensitive element disposed at the end portion in the main scanning direction (X-axis direction) with respect to the photosensitive element disposed next to the photosensitive element disposed at the end portion in the main scanning direction (X-axis direction). That is to say, the dust-proofing member 7 has portions extending in the main scanning direction (X-axis direction) and in the sub-scanning direction (Y-axis direction), the portions connected with each other so as to form a rectangular shape.

Next, a detailed explanation is given of the image reader 10 illustrated in FIGS. 24 to 27. As illustrated in the cross-sectional views of FIGS. 25 and 26, the board 6 of the image reader 10 has the sensor IC 4 fastened thereto by a means such as gluing. The dust-proofing member 7 formed of a rubber, a soft resin, or the like is fastened to the board 6 around the sensor IC 4, and the light shield member 5 (light shield 5), formed of a resin or a rigid material like metal, is mounted on the dust-proofing member 7. The light shield member 5 is formed with the through-hole portion 5a that has an opening that has a predetermined length in the sub-scanning direction, that passes through the light shield member in the direction (Z-axis direction) orthogonal to the main scanning direction and the sub-scanning direction, and that extends in the main scanning direction. A stepped portion, stepped in the Z-axis direction toward the board 6, is formed in the through-hole portion 5a. The stepped portion is shaped so as to increase in the width in the Y-axis direction toward the board 6 from a portion where the imaging optical system 3 is fitted in the through-hole portion 5a of the light shield member 5. The dust-proofing member 7 is arranged between the peripheral part of the through-hole portion 5a where Y-axis direction width is maximum and the board 6. The dust-proofing member 7, light shield member 5 and imaging optical system 3 are arranged in this manner on the board 6, thereby preventing foreign materials from entering to the sensor IC 4.

As illustrated in FIGS. 25 and 26, the transparent member 2 employs a structure that has a recess 2L in the interior, and the dust-proofing member 7, light shield member 5 and imaging optical system 3 are retained in this recess 2L. Hence, the recess 2L can be said to be a retainer space for the light shield member 5 and the imaging optical system 3, or for the imaging optical system 3. The end of the imaging optical system 3 opposite to the sensor IC 4 is in contact with the bottom of the recess 2L of the transparent member 2 because the engagement portions 2c (fasteners) of the transparent member 2 hold the board 6, and the imaging optical system 3 supported by the dust-proofing member 7 and the light shield member 5 on the board 6 is pushed upwardly. According to the image reader 10 illustrated in FIGS. 25 and 26, the engagement portions 2c (fasteners) of the transparent member 2 hold the board 6, and thus the light shield member 5 on the board 6 is also in contact with the recess 2L of the transparent member 2. The transparent member 2 is fastened to the board 6 so as to hold the outer periphery of the board 6, and when the transparent member 2 is fastened to the board 6 in this manner, the dust-proofing member 7, light shield member 5 and imaging optical system 3 are pushed against and fastened to the board 6.

As explained above, in the state illustrated in the exploded oblique drawing of FIG. 27, firstly, the light shield member 5 and the imaging optical system 3 abutting the light shield member 5 are mounted on a portion of the board 6 where the dust-proofing member 7 is arranged. Next, the engagement portions 2c of the transparent member 2 engaged with predetermined locations of the board 6, and thus the image reader 10 illustrated in FIG. 24 is obtained. As the predetermined locations of the board 6 to be engaged by the engagement portions 2c, the board 6 can be provided with parts such as hollows to be covered by the engagement portions 2c. The image reader 10 illustrated in FIG. 24 (FIGS. 25 and 26) uses pressing by the transparent member 2 to fasten the dust-proofing member 7, light shield member 5 and imaging optical system 3 integrally to the board 6. Hence, an image reader 10 can be obtained that has a simple structure.

Figure 28:
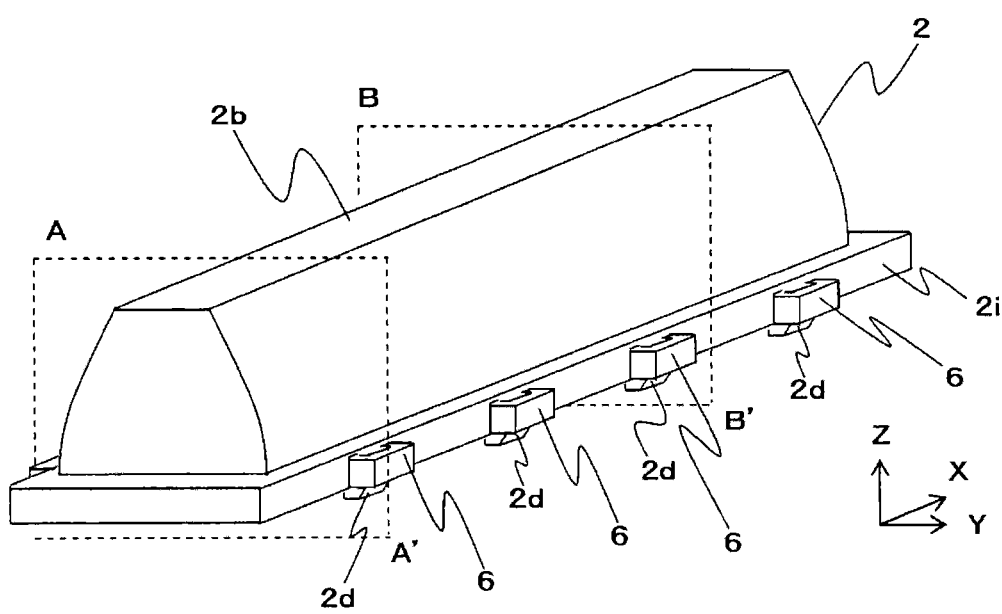
FIG. 28 is a perspective view of the image reader according to Embodiment 5 of the present disclosure.
Figure 29:
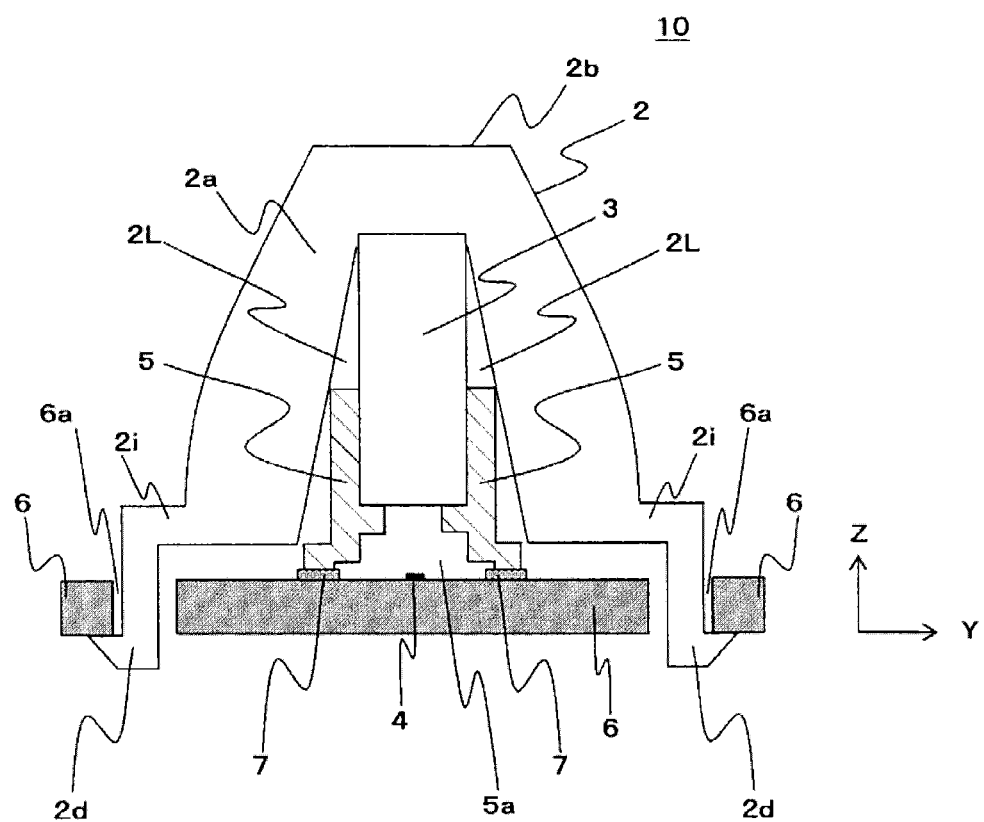
FIG. 29 is a cross-sectional view of the image reader according to Embodiment 5 of the present disclosure.

FIG. 28 is a perspective view of the image reader according to Embodiment 5. FIG. 29 is a cross-sectional view of the image reader 10 at the virtual plane AA', which is a plane parallel to the YZ plane defined by the Y axis and Z axis illustrated in FIG. 28. More specifically, the virtual plane AA' is a cross-sectional view of a portion that intersects one of the multiple engagement portions 2c arrayed in the main scanning direction (X-axis direction). Note that the engagement portions 2c are arrayed in two rows sandwiching the imaging optical system 3. Hence, in a precise sense, the virtual plane AA' is a cross section that intersects the two engagement portions 2c arrayed in the main scanning direction (X-axis direction). Needless to say, when the engagement portions 2c arrayed in two rows sandwiching the imaging optical system 3 are arranged in a zigzag pattern, the virtual plane AA' can be said to be a cross section that intersects one of the engagement portions 2c multiply arrayed in the main scanning direction (X-axis direction).

Figure 30:
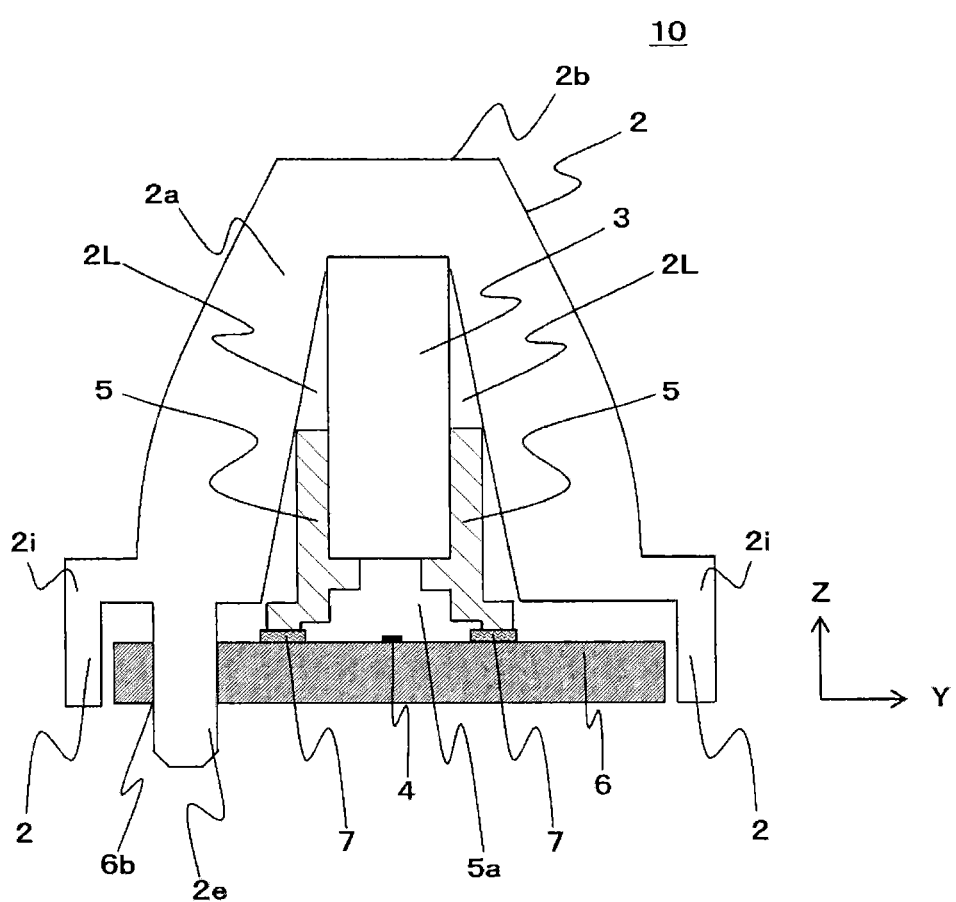
FIG. 30 is a cross-sectional view of the image reader according to Embodiment 5 of the present disclosure.
Figure 31:
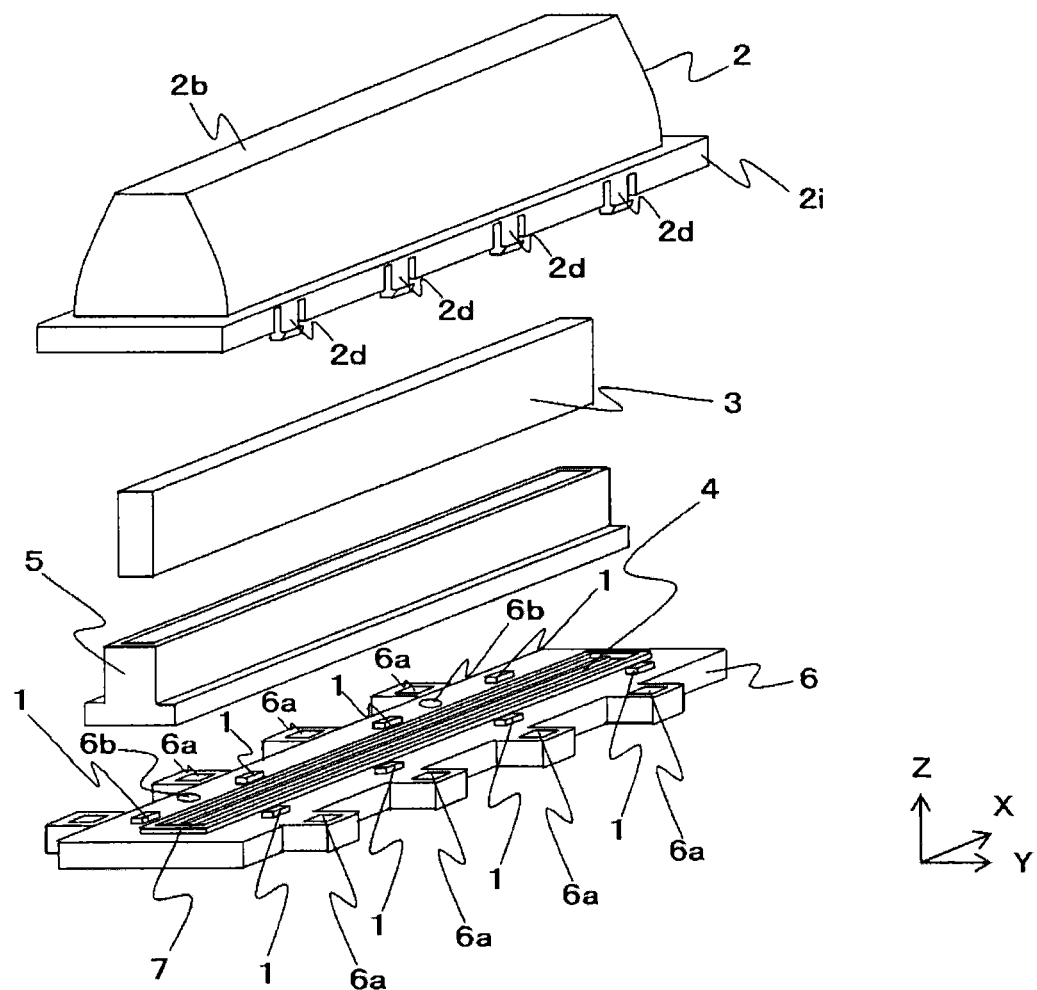
FIG. 31 is an illustrated parts breakdown (exploded oblique drawing) of the image reader according to Embodiment 5 of the present disclosure.

FIG. 30 is a cross-sectional view of the image reader 10 at the virtual plane BB', which is a plane parallel to the YZ plane defined by the Y axis and Z axis in FIG. 28. More specifically, the virtual plane BB' is a cross-sectional view of a portion that intersects a boss 2e of the below-described transparent member 2. FIG. 31 is an illustrated parts breakdown (exploded oblique drawing) of the image reader illustrated in FIGS. 28, 29 and 30. As made clear by FIG. 31, the light-source elements 1 are arrayed in two rows sandwiching the imaging optical system 3 and are arranged in a zigzag pattern.

In FIGS. 28 to 31, the same or equivalent component is denoted by the same reference sign, and repeated explanation thereof is omitted. In FIGS. 28 to 31, the engagement portions 2d are fasteners of the transparent member 2 that extend toward the board 6 from the flange 2i and are formed at both sides of the end, opposite to the object-to-be-read M, of the transparent member 2. The bosses 2e extend toward the board 6 from the flange 2i and are formed at the end of the transparent member 2 opposite to the object-to-be-read M. The bosses 2e can be formed at both sides of the end, opposite to the object-to-be-read M, of the transparent member 2. Holes 6a for engaging with the engagement portions 2d are formed respectively so as to pass through the board 6. Positioning holes 6b are used for positioning by insertion of the bosses 2e.

Next, the image reader 10 illustrated in FIGS. 28 to 31 is explained in detail. As is illustrated in the cross-sectional views of FIGS. 29 and 30, the sensor IC 4 is fastened to the board 6 of the image reader 10 by a means such as gluing as in the image reader 10 illustrated in FIGS. 24 to 27, and the dust-proofing member 7, light shield member 5 and imaging optical system 3 are mounted on the board 6. The dust-proofing member 7, light shield member 5 and imaging optical system 3 are arranged on the board 6 in this manner, thereby preventing foreign materials from entering to the sensor IC 4.

As illustrated in the cross-sectional views of FIGS. 29 and 30, the transparent member 2 employs a structure that has the internal recess 2L, and the dust-proofing member 7, light shield member 5 and imaging optical system 3 are retained in this recess 2L. The end of the imaging optical system 3 opposite to the sensor IC 4 is in contact with the bottom of the recess 2L of the transparent member 2 because the engagement portions 2d (fasteners) of the transparent member 2 hold the board 6 and the dust-proofing member 7 on the board 6 and the imaging optical system 3 supported by the light shield member 5 are pushed upwardly. According to the image reader 10 illustrated in FIGS. 29 and 30, the engagement portions 2d (fasteners) of the transparent member 2, fitted in the holes 6a of the board 6, hold the board 6 through the holes 6a, and thus the light shield member 5 on the board 6 is also in contact with the recess 2L of the transparent member 2. In addition, when the engagement portions 2d (fasteners) are engaged, the bosses 2e of the transparent member 2 are inserted in the positioning holes 6b of the board 6. Thus sufficient positional accuracy can be obtained in the mutual positional relationship between the transparent member 2 and the board 6.

The transparent member 2 is fastened to the board 6 by passing the engagement portions 2d through the holes 6a provided at the outer periphery of the board 6 so as to hold the board 6, and when the transparent member 2 is fastened to the board 6 in this manner, the dust-proofing member 7, light shield member 5 and imaging optical system 3 can be said to be pushed against so as to be fastened to the board 6. Moreover, in order to prevent mispositioning due to clearance between the hole 6a of the board 6 and the engagement portion 2d, the bosses 2e of the transparent member 2 are fitted in the positioning holes 6b of the board 6, thereby securing the aforementioned accurate positioning.

In this manner, starting in the state illustrated in the illustrated parts breakdown of FIG. 31, firstly the light shield member 5 and the imaging optical system 3 abutting the light shield member 5 are mounted on a portion of the board 6 where the dust-proofing member 7 is arranged. Next, the engagement portions 2d of the transparent member 2 are engaged with the holes 6a of the board 6, thus the image reader 10 illustrated in FIG. 28 is obtained. The image reader 10 illustrated in FIG. 28 (FIGS. 29 and 30) uses pressure of the transparent member 2 to fasten the dust-proofing member 7, light shield member 5 and imaging optical system 3 integrally to the board 6. Hence, the image reader 10 can be obtained using a simple structure.

Moreover, the image reader 10 illustrated in FIGS. 28 to 31 has portions of the board 6 that protrude in the Y-axis direction and at which the holes 6a are formed. In addition, as illustrated in FIG. 30, the transparent member 2 further includes a portion that extends from the flange 2i toward the board 6 and is formed at both sides of the end portion opposite to the object-to-be-read M besides the engagement portions 2d of the transparent member 2. Hence, except for the parts where the transparent member 2 is engaged with the board 6, portions extending from the flange 2i toward the board 6 cover the side faces of the board 6. When the positioning holes 6b and the bosses 2e of the image reader 10 illustrated in FIGS. 28 to 31 are applied to the image reader 10 illustrated in FIGS. 24 to 27, sufficient positioning accuracy in the mutual positional relationship between the transparent member 2 and the board 6 can be obtained. The positioning holes 6b are illustrated in FIG. 27, but the bosses 2e are not illustrated in FIGS. 24 to 27.

FIGS. 32 to 37 are cross-sectional views of a portion that intersects a fastener of the image reader 10 and one of the light-source elements 1 disposed arrayed in the main scanning direction (X-axis direction), and is a cross-sectional view (except for the fastener) at a location corresponding to the virtual plane BB' that is parallel to the YZ plane defined by the Y axis and the Z axis illustrated in FIG. 24. The plurality of light-source elements 1 are arrayed in two rows along the main scanning direction (X-axis direction) sandwiching the imaging optical system 3 and are arranged in a zigzag pattern, and thus the virtual plane BB' is a cross section that intersects one of the light-source elements 1 arrayed in two rows. FIG. 32A illustrates a state in which a boss 2f (fastener) is fitted into the hole 6a. FIG. 32B illustrates a state in which the distal end of the boss 2f fitted in the hole 6a is thermally fusion bonded to the board 6.

Figure 32A:
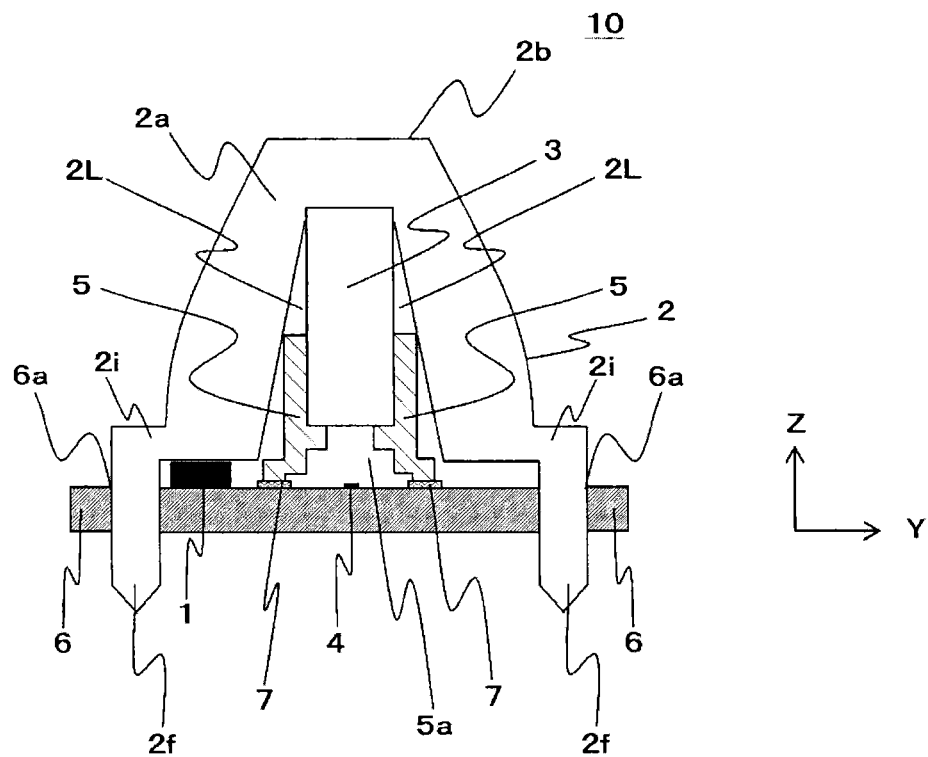
FIGS. 32A and 32B are a cross-sectional view of the image reader according to Embodiment 5 of the present disclosure.
Figure 32B:
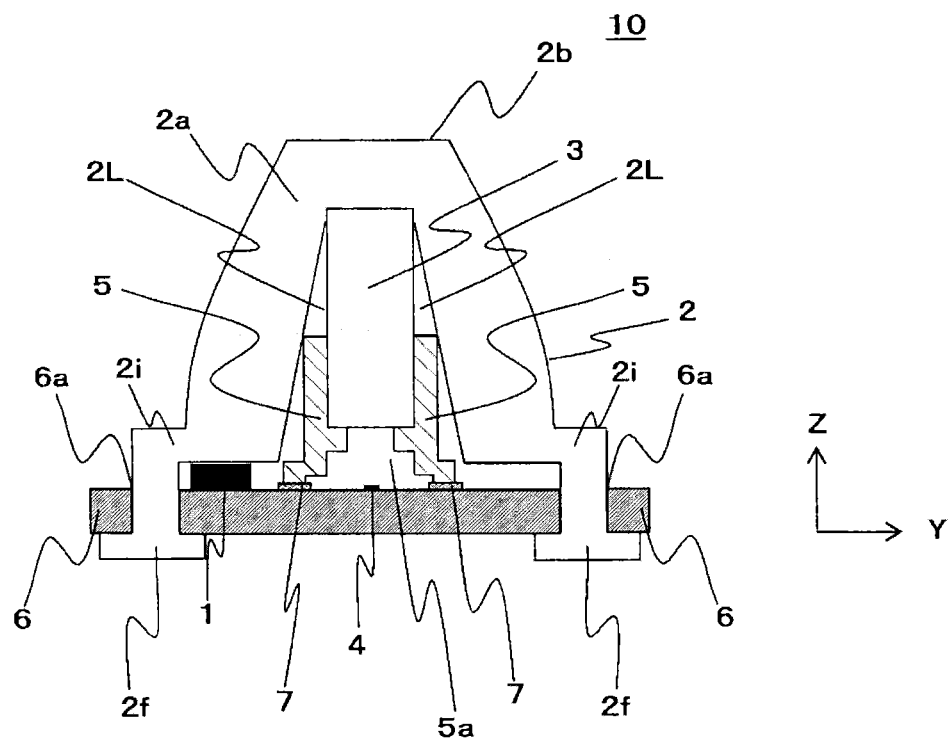

In FIGS. 32A and 32B, the same or equivalent component is denoted by the same reference sign, and repeated explanation thereof is omitted. The bosses 2f are fasteners of the transparent member 2 that extend toward the board 6 from the flange 2i and that are formed at both sides of the end portion of the transparent member 2 opposite to the object-to-be-read M. The bosses 2f are fitted in the holes 6a, which pass through the board 6. The distal end of the boss 6f fitted in the hole 6a is thermally fusion bonded to the board, thereby fastening, with the transparent member 2 (bosses 2f), the opposite surface of the board 6 to the surface on which the sensor IC 4 is formed.

In the image reader 10 illustrated in FIGS. 24 to 32, the board 6 and the transparent member 2 are fastened by the engagement portions 2c or the engagement portions 2d of the transparent member 2. In order to manufacture the image reader 10 illustrated in FIG. 32B, as illustrated in FIG. 32A, the bosses 2f are fitted in the holes 6a provided at the outer circumference of the board 6. Next, a protrusion 2f of the boss 2f from the board 6 is melted by heat, thereby fastening the transparent member 2 to the board 6. In other words, before melted by heat, the bosses 2f can be said to serve as parts for positioning, and after melted by heat, the bosses serve as a fastener. Further explaining more specifically about prior to melting by heat, the bosses 2f correspond to the bosses 2e, and the holes 6a correspond to the positioning holes 6b.

Figure 33:
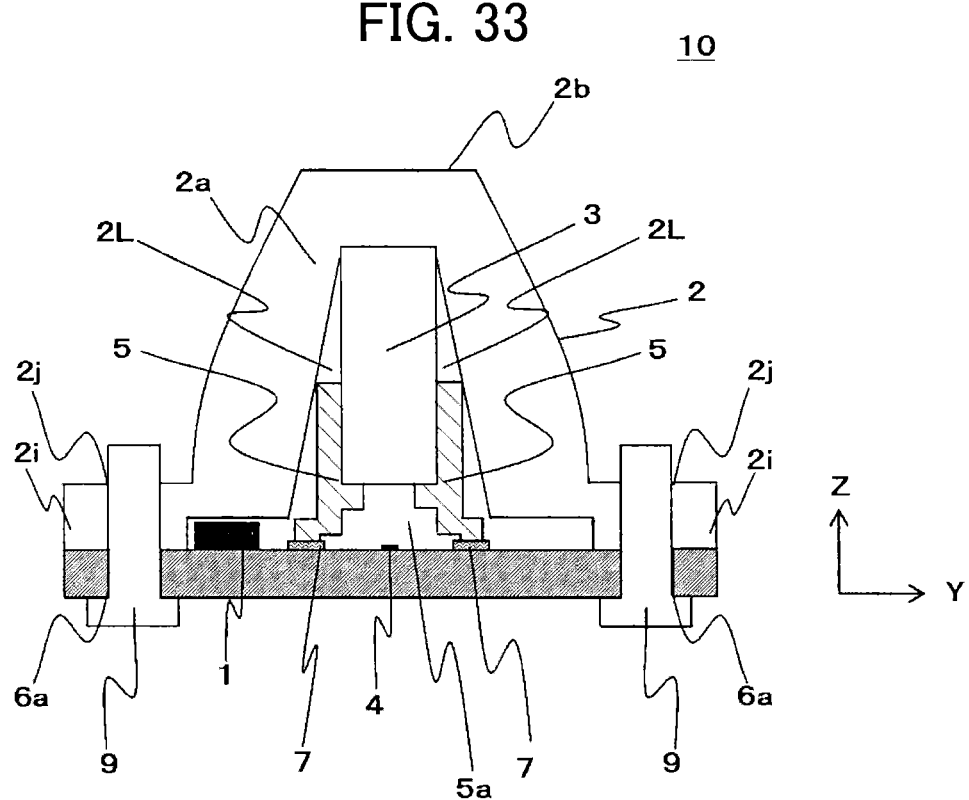
FIG. 33 is a cross-sectional view of the image reader according to Embodiment 5 of the present disclosure.

In FIG. 33, the same or equivalent component is denoted by the same reference sign, and repeated explanation thereof is omitted. In FIG. 33, screws 9 are fitted in the holes 6a that pass through the board 6. The screws 9 are fitted in the holes 6a and a screw holes 2j of the flange 2i, and are tightened. The screw holes 2j pass through the flange 2i from the object-to-be-read-M side to the board-6 side.

According to the image reader 10 illustrated in FIG. 33, the flange 2i is provided at the outer periphery of the transparent member 2, the screw holes 2j are formed in the flange 2i, and the board 6 having preformed holes 6a are fastened by the screws 9, thereby fastening together the transparent member 2 and the board 6. Thus an image reader can be obtained that has a simple structure, having a high degree of freedom of design, such as the selection of locations where the fasteners (screws 9) are formed and the number of fasteners (screws 9).

Figure 34:
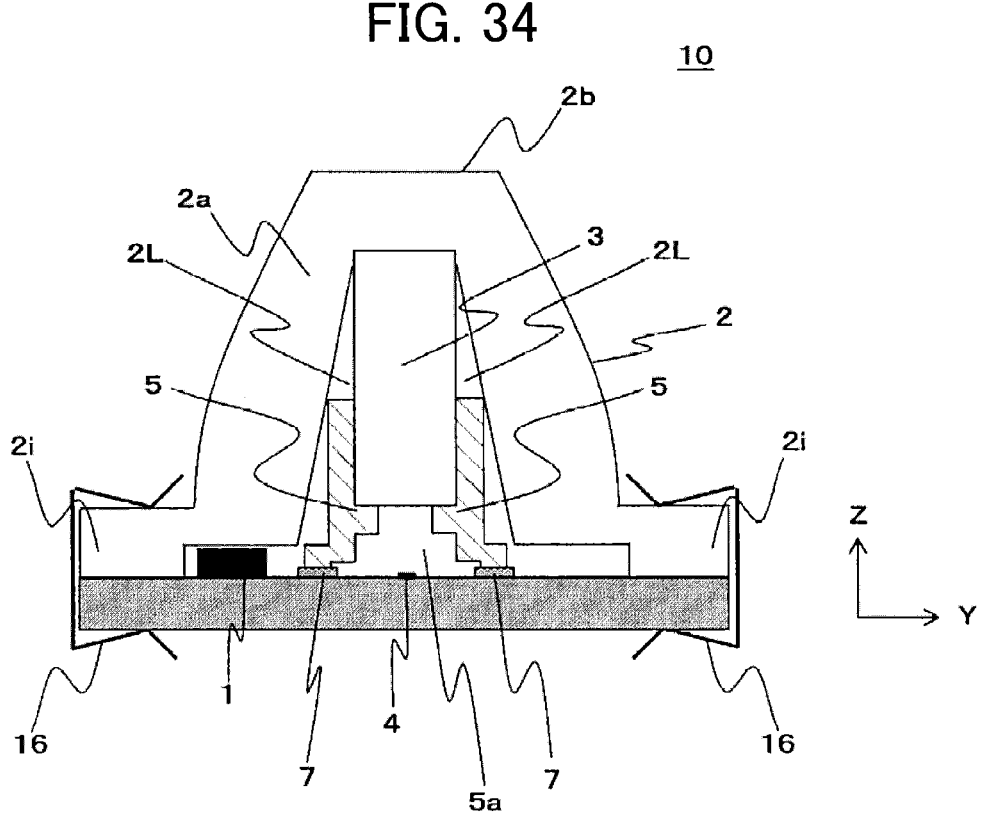
FIG. 34 is a cross-sectional view of the image reader according to Embodiment 5 of the present disclosure.
Figure 35:
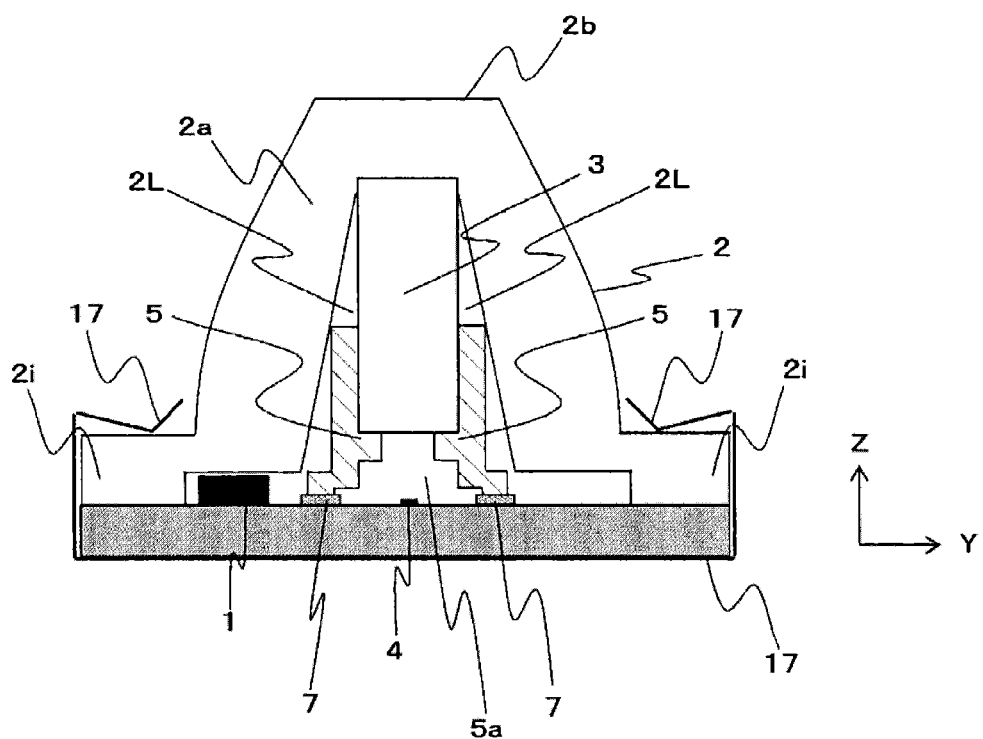
FIG. 35 is a cross-sectional view of the image reader according to Embodiment 5 of the present disclosure.

In FIGS. 34 and 35, the same or equivalent component is denoted by the same reference sign, and repeated explanation is omitted. In FIGS. 34 and 35, clips 16 are fasteners that pinch the end portion of the flange 2$i$ and that of the board 6 in the Y-axis direction, thereby fastening those components. Clips 17 are fasteners that clip both end portions of the flange 2$i$ in the Y-axis direction from the surface of the board 6 opposite to the surface on which the sensor IC 4 is formed, thereby fastening those components. The clip 17 can be said to be such a clip that the two clips 16 are connected at the portions in the side of the surface opposite to surface on which the sensor IC 4 is formed. This portion of the clip 17 can be curved so as to abut against the board 6. More specifically, the apex of the curved portion of the clip 17 is made to press against the board 6. This curved portion has the same shape as that of the curved portion of the below-described elastic member 19.

According to the image reader 10 illustrated in FIGS. 34 and 35, the flange 2$i$ is provided at the outer periphery of the transparent member 2, and the flange 2$i$ and the board 6 are pinched by the clips 16 (clips 17), thereby fastening together the transparent member 2 and the board 6. Hence, the fasteners (clips 16 and clips 17) can be separate components completely from the transparent member 2 and the board 6. Therefore, an image reader can be obtained that has a high degree of freedom of design, such as the selection of the locations where the fasteners (clips 16, clips 17) are provided and the number of fasteners (clip 16, clip 17).

Figure 36:
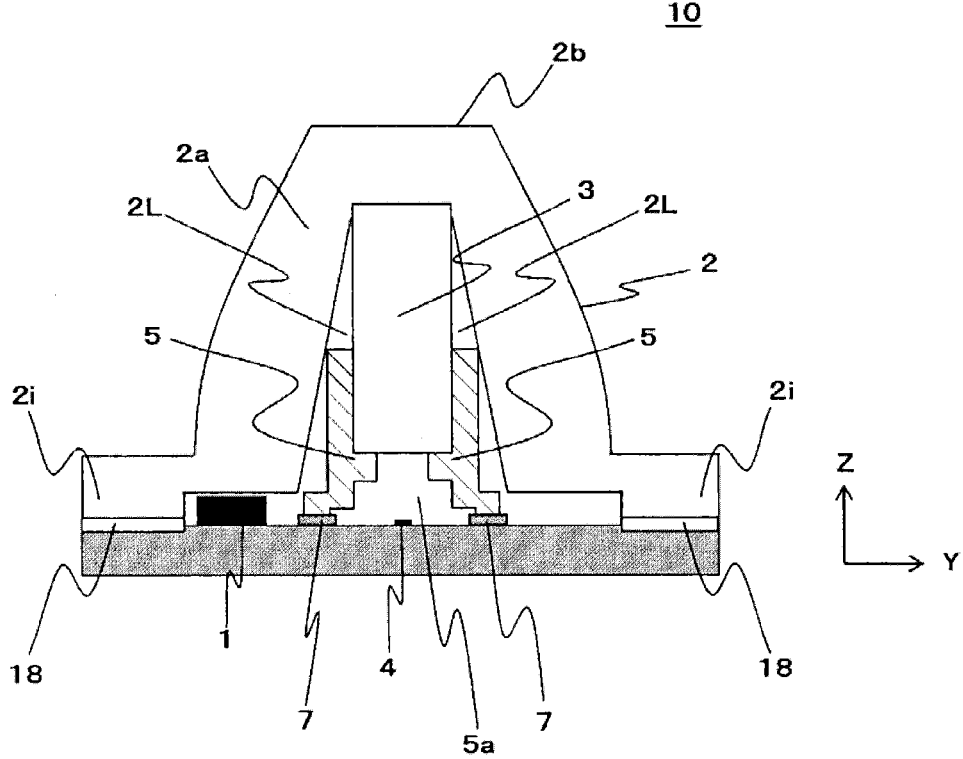
FIG. 36 is a cross-sectional view of the image reader according to Embodiment 5 of the present disclosure.

In FIG. 36, the same or equivalent component is denoted by the same reference sign, and repeated explanation thereof is omitted. In FIG. 36, an adhesive 18 is used as a fastener that glues and fastens the flange 2$i$ to the end portion of the board 6 in the Y-axis direction by adhesive, adhesive tape, or the like. The adhesive 18 may join the transparent member 2 to the board 6 across continuously the main scanning direction (X-axis direction), or may join the transparent member 2 with the board 6 intermittently in that direction.

According to the image reader 10 illustrated in FIG. 36, the flange 2$i$ is provided at the outer periphery of the transparent member 2, and the flange 2$i$ is joined to the board 6 by the adhesive 18, thereby fastening together the transparent member 2 and the board 6. Hence, the fastener (adhesive 18) can be a separate component completely from the transparent member 2 and the board 6, and thus an image reader can be obtained that has a high degree of freedom of design, such as the selection of the location where the fastener (adhesive 18) is formed.

Figure 37:
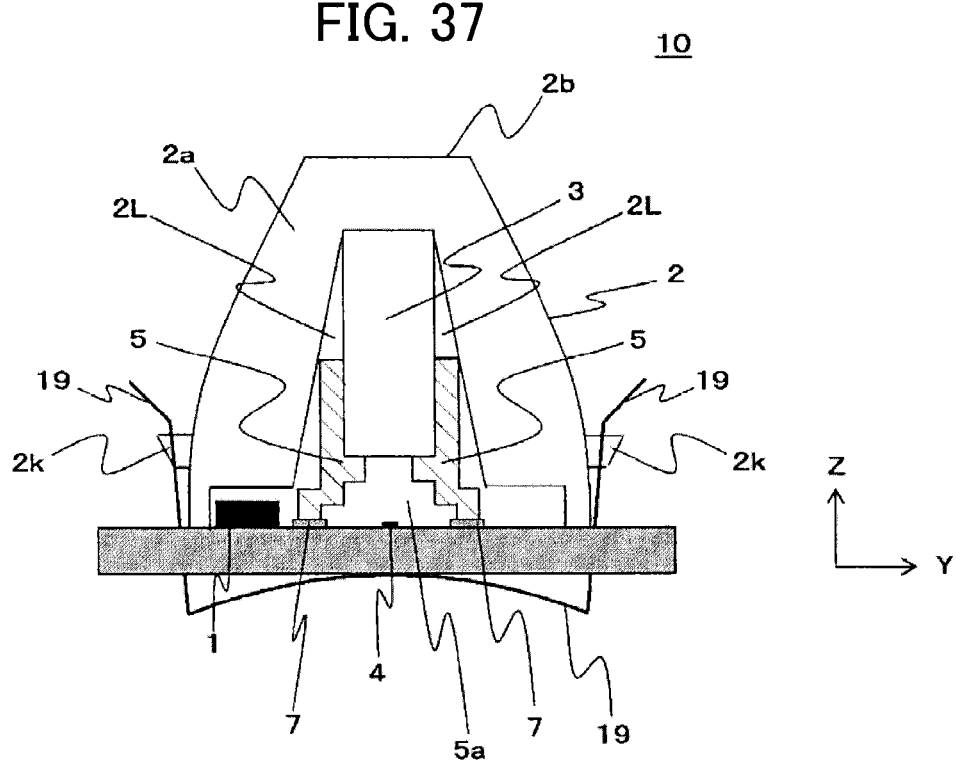
FIG. 37 is a cross-sectional view of the image reader according to Embodiment 5 of the present disclosure.

In FIG. 37, the same or equivalent component is denoted by the same reference sign, and repeated explanation thereof is omitted. In FIG. 37, projections 2$k$ are formed on the respective surfaces of the transparent member 2 located opposite to the retainer space 2L and at both of the front and back in the sub-scanning direction that intersects the main scanning direction. An elastic member 19 (transparent-member fastening elastic member 19) includes a curved portion curved toward the surface of the board 6 opposite to the surface on which the sensor IC 4 is formed, and first and second flat portions formed at both ends of the curved portion and engaged with the two projections 2$k$ (through-holes or holes in projections 2$k$), respectively.

In the image reader 10 illustrated in FIG. 37, the projections 2$k$ with respective through-holes are formed on the outer periphery of the transparent member 2, and the elastic member 19 is engaged with the through-holes of the projections 2$k$ or the holes thereof, thereby fastening together the transparent member 2 and the board 6. More specifically, the elastic member 19 has the first flat portion and the second flat portion that pass through the board 6 or hold the board 6 and exist between the surface of the board 6 on which the sensor IC 4 is formed and the opposite surface thereto, and has the curved portion pushed against the opposite surface of the board 6 to the surface on which the sensor IC 4 is formed and in contact with this surface. Thus an image reader can be obtained that the fastener, despite having a simple structure, is able to fasten reliably together the transparent member 2 and the board 6.

An explanation is given of a configuration in which the structure of the image reader 10 illustrated in FIG. 37 is applied to the image reader of Embodiment 3, that is to say, the image reader 10 in a shape that exposes one of the two side faces of the imaging optical system 3 and light shield member 5 along the main scanning direction (X-axis direction) or one of the two side faces of the imaging optical system 3 along the main scanning direction (X-axis direction).

Firstly, a configuration is explained in which the structure of the image reader 10 illustrated in FIG. 37 is applied to the image reader of Embodiment 3, which has a shape exposing one of the two side faces of the imaging optical system 3 and light shield member 5 along the main scanning direction (X-axis direction) and which has the light shield member 5 provided with second projections that correspond to the projections 2$k$ illustrated in FIG. 37. In this case, the fasteners include first projections 2$k$ formed on the surfaces of the transparent member 2 located opposite to the retainer space 2L (exactly same as the projections 2$k$ formed on the transparent member 2 and illustrated in FIG. 37), and a second projection formed on a surface of the light shield member 5 opposite to the sensor IC 4 and exposed from the transparent member 2. In addition, the fasteners also include the elastic member 19, which is similar to the one illustrated in FIG. 37. That is to say, the elastic member 19 includes the curved portion curved toward the other surface side of the board 6, and the first and the second flat portions formed at both ends of the curved portion, and to be engaged with the first projections 2$k$ and the second projection respectively. Still further, the elastic member has first and second flat portions that pass through the board 6 or hold the board 6 and exist between the one surface of the board 6 and the other surface thereof, and has the curved portion pushed against the other surface of the board 6 and being in contact with this surface.

Next, an explanation is given of a case in which the structure of the image reader 10 illustrated in FIG. 37 is applied to the image reader of Embodiment 3 and a projection 2$k$ similar to the one illustrated in FIG. 37 is provided on at least the side face of the transparent member 2 in the main scanning direction (X-axis direction) and at a side where the imaging optical system 3 is exposed. In this case, the fastener employs naturally the same structure as that of the image reader 10 illustrated in FIG. 37. The difference is that at least the imaging optical system 3 is exposed at one of the two side faces along the main scanning direction (X-axis direction). That is to say, the light shield member 5 may also be exposed together with the imaging optical system 3. In other words, in configurations where the structure of the image reader 10 illustrated in FIG. 37 is applied to the image reader of Embodiment 3, and both imaging optical system 3 and light shield member 5 are exposed, the configurations may be grouped into two groups, one is a configuration in which the second projection is formed on the light shield member 5, and the other is a configuration in which the projection 2k is formed only on the transparent member 2.

Embodiment 6

Embodiment 6 of the present disclosure is explained with reference to FIGS. 38 to 44. In Embodiment 6, a modified example of the fastening structure for the imaging optical system 3 in the image reader according to the present disclosure is explained. The difference between the image reader of Embodiment 6 and the image reader of other Embodiments is as follow. That is to say, the transparent member 2 (light guide 2) is made of transparent material, retains the imaging optical system 3 in the retainer space 2L, and fastens together a portion of the imaging optical system 3 at the object-to-be-read-M side and the retainer space 2L, or causes the imaging optical system 3 to be in contact partially with the retainer space 2L, thereby fastening the imaging optical system 3. The light shield member 5 (light shield 5) supports the portion of the imaging optical system 3 at the sensor-IC-4 side, or is in contact with the portion of the imaging optical system 3 at the sensor-IC-4 side, blocks light other than light focused by the imaging optical system 3, and is covered by the transparent member 2. Hence, the image reader of Embodiment 6 and the image reader of other Embodiments are interchangeable with each other.

Figure 40:
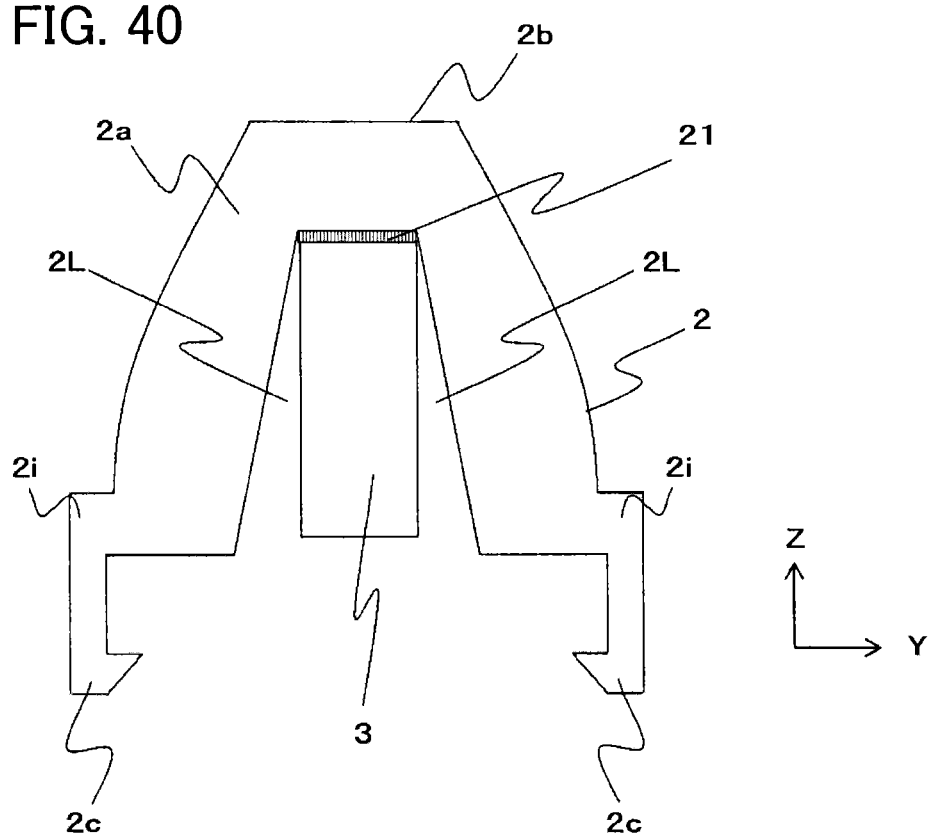
FIG. 40 is a cross-sectional view of the image reader according to Embodiment 6 of the present disclosure.
Figure 41:
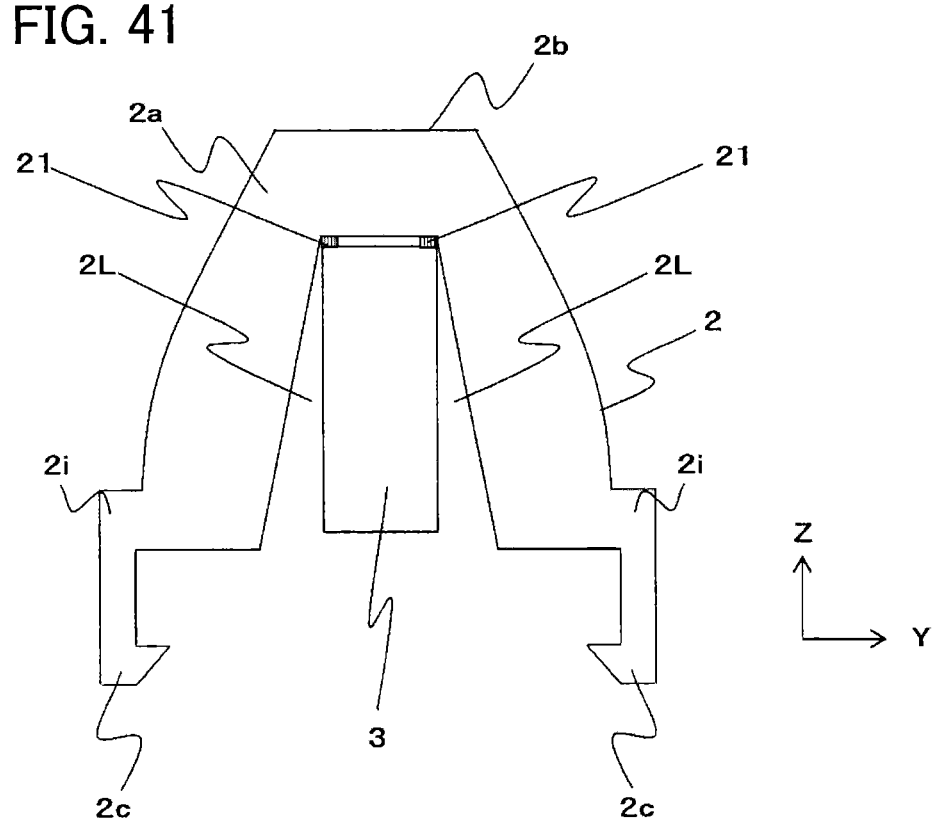
FIG. 41 is a cross-sectional view of the image reader according to Embodiment 6 of the present disclosure.
Figure 42:
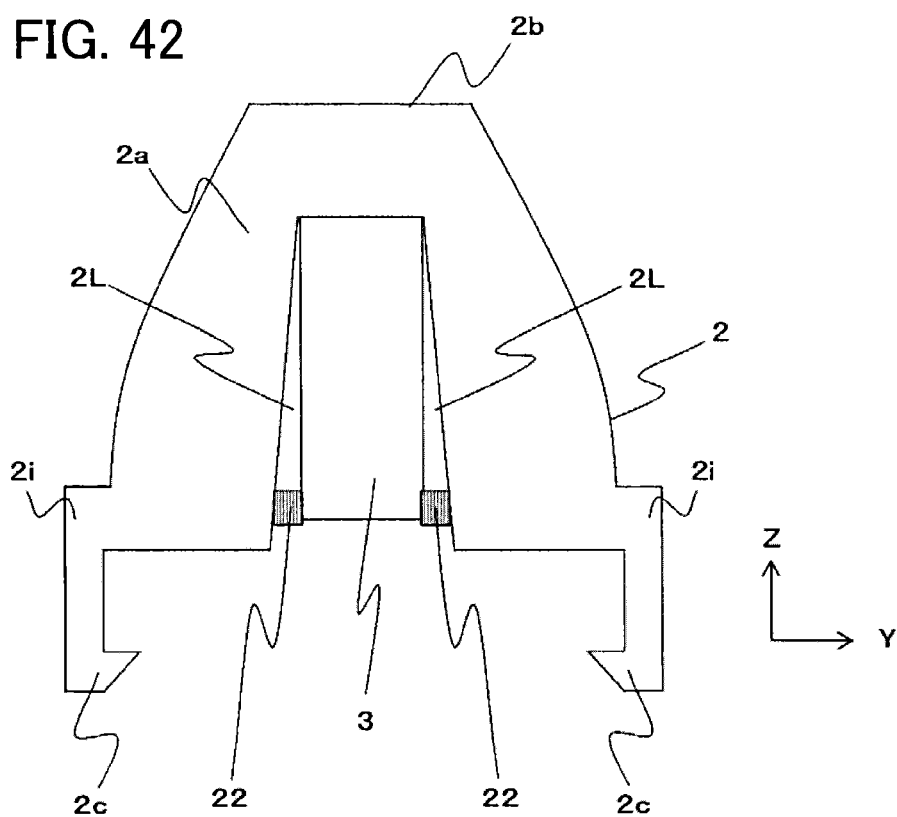
FIG. 42 is a cross-sectional view of the image reader according to Embodiment 6 of the present disclosure.
Figure 43:
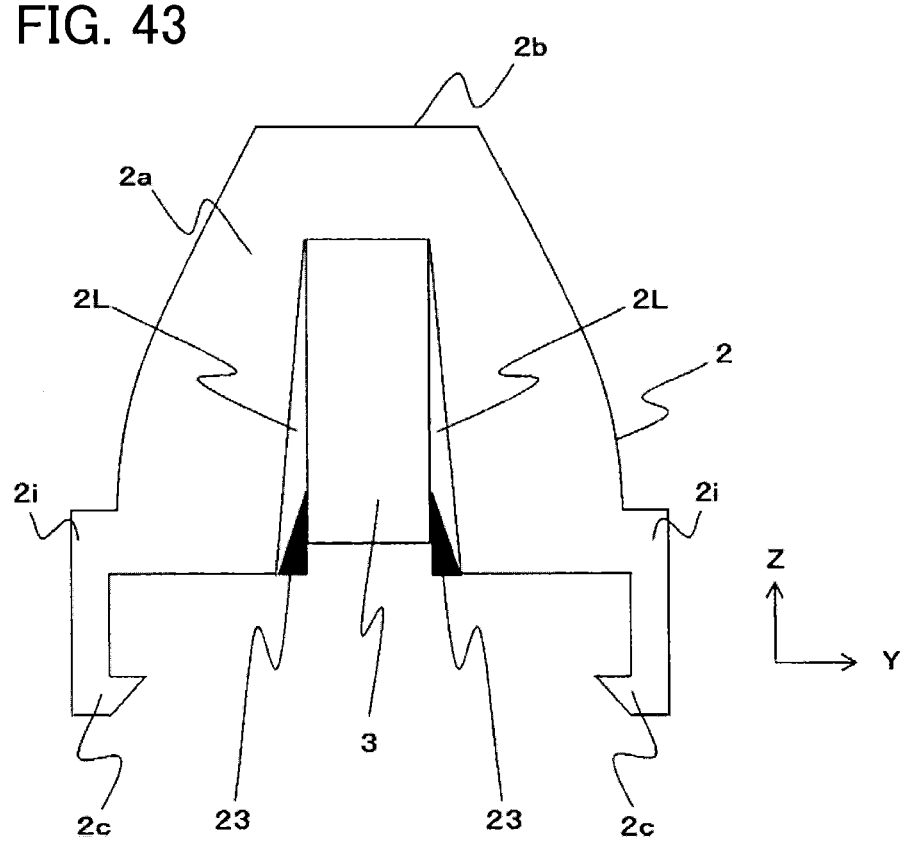
FIG. 43 is a cross-sectional view of the image reader according to Embodiment 6 of the present disclosure.
Figure 44:
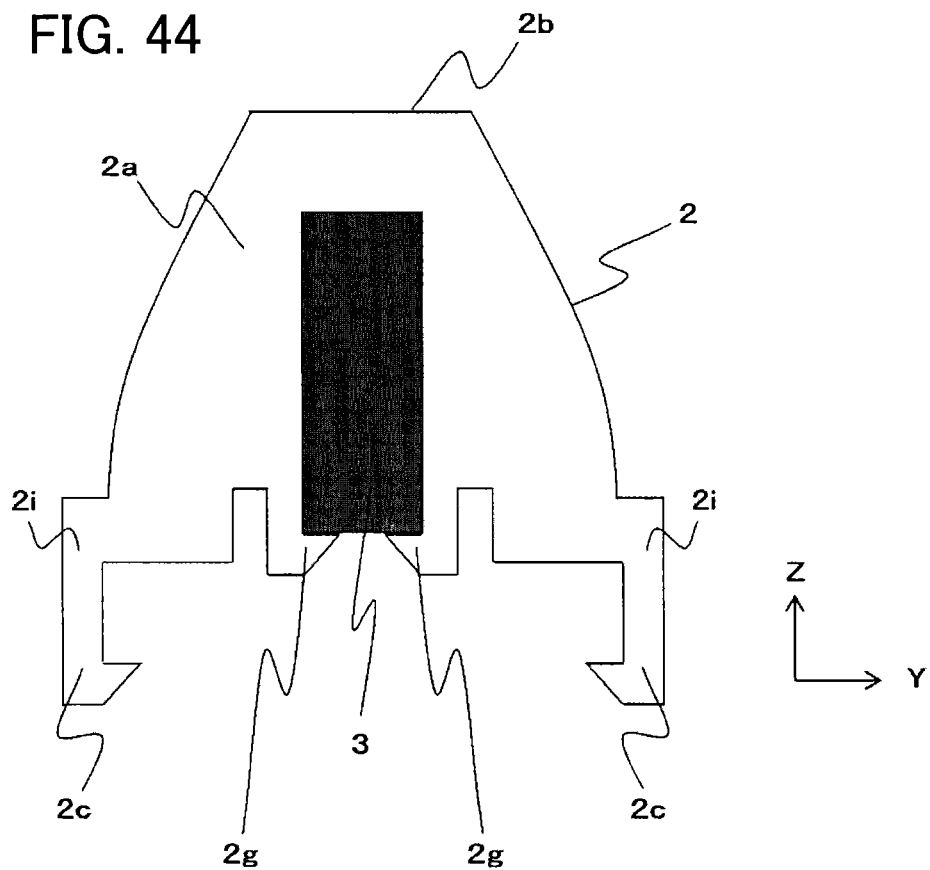
FIG. 44 is a cross-sectional view of the image reader according to Embodiment 6 of the present disclosure.

FIGS. 38 to 44 are each a cross-sectional view of the fasteners (engagement portions 2c) of the image reader 10 and a portion that intersects one of the plurality of light-source elements 1 arrayed in the main scanning direction (X-axis direction), and is a cross-sectional view at a location corresponding to the virtual plane BB' that is a plane parallel to the YZ plane defined by the Y axis and the Z axis in FIG. 24 (except for the fasteners (engagement portions 2c)). The plurality of light-source elements 1 are arrayed in two rows along the main scanning direction (X-axis direction) sandwiching the imaging optical system 3 and are arranged in a zigzag pattern, and thus the virtual plane BB' is a cross section that intersects one of the light-source elements 1 disposed in two rows. In FIG. 42, FIG. 43 and FIG. 44, the light shield member 5 and the board 6 are not illustrated. In other words, the transparent member 2 illustrated in FIG. 42, FIG. 43 and FIG. 44 are in a state prior to fastening (engaging) of the board 6.

Figure 38:
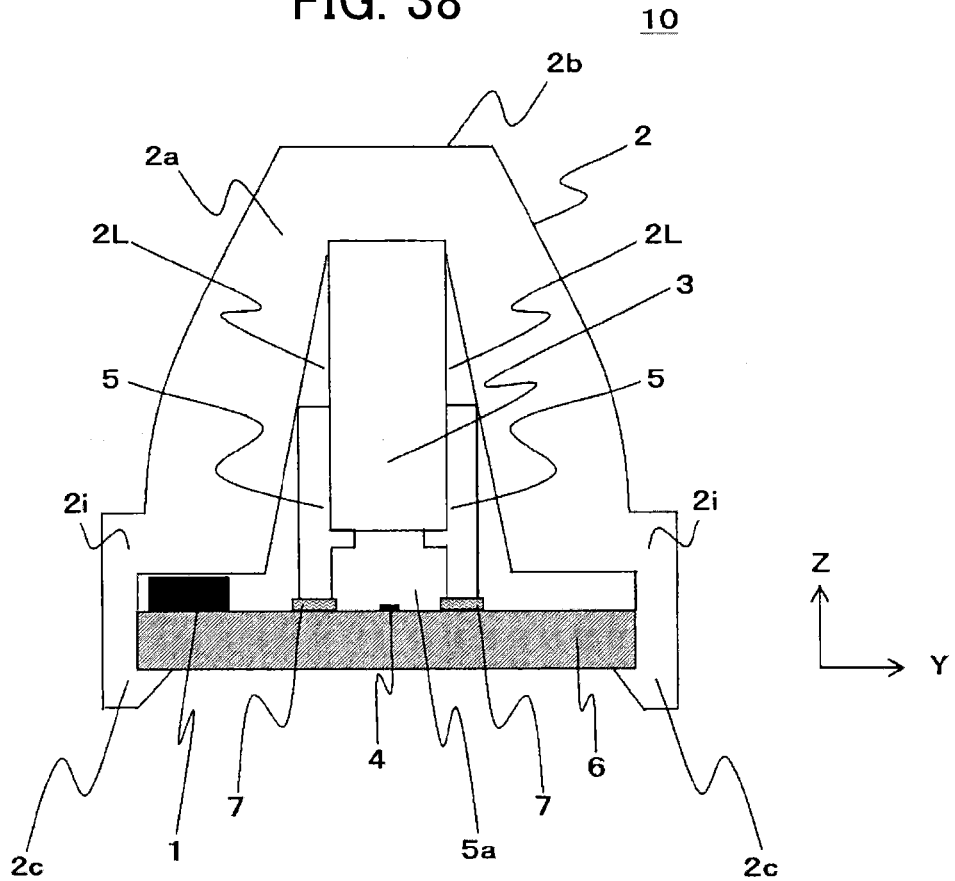
FIG. 38 is a cross-sectional view of an image reader according to Embodiment 6 of the present disclosure.

In FIG. 38, the same or equivalent component is denoted by the same reference sign, and repeated explanation is omitted. In FIG. 38, the light shield member 5, which is formed of a rigid material such as resin or metal, is mounted on the dust-proofing member 7 mounted on the board 6. The through-hole portion 5a of the light shield member 5 is formed in a shape with a stepped portion in the direction in which the through-hole penetrates the light shield member 5, and the imaging optical system 3 is fitted in the through-hole portion 5a of the light shield member 5 so as to abut against the stepped portion. In the fastening of the imaging optical system 3, when the object-to-be-read-M side of the imaging optical system 3 is fastened to the retainer space 2L by the light shield member 5 in addition to a support by fitting the imaging optical system 3 in the through-hole portion 5a, the imaging optical system 3 can be only in contact with the through-hole portion 5a or the light shield member 5.

According to the image reader 10 illustrated in FIG. 38, since the light shield member 5 that has the through-hole portion 5a in which the imaging optical system 3 is fitted is engaged with the retainer space 2L of the transparent member 2, the imaging optical system 3 and a portion of the retainer space 2L are in contact with each other, thereby fastening the imaging optical system 3 to the transparent member 2. Hence, an image reader 10 can be obtained that can hold the imaging optical system 3 regardless of the magnitude of holding force of the board 6 by the fasteners (engagement portions 2c and the like).

Figure 39:
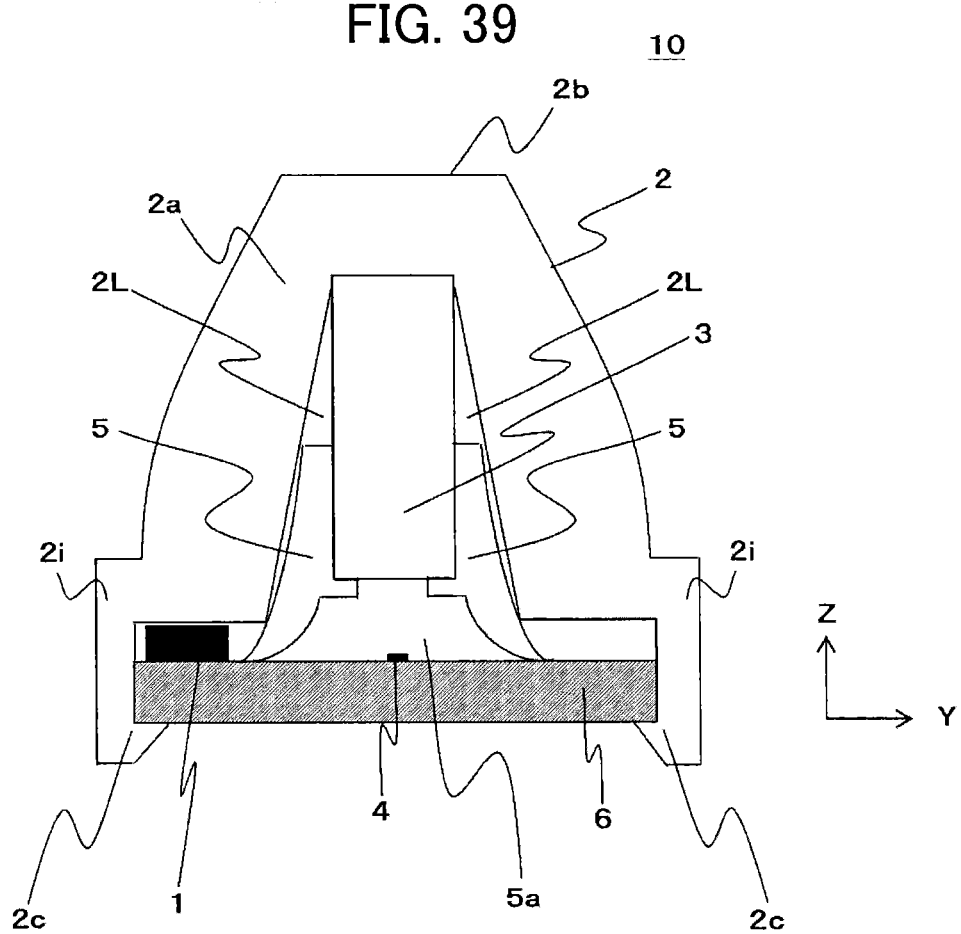
FIG. 39 is a cross-sectional view of the image reader according to Embodiment 6 of the present disclosure.

In FIG. 39, the same or equivalent component is denoted by the same reference sign, and repeated explanation thereof is omitted. In FIG. 39, the light shield member 5 is formed of an elastic member such as a soft resin or rubber and the like, and is mounted on the board 6. The through-hole portion 5a of the light shield member 5 has a shape including a portion stepped in the penetration direction, and the imaging optical system 3 is fitted in the through-hole portion 5a of the light shield member 5 so as to abut against the stepped portion. In the fastening of the imaging optical system 3, rather than just supporting by fitting the imaging optical system 3 in the through-hole portion 5a, when the object-to-be-read-M side of the imaging optical system 3 is fastened to the retainer space 2L by the light shield member 5, the imaging optical system 3 can be only in contact with the through-hole portion 5a or the light shield member 5.

According to the image reader 10 illustrated in FIG. 39, the transparent member 2 employs a structure that has the recess 2L in the interior, and the light shield member 5 and the imaging optical system 3 are retained in this recess 2L. The end portion of the imaging optical system 3 opposite to the sensor IC 4 is in contact with the bottom of the recess 2L of the transparent member 2. This is a structure in which the light shield member 5 (elastic member) with the through-hole portion 5a in which the imaging optical system 3 is fitted engages with the recess 2L of the transparent member 2, and thus the imaging optical system 3 and a portion of the retainer space 2L are in contact with each other, thereby fastening the imaging optical system 3 to the transparent member 2. Hence, an image reader can be obtained that can hold the imaging optical system 3 regardless of the magnitude of holding force of the board 6 by the fastener (for example, engagement portion 2c).

The light shield member 5 (elastic member) is deformable, and when depressed, the portion in contact with the board 6 deforms slightly, thereby also accomplishing the function of the dust-proofing member 7. Needless to say, the transparent member 2 may have the engagement portions 2c catching the outer circumference of the board 6, thereby being fastened with the board 6, and when the transparent member 2 is fastened to the board 6 in this manner, the light shield member 5 and the imaging optical system 3 may be fastened by being pressed against the board 6. Although not illustrated in the figure, the light shield member 5 (elastic member) and the dust-proofing member 7 can be separate components.

In FIGS. 40 and 41, the same or equivalent component is denoted by the same reference sign, and repeated explanation thereof is omitted. In FIGS. 40 and 41, an adhesive 21 is transparent and transmits light. FIG. 40 illustrates a configuration in which the adhesive 21 of the image reader 10 is applied to the whole contact surface between the imaging optical system 3 and the transparent member 2. More specifically, the imaging optical system 3 is retained in the retainer space 2L, and in order to fasten the portion of the imaging optical system 3 at the object-to-be-read-M side to the retainer space 2L, the adhesive 21 is applied to the whole contact surface between the portion of the imaging optical system 3 at the object-to-be-read-M side and the transparent member 2, and these components are glued together.

FIG. 41 illustrates a configuration in which the image reader 10 in FIG. 11 has the adhesive 21 applied to the outer periphery of the contact surface between the imaging optical system 3 and the transparent member 2. More specifically, the imaging optical system 3 is retained in the retainer space 2L, and in order to fasten the portion of the imaging optical system 3 at the object-to-be-read-M side to the retainer space 2L, the adhesive 21 is applied between the outer periphery of the portion of the imaging optical system 3 at the object-to-be-read-M side and the transparent member 2, and these components are glued together. When the outer periphery of the imaging optical system 3 is only the plate that supports the plurality of lenses in the imaging optical system 3 or the portion of the imaging optical system that has no optical function, an adhesive 21 can be used that is non-transparent, such as a colored adhesive having a light shielding function. This is similar to the configuration, explained in Embodiment 1, in which the transparent resin 2r (adhesive 21) is not transparent.

Hence, according to the image reader 10 illustrated in FIGS. 40 and 41, an image reader can be obtained that can hold the imaging optical system 3 regardless of the magnitude of holding force of the board 6 by the fasteners (for example, engagement portions 2c). In addition, the light shield member 5 of the image reader 10 illustrated in FIGS. 40 and 41 has the imaging optical system 3 fastened to the transparent member 2, and thus the imaging optical system 3 can be only in contact with the through-hole portion 5a or the light shield member 5.

In FIGS. 42, 43 and 44, the same or equivalent component is denoted by the same reference sign, and repeated explanation is omitted. In FIG. 42, an adhesive 22 joins the side face of the imaging optical system 3 with the side face of the transparent member 2 (retainer space 2L), and fastens the imaging optical system 3 to the transparent member 2. In FIG. 43, wedge members 23 are fitted in between the side face of the imaging optical system 3 and the side face of the transparent member 2 (retainer space 2L), thereby fastening the imaging optical system 3 to the transparent member 2. In FIG. 44, engagement portions 2g engage the imaging optical system 3 with the interior of the transparent member 2. The imaging optical system 3 is engaged by the engagement portions 2g, and thus the imaging optical system 3 is fastened to the transparent member 2.

Hence, according to the image reader 10 illustrated in FIGS. 42, 43 and 44, an image reader can be obtained that can hold the imaging optical system 3 regardless of the magnitude of the holding force of the board 6 by the fasteners (for example, engagement portions 2c). In addition, the light shield member 5 of the image reader 10 illustrated in FIG. 42, FIG. 43 and FIG. 44 has the imaging optical system 3 fastened to the transparent member 2, and thus the imaging optical system 3 can be only in contact with the through-hole portion 5a or the light shield member 5. The image readers 10 illustrated in FIG. 42, FIG. 43 and FIG. 44 employ a structure that is completed by engaging the board 6 with the transparent member 2. When the board 6 is engaged with the transparent member 2, the imaging optical system 3 formed on the board 6 is required to be in contact with the through-hole portion 5a of the light shield member 5 to block light entering the interior of the through-hole portion 5a.

According to the image reader of Embodiment 6, the fastener fastens the transparent member 2 to the board 6, and by fastening, the light shield member 5 can be in contact with the transparent member 2 by the pressing force from the board 6. In addition, according to the image reader of Embodiment 6, the fastener can fasten the transparent member 2 to the board 6, and by fastening, the light shield member 5 can be in contact with the transparent member 2 and the imaging optical system 3 by the pressing force from the board 6. In the image reader of Embodiment 6, as explained for the image reader of Embodiment 1 in reference to FIG. 2, when the object-to-be-read-M side of the imaging optical system 3 is contacted with or fastened to the transparent member 2, the following structure is employed. In the image reader of Embodiment 6, when the optical path of reflected light is cut out at a portion between the imaging optical system 3 and the object-to-be-read M, the profile of the imaging optical system 3 may be larger than the opening (corresponding to the space S in FIG. 2) formed by this cut-out 2n. Also in Embodiment 6, the space S is utilized in the same way as in the other Embodiments, including Embodiment 1. Hence, the space S and the cut-out 2n (including the tapered one) can be formed in the transparent member 2, though the illustrations of the space S and the cut-out portion 2n (including the tapered one) are omitted.

Embodiment 7

An explanation is given of Embodiment 7 of the present disclosure with reference to FIGS. 45 to 50. In Embodiment 7, a modified example of the layout of the light-source elements 1 in the image reader of the present disclosure and a light-source holder for the light-source elements 1 are explained. The light-source elements 1 of the image reader according to Embodiment 7 are modified examples of the above-explained side light type. The differences between the image reader of Embodiment 7 (modified example of layout of light-source elements 1) and the image reader of other Embodiments are explained below. The image reader has the reflection area 15 that is formed at the end portion of the transparent member 2 opposite to the object-to-be-read M along the main scanning direction (X-axis direction) to reflect light from the light-source elements 1. The light-source element 1 is formed at outside of the photosensitive element disposed at the end portion in the main scanning direction (X-axis direction) with respect to the photosensitive element disposed next to the photosensitive element disposed at the end portion of the sensor IC 4 in the main scanning direction (X-axis direction), and is disposed at outside of the reflection area 15 so as to face the end portion of the transparent member 2 opposite to the object-to-be-read M. Hence, the image reader of Embodiment 7 and the image readers of other Embodiments are interchangeable with each other.

Figure 45:
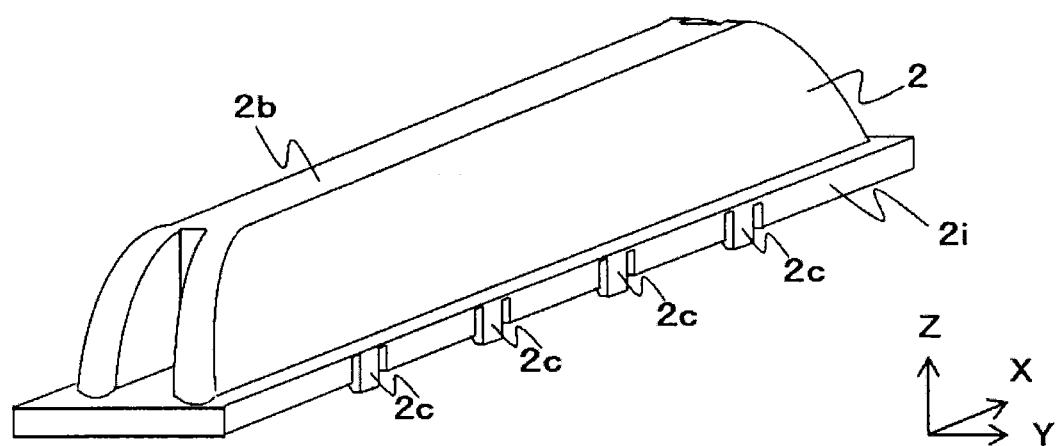
FIG. 45 is a perspective view of an image reader according to Embodiment 7 of the present disclosure.
Figure 46:
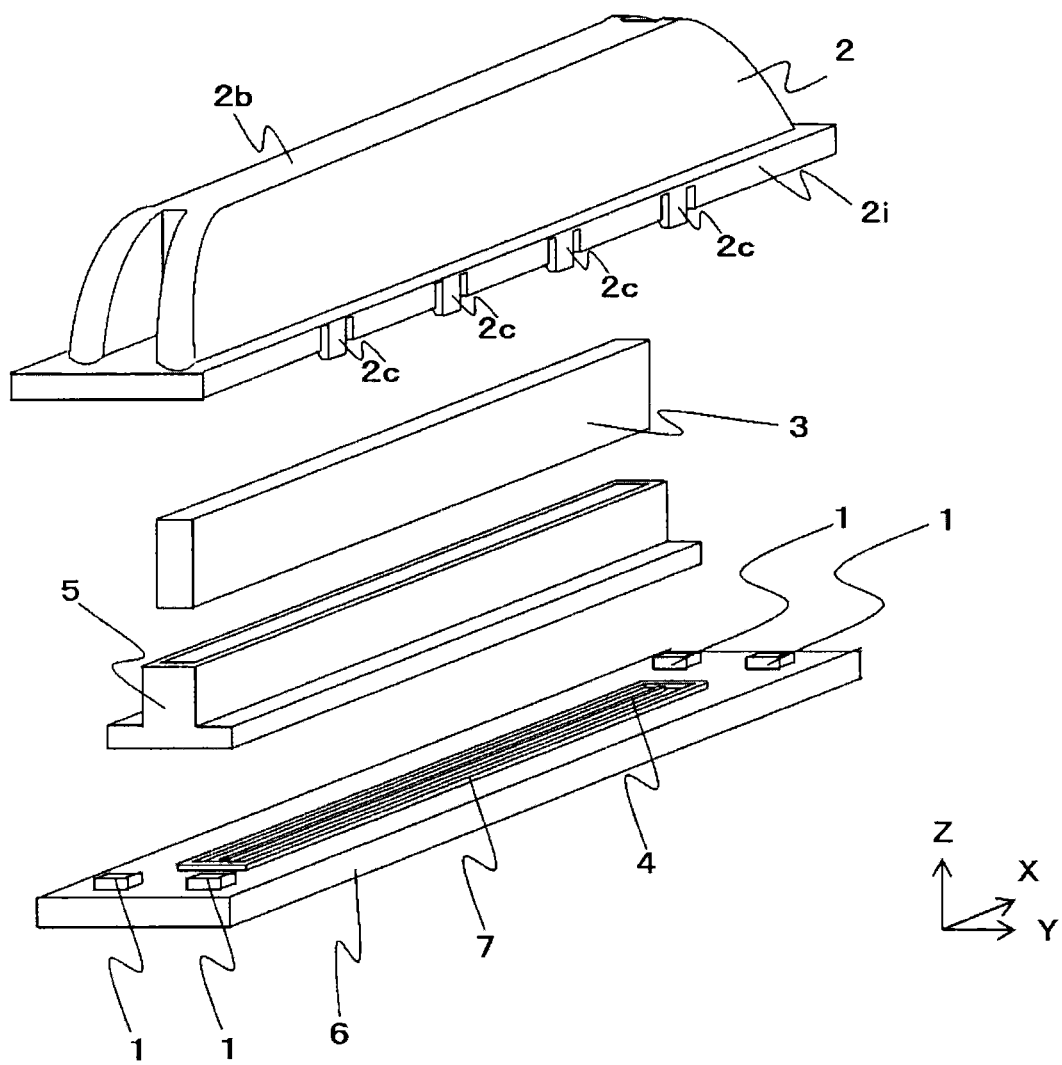
FIG. 46 is an illustrated parts breakdown (exploded oblique drawing) of the image reader according to Embodiment 7 of the present disclosure.
Figure 47:
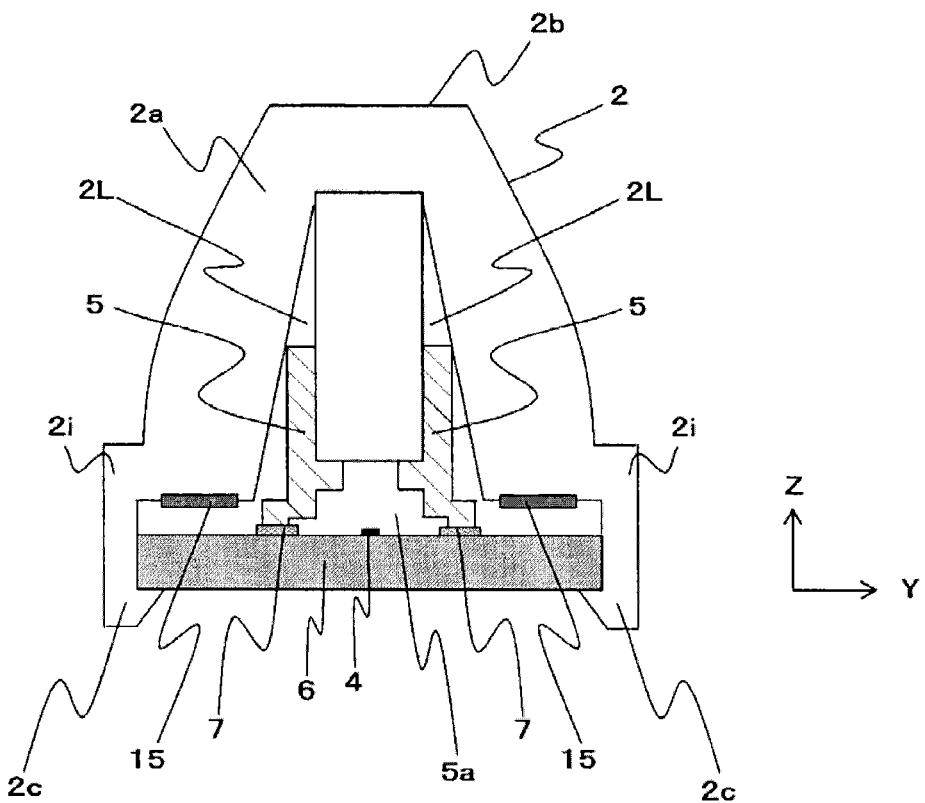
FIG. 47 is a cross-sectional view of the image reader according to Embodiment 7 of the present disclosure.
Figure 48:
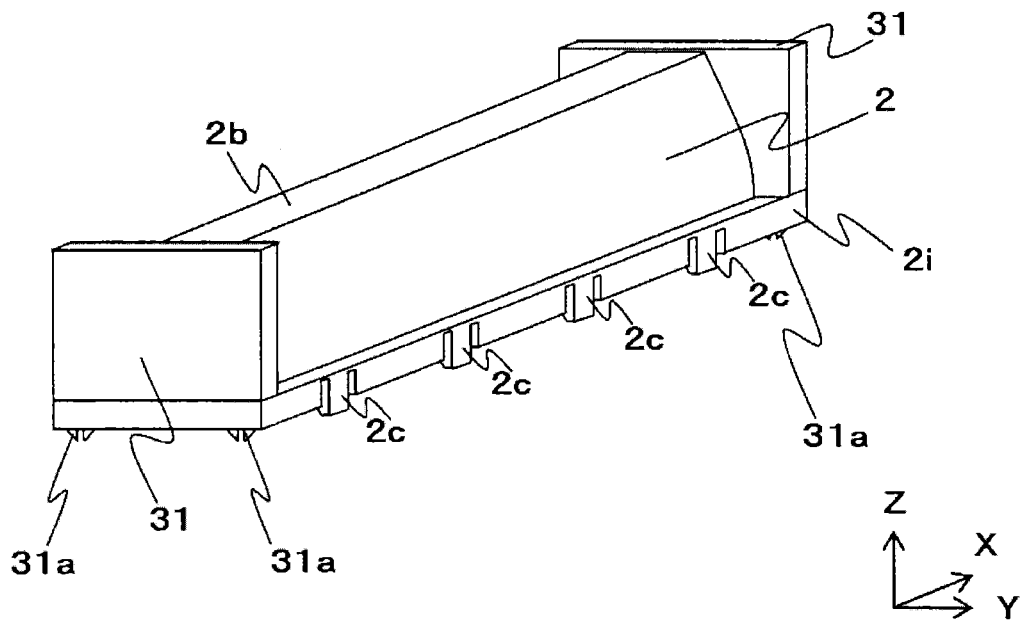
FIG. 48 is a perspective view of the image reader according to Embodiment 7 of the present disclosure.
Figure 49:
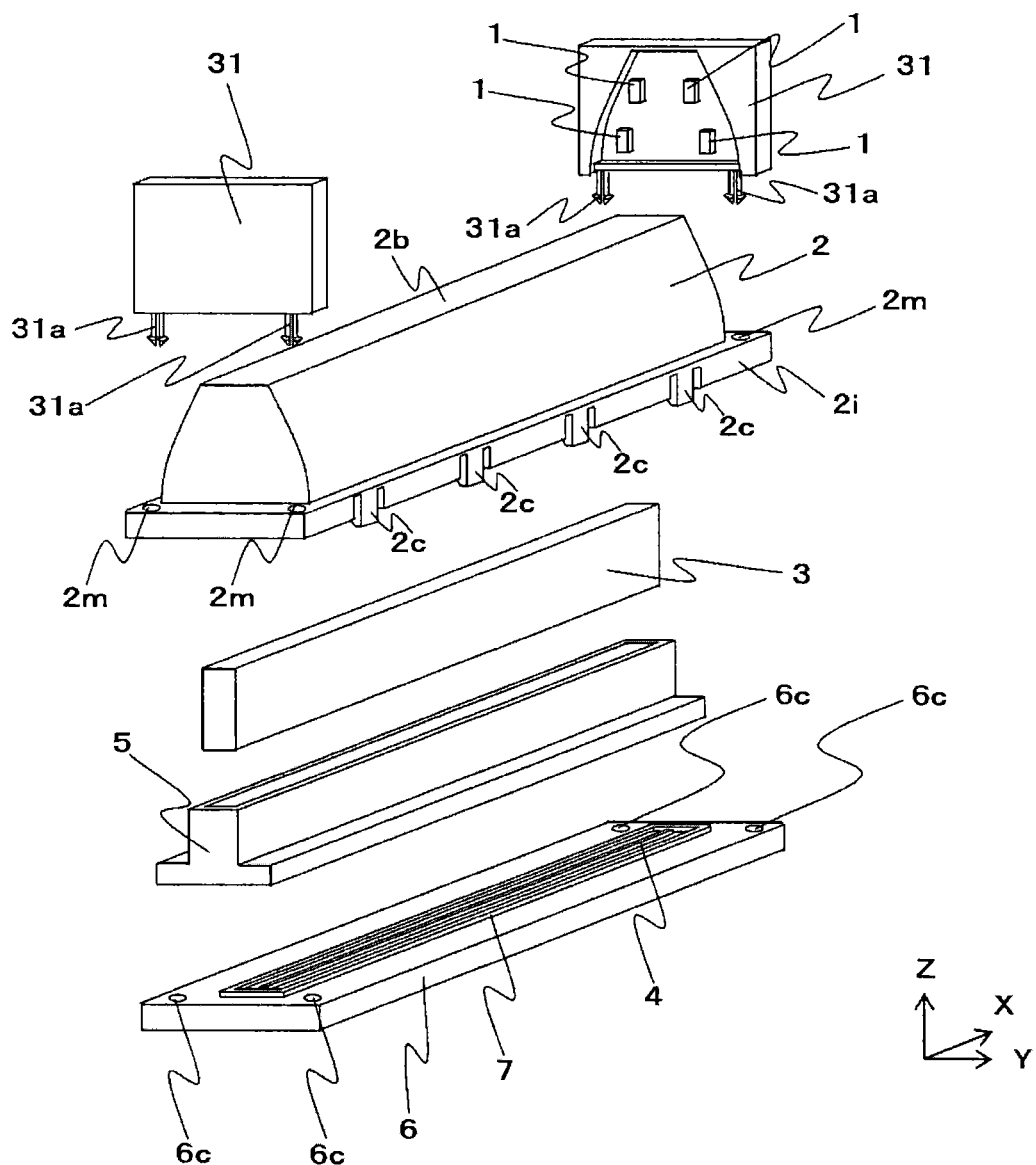
FIG. 49 is an illustrated parts breakdown (exploded oblique drawing) of the image reader according to Embodiment 7 of the present disclosure.
Figure 50:
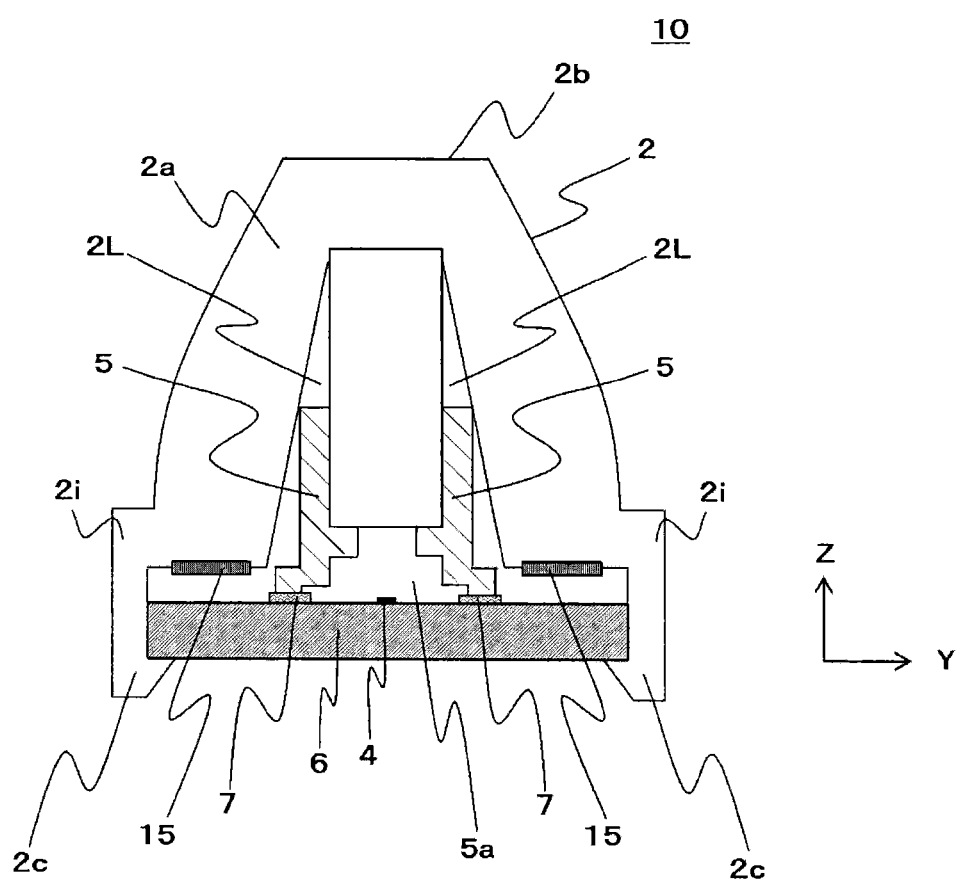
FIG. 50 is a cross-sectional view of the image reader according to Embodiment 7 of the present disclosure.

FIG. 45 is a perspective view of the image reader according to Embodiment 7. FIG. 46 is an illustrated parts breakdown (exploded oblique drawing) of the image reader 10 illustrated in FIG. 45. FIG. 47 is a cross-sectional view of the image reader 10 at a virtual plane parallel to the YZ plane defined by the Y axis and the Z axis illustrated in FIG. 45. FIG. 48 is a perspective view of the image reader according to Embodiment 7. FIG. 49 is an illustrated parts breakdown (exploded oblique drawing) of the image reader 10 illustrated in FIG. 48. FIG. 50 is a cross-sectional view of the image reader 10 at a virtual plane parallel to the YZ plane defined by the Y axis and the Z axis illustrated in FIG. 48. The virtual plane is a cross-sectional view of a portion that intersects one of the multiple engagement portions 2c arrayed in the main scanning direction (X-axis direction). Since the engagement portions 2c are arrayed in two rows along the main scanning direction (X-axis direction) sandwiching the imaging optical system 3, in a precise sense, the virtual plane is a cross section that intersects the two engagement portions 2c disposed in two rows.

In FIGS. 45, 46 and 47, the same or equivalent component is denoted by the same reference sign, and repeated explanation is omitted. In FIGS. 45, 46 and 47, the light-source elements 1 are arranged on the same surface of the board 6 on which the sensor IC 4 is formed and at end portions in the main scanning direction (X-axis direction). In FIGS. 45 and 46, the light-source elements 1 are formed at both ends in the main scanning direction (X-axis direction), but can be formed at only one end. The transparent member 2 has the end portions curved toward the board 6 along the main scanning direction (X-axis direction), and covers the light-source elements 1. Illumination light enters the interior of the transparent member 2 through these covering portions, and is reflected by the reflection area 15, and thus illumination light is emitted to the object-to-be-read M from the object-to-be-read feeding side face 2b. Note that the curved end portions of the transparent member 2 are continuous from the object-to-be-read feeding side face 2b, and the parts of the curved end portions of the transparent member 2 that cover the light-source elements 1 are end portions of the transparent member 2 opposite to the object-to-be-read M outside the reflection area 15.

According to the image reader 10 illustrated in FIGS. 45, 46 and 47, light emitted from the light-source elements 1 in the Z-axis direction is reflected by the curved end portions of the transparent member 2, is bent mainly in the main scanning direction (X-axis direction), and is propagated in the main scanning direction (X-axis direction) while reflecting repeatedly in the interior of the transparent member 2. During the propagation in the main scanning direction (X-axis direction), light is reflected by the reflection area 15, and is reflected in the Z-axis direction. The path (optical path) for light reflected in the Z-axis direction is the same as that of light emitted from the light-source elements 1 in other Embodiments. In addition, the method of fastening the dust-proofing member 7, light shield member 5, imaging optical system 3 and transparent member 2 to the board 6 of the image reader 10 in FIG. 47 is the same as in the other Embodiments.

Hence, although the image reader 10 illustrated in FIGS. 45, 46 and 47 is a side light type, an image reader having the light-source elements 1 formed on the board 6 or on the XY plane can be obtained.

In FIGS. 48, 49 and 50, the same or equivalent component is denoted by the same reference sign, and repeated explanation is omitted. In FIGS. 48, 49 and 50, light-source holders 31 (LED holders 31) each allow the end portion of the transparent member 2 to be fitted in a surface on which the light-source elements 1 are mounted. As illustrated in FIG. 49, each light-source holder 31 is formed with a recess that retains therein a board on which the light-source elements 1 are formed, and the end portion of the transparent member 2. In FIG. 48 and FIG. 49, the light-source holders 31 are formed at both ends in the main scanning direction (X-axis direction), but the light-source holder can be provided at only one side. Holder pins 31a are pins formed at the end portion of the light-source holder 31 opposite to the object-to-be-read-M side. The figures for the present disclosure illustrate a configuration in which the holder pin 31a is a snap fit type holder. A hole 2m for each holder pin is formed in the flange 2i of the transparent member 2 at the end portion in the main scanning direction (X-axis direction), and the holder pin 31a formed along the sub-scanning direction (Y-axis direction) is fitted in the hole 2m. A hole 6c for each holder pin is formed at the end portion of the board 6 in the main scanning direction (X-axis direction), and the holder pin 31a formed along the sub-scanning direction (Y-axis direction) is fitted in the hole 6c.

The holder pins 31a fit in the holder-pin holes 2m and the holder-pin holes 6c, and the light-source holder 31 thereby fastens to the end portion of the transparent member 2 in the main scanning direction (X-axis direction). More specifically, the barb of the snap fit tip of the holder pin 31a protrudes from the surface of the board 6 opposite to the surface on which the sensor IC 4 is formed, and thus the light-source holder 31 is fastened. In addition, the portion of the board 6 in which the holder-pin hole 6c is formed can be exposed when the flange 2i is not formed at the end portion of the transparent member 2 in the main scanning direction (X-axis direction), and the holder pin 31a can be fitted directly in such a holder-pin hole 6c. Conversely, without forming the portion facing the flange 2i at the end portions in the main scanning direction (X-axis direction) of the board 6, the holder pin 31a can be inserted into only the holder pin holes 2m formed in the flange 2i. Still further, although the portion facing the flange 2i is formed at the end portions in the main scanning direction (X-axis direction) of the board 6, the holder-pin hole 6c may not be formed, and the holder pin 31a can be inserted into only the holder-pin holes 2m formed in the flange 2i.

Moreover, it can be said that the reflection area 15 that reflects light from the light-source elements 1 is formed at the end portion of the transparent member 2 at the opposite side to the object-to-be-read M along the main scanning direction (X-axis direction), and the light-source holder 31 is fixed to the flange 2 of the transparent member 2 (board 6) outside of the photosensitive element disposed at the end portion in the main scanning direction (X-axis direction) with respect to the photosensitive element disposed next to the photosensitive element disposed at the end portion of the sensor IC 4 in the main scanning direction (X-axis direction). The light-source holder 31 illustrated in FIGS. 48 and 49 is fastened on the flange 2i of the transparent member 2 (board 6), but the light-source holder 31 may be fastened in a manner not in direct contact with the flange 2i of the transparent member 2 simply by inserting into the end portion of the transparent member 2 in the main scanning direction (X-axis direction).

According to the image reader 10 illustrated in FIGS. 48, 49 and 50, the light-source elements 1 are disposed on the light-source holder 31 provided at the end portion of the transparent member 2 in the main scanning direction. Light emitted from the light-source elements 1 propagates in the main scanning direction (X-axis direction) while reflecting repeatedly in the interior of the transparent member 2. During the propagation in the main scanning direction (X-axis direction), light is reflected by the reflection area 15, and is reflected in the Z-axis direction. The path (optical path) for light reflected in the Z-axis direction is the same as that of light emitted from the light-source elements 1 in other Embodiments. In addition, method of fastening the dust-proofing member 7, light shield member 5, imaging optical system 3, and transparent member 2 to the board 6 of the image reader 10 in FIG. 50 is the same as in the other Embodiments.

Hence, although the image reader 10 illustrated in FIGS. 48, 49 and 50 is a side light type, an image reader can be obtained that has built-in light-source elements 1. Note that the cross-sectional view of FIG. 50 shows the same shape as that of the cross-sectional view of FIG. 47, because the layout of the light-source elements 1 is the only difference these image readers.

REFERENCE SIGNS LIST

1 Light-source element
1d Light-source drive circuit
2 Transparent member (light guide)
2a Light guide part
2b Object-to-be-read feeding side face (document placing surface)
2c Engagement portion
2d Engagement portion
2e Boss
2f Boss
2g Engagement portion
2i Flange
2j Screw hole
2k Projection
2L Retainer space (recess)
2m Holder-pin hole
2n Cut-out (cut-out portion)
2r Transparent resin
3 Imaging optical system (lens array assembly)
4 Sensor IC (line sensor assembly)
5 Light shield member (light shield)
5a Through-hole portion
6 Board
6a Hole
6b Positioning hole
6c Holder-pin hole
7 Dust-proofing member
8 External connector
9 Screw
10 Image reader
11 Signal processor IC
12 Signal processor
12a CPU
12b RAM
12c Signal processing circuit
13a first path
13b second path
13c second path
13d second path
13e second path
13f second path
14 Mirror surface
14a Mirror surface
14b Mirror surface
14c Mirror surface
15 Reflection area (reflection pattern, reflection prism)
16 Clip
17 Clip
18 Adhesive
19 Elastic member
21 Adhesive
22 Adhesive
23 Wedge member
31 Light-source holder
31a Holder pin

The invention claimed is:

1. An image reader configured to focus light emitted from a light source and reflected by an object-to-be-read, and to read an image of the object-to-be-read, the image reader comprising:
a board;
a line sensor assembly including a plurality of photosensitive elements formed on one surface of the board along a main scanning direction;
a lens array assembly including a plurality of lenses arrayed along the main scanning direction, and configured to focus the reflected light onto the line sensor assembly;
a light shield configured to support a portion of the lens array assembly at the line-sensor-assembly side, and to block light other than the light focused by the lens array assembly;
a transparent member made of transparent material retaining the lens array assembly and the light shield in a retainer space, and covering a portion of the lens array assembly at the object-to-be-read side and the light shield; and
a fastener configured to fasten the transparent member to the board, and by pressing force from the board by the fastening, to bring the light shield into contact with the transparent member, to bring the lens array assembly into contact with the transparent member via the light shield, or to bring the light shield and the lens array assembly into contact with the transparent member,
wherein the fastener fastens the board by passing therethrough, or fastens the board by holding the board with engagement portions thereof.

2. The image reader according to claim 1, wherein the transparent member includes a cut-out defining a portion of an optical path of the reflected light between the lens array assembly and the object-to-be-read.

3. The image reader according to claim 1, wherein the transparent member guides the light from the light source through an interior of the transparent member, and emits the guided light to the object-to-be-read.

4. The image reader according to claim 3, wherein the light source has a plurality of light-source elements arrayed in the main scanning direction along the light shield so as to face an end portion of the transparent member opposite to the object-to-be-read.

5. The image reader according to claim 4, wherein the transparent member is formed in a shape that exposes either:
one of two side faces of the lens array assembly and the light shield in the main scanning direction, or
one of the two side faces of the lens array assembly along the main scanning direction.

6. The image reader according to claim 4, wherein:
the transparent member is formed in a shape that exposes either:
one of two side faces of the lens array assembly and the light shield in the main scanning direction, or
one of the two side faces of the lens array assembly along the main scanning direction; and
the lens array assembly is disposed at a location out of a virtual plane through which a first virtual line and a second virtual line pass through, the first virtual line being parallel to the main scanning direction and passing through an array of points where optical axes of the plurality of lens and the object-to-be-read intersect, and the second virtual line being parallel to the main scanning direction and passing through the arrayed plurality of light-source elements.

7. The image reader according to claim 3, wherein:
a reflection area configured to reflect the light from the light source is formed at an end portion of the transparent member opposite to the object-to-be-read along the main scanning direction, and the light source includes a light-source element formed so as to face an end portion of the transparent member in the main scanning direction; or a reflection area configured to reflect the light from the light source is formed at the end portion of the transparent member opposite to the object-to-be-read along the main scanning direction, and the light source includes a light source element formed outside of the photosensitive element disposed at an end portion of the line sensor assembly in the main scanning direction with respect to the photosensitive element disposed next to the photosensitive element disposed at the end portion in the main scanning direction, and facing the end portion of the transparent member opposite to the object-to-be-read at outside of the reflection area.

8. The image reader according to claim 7, wherein:
the transparent member is formed in a shape that exposes either:
one of two side faces of the lens array assembly and the light shield in the main scanning direction, or
one of the two side faces of the lens array assembly along the main scanning direction; and
the lens array assembly is disposed at a location out of a virtual plane through which a first virtual line and a second virtual line pass through, the first virtual line being parallel to the main scanning direction and passing through an array of points where optical axes of the plurality of lens and the object-to-be-read intersect, and the second virtual line being parallel to the main scanning direction and passing through the reflection area.

9. An image reader configured to focus light emitted from a light source and reflected by an object-to-be-read, and to read an image of the object-to-be-read, the image reader comprising:
a board;
a line sensor assembly including a plurality of photosensitive elements formed on one surface of the board along a main scanning direction;
a lens array assembly including a plurality of lenses arrayed along the main scanning direction, and configured to focus the reflected light onto the line sensor assembly;
a light shield configured to support a portion of the lens array assembly at the line-sensor-assembly side, and to block light other than the light focused by the lens array assembly;
a transparent member made of transparent material retaining the lens array assembly and the light shield in a retainer space, and covering a portion of the lens array assembly at the object-to-be-read side and the light shield; and
a fastener configured to fasten the transparent member to the board, and by pressing force from the board by the fastening, to bring the light shield into contact with the transparent member, to bring the lens array assembly into contact with the transparent member via the light shield, or to bring the light shield and the lens array assembly into contact with the transparent member,
wherein the fastener has a portion passing through the board, the portion being fusion bonded.

10. An image reader configured to focus light emitted from a light source and reflected by an object-to-be-read, and to read an image of the object-to-be-read, the image reader comprising:
a board;
a line sensor assembly including a plurality of photosensitive elements formed on one surface of the board along a main scanning direction;
a lens array assembly including a plurality of lenses arrayed along the main scanning direction, and configured to focus the reflected light onto the line sensor assembly;
a light shield configured to support a portion of the lens array assembly at the line-sensor-assembly side, and to block light other than the light focused by the lens array assembly;
a transparent member made of transparent material retaining the lens array assembly and the light shield in a retainer space, and covering a portion of the lens array assembly at the object-to-be-read side and the light shield; and
a fastener configured to fasten the transparent member to the board, and by pressing force from the board by the fastening, to bring the light shield into contact with the transparent member, to bring the lens array assembly into contact with the transparent member via the light shield, or to bring the light shield and the lens array assembly into contact with the transparent member,
wherein the fastener fastens, with the board, a flange of the transparent member that extends, at an opposite side to the line sensor assembly, from the end portion of the transparent member opposite to the object-to-be-read.

11. An image reader configured to focus light emitted from a light source and reflected by an object-to-be-read, and to read an image of the object-to-be-read, the image reader comprising:
a board;
a line sensor assembly including a plurality of photosensitive elements formed on one surface of the board along a main scanning direction;
a lens array assembly including a plurality of lenses arrayed along the main scanning direction, and configured to focus the reflected light onto the line sensor assembly;
a light shield configured to support a portion of the lens array assembly at the line-sensor-assembly side, and to block light other than the light focused by the lens array assembly;
a transparent member made of transparent material retaining the lens array assembly and the light shield in a retainer space, and covering a portion of the lens array assembly at the object-to-be-read side and the light shield; and
a fastener configured to fasten the transparent member to the board, and by pressing force from the board by the fastening, to bring the light shield into contact with the transparent member, to bring the lens array assembly into contact with the transparent member via the light shield, or to bring the light shield and the lens array assembly into contact with the transparent member,
wherein:
the fastener includes:
two projections formed on surfaces of the transparent member opposite to the retainer space, and front and back in a sub-scanning direction intersecting the main scanning direction; and
an elastic member having:
a curved portion bent toward another surface of the board; and
first and second flat portions formed respectively at both ends of the curved portion, and engaged respectively with the two projections; and
the elastic member causes the first and second flat portions to pass through the board, or to hold the board, exists between one surface of the board and the other surface thereof, and causes the curved portion to be pushed against the other surface of the board and in contact therewith.

12. An image reader configured to focus light emitted from a light source and reflected by an object-to-be-read, and to read an image of the object-to-be-read, the image reader comprising:
a board;
a line sensor assembly including a plurality of photosensitive elements formed on one surface of the board along a main scanning direction;
a lens array assembly including a plurality of lenses arrayed along the main scanning direction, and configured to focus the reflected light onto the line sensor assembly;
a light shield configured to support a portion of the lens array assembly at the line-sensor-assembly side, and to block light other than the light focused by the lens array assembly;
a transparent member made of transparent material retaining the lens array assembly and the light shield in a retainer space, and covering a portion of the lens array assembly at the object-to-be-read side and the light shield; and
a fastener configured to fasten the transparent member to the board, and by pressing force from the board by the fastening, to bring the light shield into contact with the transparent member, to bring the lens array assembly into contact with the transparent member via the light shield, or to bring the light shield and the lens array assembly into contact with the transparent member, wherein:
the transparent member guides the light from the light source through an interior of the transparent member, and emits the guided light to the object-to-be-read;
the light source has a plurality of light-source elements arrayed in the main scanning direction along the light shield so as to face an end portion of the transparent member opposite to the object-to-be-read;
the transparent member is formed in a shape that exposes either:
one of two side faces of the lens array assembly and the light shield in the main scanning direction, or
one of the two side faces of the lens array assembly along the main scanning direction;
the fastener includes:
a first projection formed on a surface of the transparent member opposite to the retainer space;
a second projection formed on a surface of the light shield opposite to the line sensor assembly, and formed on the surface of the light shield exposed from the transparent member; and
an elastic member having:
a curved portion curved toward another surface of the board; and
first and second flat portions formed respectively at both ends of the curved portion, and engaged respectively with the first and second projections; and
the elastic member causes the first and second flat portions to pass through the board, or to hold the board, exists between one surface of the board and the other surface thereof, and causes the curved portion to be pushed against the other surface of the board and in contact therewith.

13. The image reader according to claim 12, wherein:
the lens array assembly is disposed at a location out of a virtual plane through which a first virtual line and a second virtual line pass through, the first virtual line being parallel to the main scanning direction and passing through an array of points where optical axes of the plurality of lens and the object-to-be-read intersect, and the second virtual line being parallel to the main scanning direction and passing through the arrayed plurality of light-source elements.

14. An image reader configured to focus light emitted from a light source and reflected by an object-to-be-read, and to read an image of the object-to-be-read, the image reader comprising:
a board;
a line sensor assembly including a plurality of photosensitive elements formed on one surface of the board along a main scanning direction;
a lens array assembly including a plurality of lenses arrayed along the main scanning direction, and configured to focus the reflected light onto the line sensor assembly;
a light shield configured to support a portion of the lens array assembly at the line-sensor-assembly side, and to block light other than the light focused by the lens array assembly;
a transparent member made of transparent material retaining the lens array assembly and the light shield in a retainer space, and covering a portion of the lens array assembly at the object-to-be-read side and the light shield; and
a fastener configured to fasten the transparent member to the board, and by pressing force from the board by the fastening, to bring the light shield into contact with the transparent member, to bring the lens array assembly into contact with the transparent member via the light shield, or to bring the light shield and the lens array assembly into contact with the transparent member, wherein:
the transparent member guides the light from the light source through an interior of the transparent member, and emits the guided light to the object-to-be-read;
a reflection area configured to reflect the light from the light source is formed at an end portion of the transparent member opposite to the object-to-be-read along the main scanning direction, and the light source includes a light-source element formed so as to face an end portion of the transparent member in the main scanning direction; or
a reflection area configured to reflect the light from the light source is formed at the end portion of the transparent member opposite to the object-to-be-read along the main scanning direction, and the light source includes a light source element formed outside of the photosensitive element disposed at an end portion of the line sensor assembly in the main scanning direction with respect to the photosensitive element disposed next to the photosensitive element disposed at the end portion in the main scanning direction, and facing the end portion of the transparent member opposite to the object-to-be-read at outside of the reflection area;
the transparent member is formed in a shape that exposes either:
one of two side faces of the lens array assembly and the light shield in the main scanning direction, or
one of the two side faces of the lens array assembly along the main scanning direction;

the fastener includes:
- a first projection formed on a surface of the transparent member opposite to the retainer space;
- a second projection formed on a surface of the light shield opposite to the line sensor assembly, and formed on the surface of the light shield exposed from the transparent member; and an elastic member having:
- a curved portion curved toward another surface of the board; and
- first and second flat portions formed at both ends of the curved portion, and engaged respectively with the first and second projections; and the elastic member causes the first and second flat portions to pass through the board, or to hold the board, exists between one surface of the board and the other surface thereof, and causes the curved portion to be pushed against the other surface of the board and in contact therewith.

15. The image reader according to claim 14, wherein:
the lens array assembly is disposed at a location out of a virtual plane through which a first virtual line and a second virtual line pass through, the first virtual line being parallel to the main scanning direction and passing through an array of points where optical axes of the plurality of lens and the object-to-be-read intersect, and the second virtual line being parallel to the main scanning direction and passing through the reflection area.

* * * * *